Figure 1:
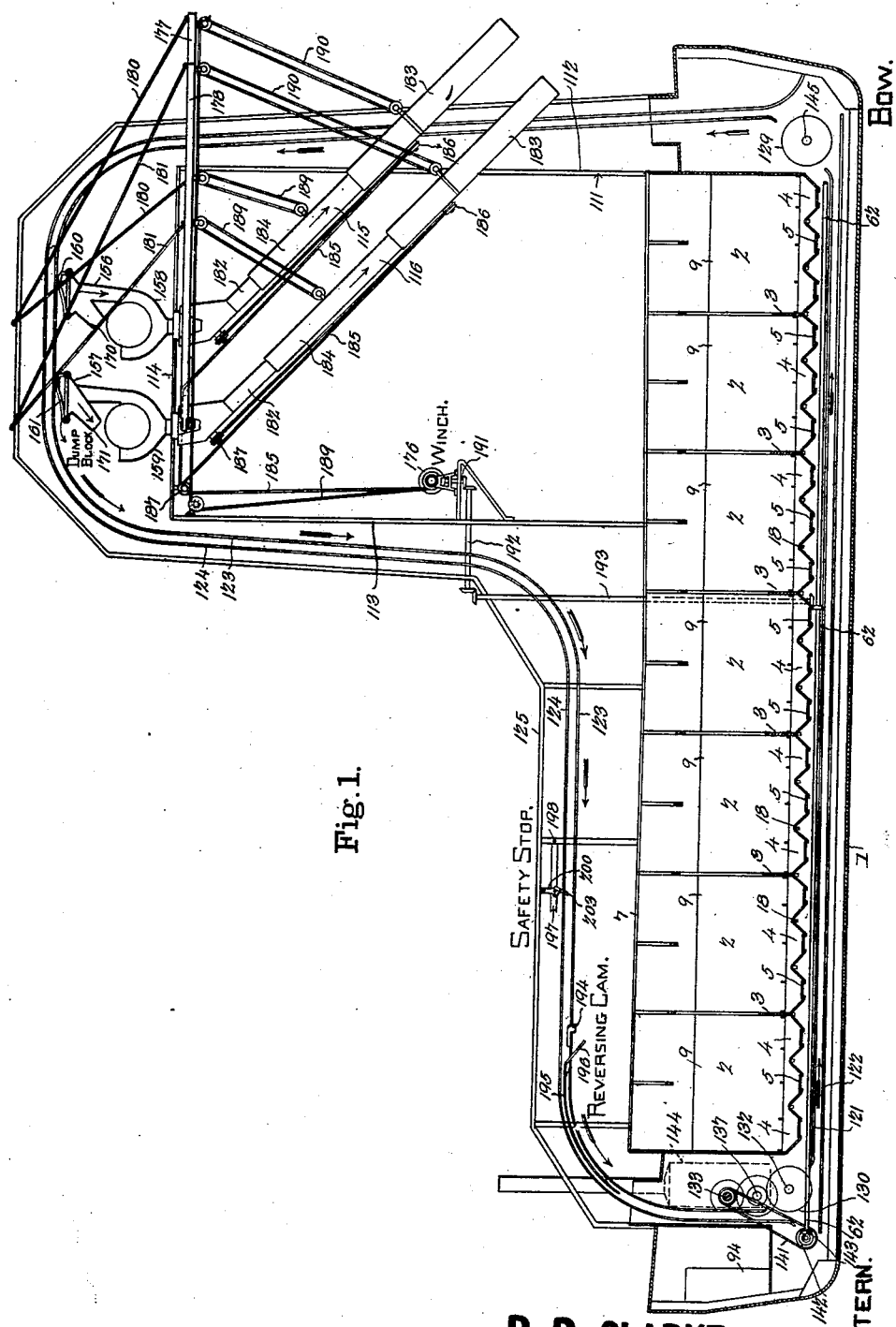

No. 714,150. Patented Nov. 25, 1902.
P. B. CLARKE.
APPARATUS FOR HANDLING MATERIAL IN BULK.
(Application filed Jan. 26, 1901.)
(No Model.) 31 Sheets—Sheet 1.

Witnesses
E. K. Stewart
H. J. Riley

P. B. CLARKE Inventor
By C. A. Snow & Co.
Attorneys

No. 714,150. Patented Nov. 25, 1902.
P. B. CLARKE.
APPARATUS FOR HANDLING MATERIAL IN BULK.
(Application filed Jan. 26, 1901.)
(No Model.) 31 Sheets—Sheet 3.

P. B. CLARKE Inventor

No. 714,150. Patented Nov. 25, 1902.
P. B. CLARKE.
APPARATUS FOR HANDLING MATERIAL IN BULK.
(Application filed Jan. 26, 1901.)

(No Model.) 31 Sheets—Sheet 5.

Witnesses
P. B. CLARKE Inventor
By C.A. Snow & Co.
Attorneys

No. 714,150. Patented Nov. 25, 1902.
P. B. CLARKE.
APPARATUS FOR HANDLING MATERIAL IN BULK.
(Application filed Jan. 26, 1901.)
(No Model.) 31 Sheets—Sheet 7.

Witnesses
P. B. CLARKE Inventor
By C. A. Snow & Co.
Attorneys

No. 714,150. Patented Nov. 25, 1902.
P. B. CLARKE.
APPARATUS FOR HANDLING MATERIAL IN BULK.
(Application filed Jan. 26, 1901.)

(No Model.) 31 Sheets—Sheet 11.

Witnesses
P. B. CLARKE Inventor
Attorneys

No. 714,150. Patented Nov. 25, 1902.
P. B. CLARKE.
APPARATUS FOR HANDLING MATERIAL IN BULK.
(Application filed Jan. 26, 1901.)
(No Model.) 31 Sheets—Sheet 12.

Witnesses

P. B. CLARKE Inventor
By C. A. Snow & Co.,
Attorneys

No. 714,150. Patented Nov. 25, 1902.
P. B. CLARKE.
APPARATUS FOR HANDLING MATERIAL IN BULK.
(Application filed Jan. 26, 1901.)
(No Model.) 31 Sheets—Sheet 13.
Fig. 13.
Fig. 14.
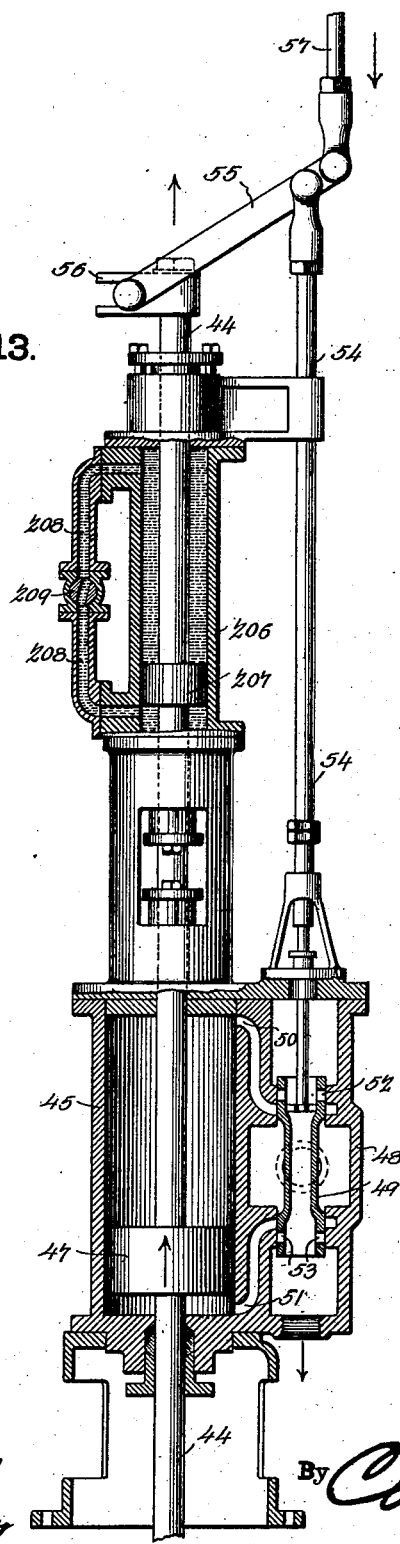
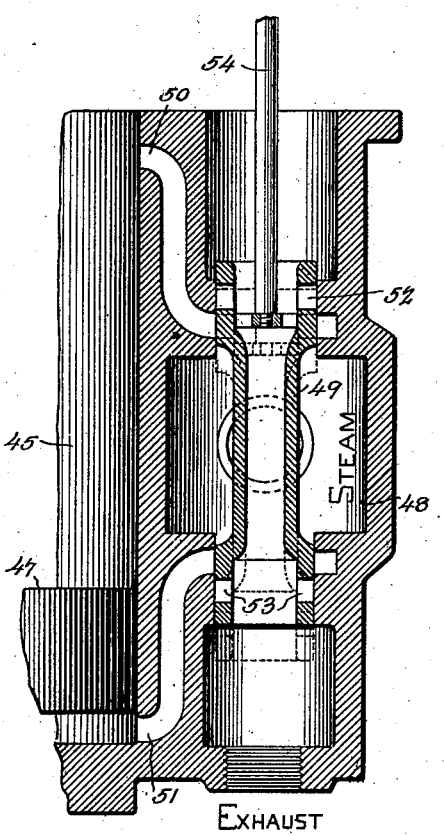
Witnesses
P. B. CLARKE Inventor
By
Attorneys No. 714,150. Patented Nov. 25, 1902.
P. B. CLARKE.
APPARATUS FOR HANDLING MATERIAL IN BULK.
(Application filed Jan. 26, 1901.)
(No Model.) 31 Sheets—Sheet 14.

Witnesses

P. B. CLARKE Inventor

By C. A. Snow & Co.
Attorneys

No. 714,150. Patented Nov. 25, 1902.
P. B. CLARKE.
APPARATUS FOR HANDLING MATERIAL IN BULK.
(Application filed Jan. 26, 1901.)
(No Model.) 31 Sheets—Sheet 15.

Witnesses

P. B. CLARKE Inventor
By C. A. Snow & Co.
Attorneys

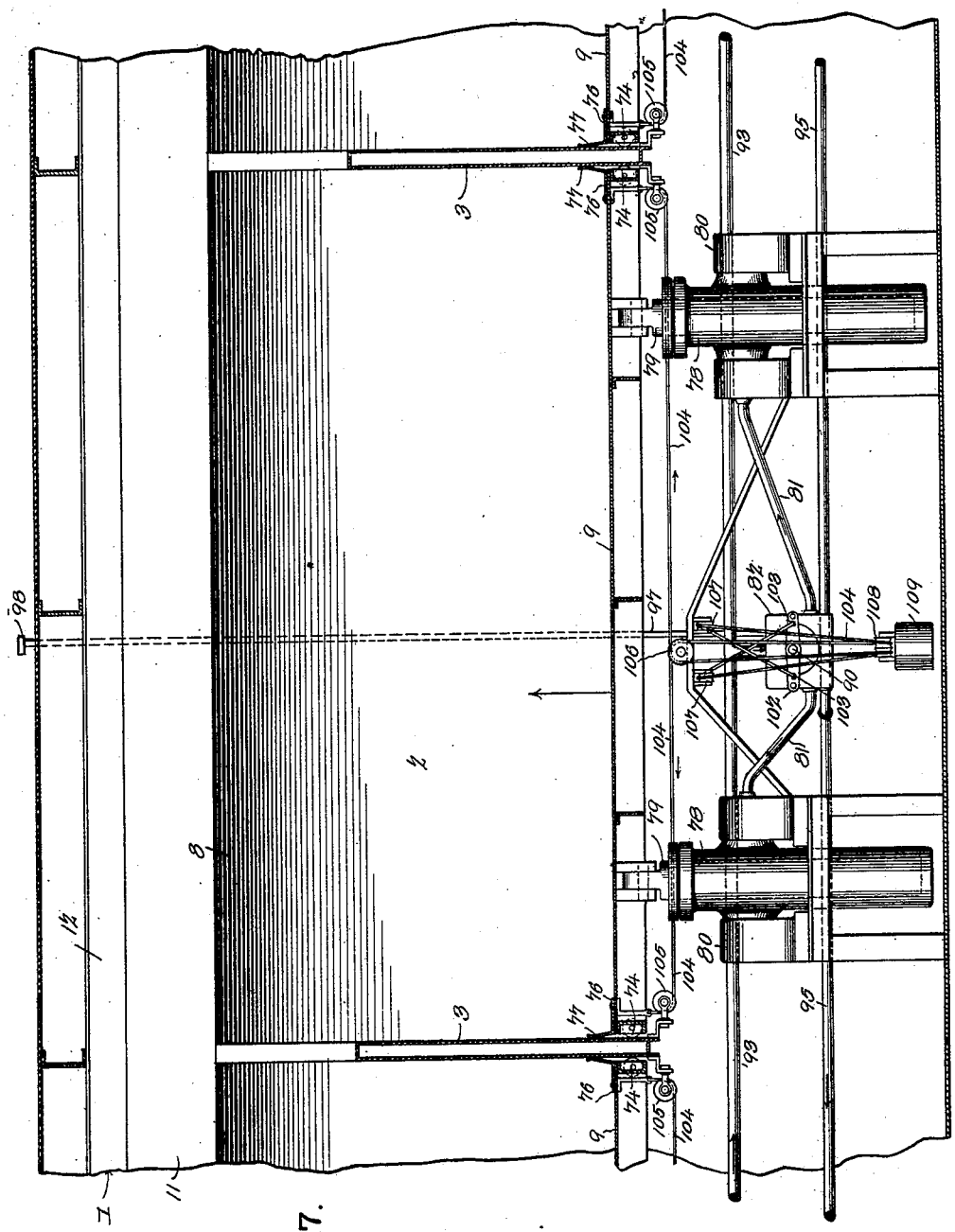

No. 714,150. Patented Nov. 25, 1902.
P. B. CLARKE.
APPARATUS FOR HANDLING MATERIAL IN BULK.
(Application filed Jan. 26, 1901.)
(No Model.) 31 Sheets—Sheet 17.
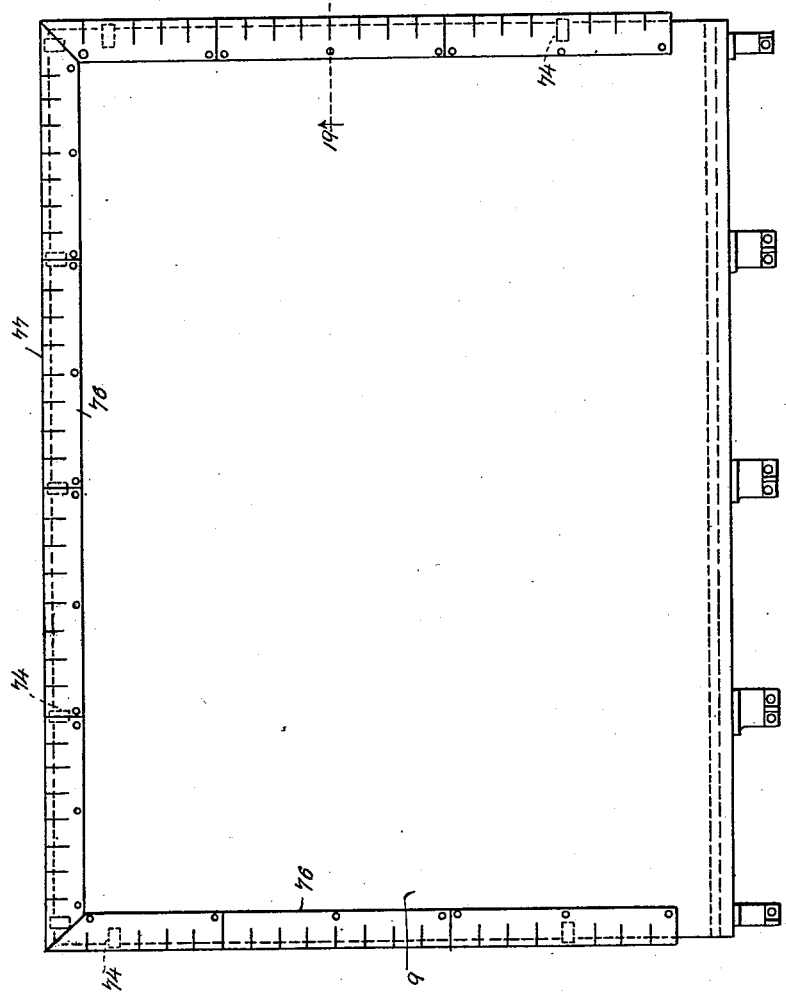
Witnesses
E. F. Stewart
H. H. Riley
P. B. CLARKE Inventor
By C. A. Snow & Co.
Attorneys

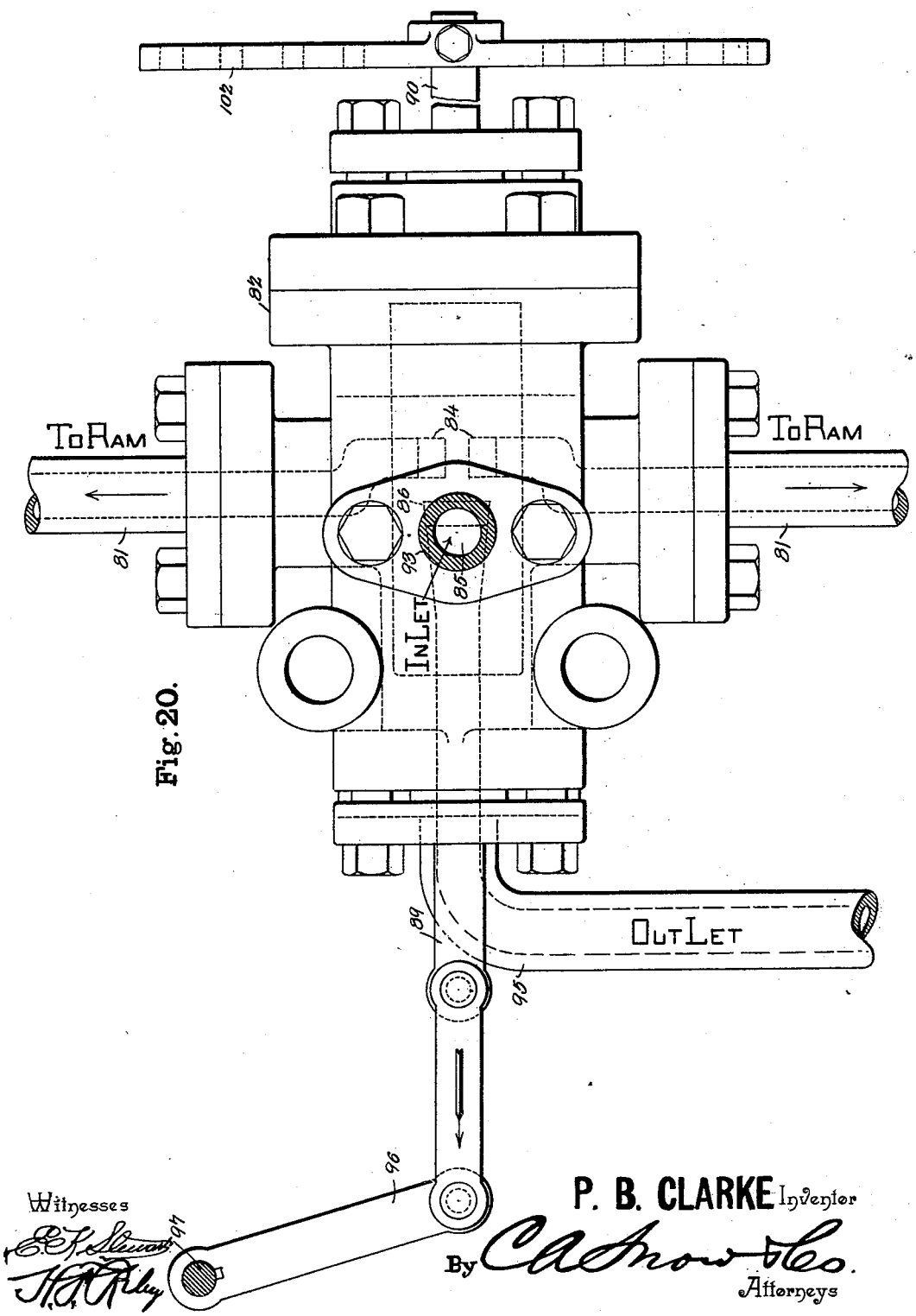

No. 714,150. Patented Nov. 25, 1902.
P. B. CLARKE.
APPARATUS FOR HANDLING MATERIAL IN BULK.
(Application filed Jan. 26, 1901.)

(No Model.) 31 Sheets—Sheet 19.

Witnesses

P. B. CLARKE Inventor
By C. A. Snow & Co.
Attorneys

No. 714,150. Patented Nov. 25, 1902.
P. B. CLARKE.
APPARATUS FOR HANDLING MATERIAL IN BULK.
(Application filed Jan. 26, 1901.)
(No Model.) 31 Sheets—Sheet 20.

P. B. CLARKE Inventor

No. 714,150. Patented Nov. 25, 1902.
P. B. CLARKE.
APPARATUS FOR HANDLING MATERIAL IN BULK.
(Application filed Jan. 26, 1901.)
(No Model.) 31 Sheets—Sheet 21.
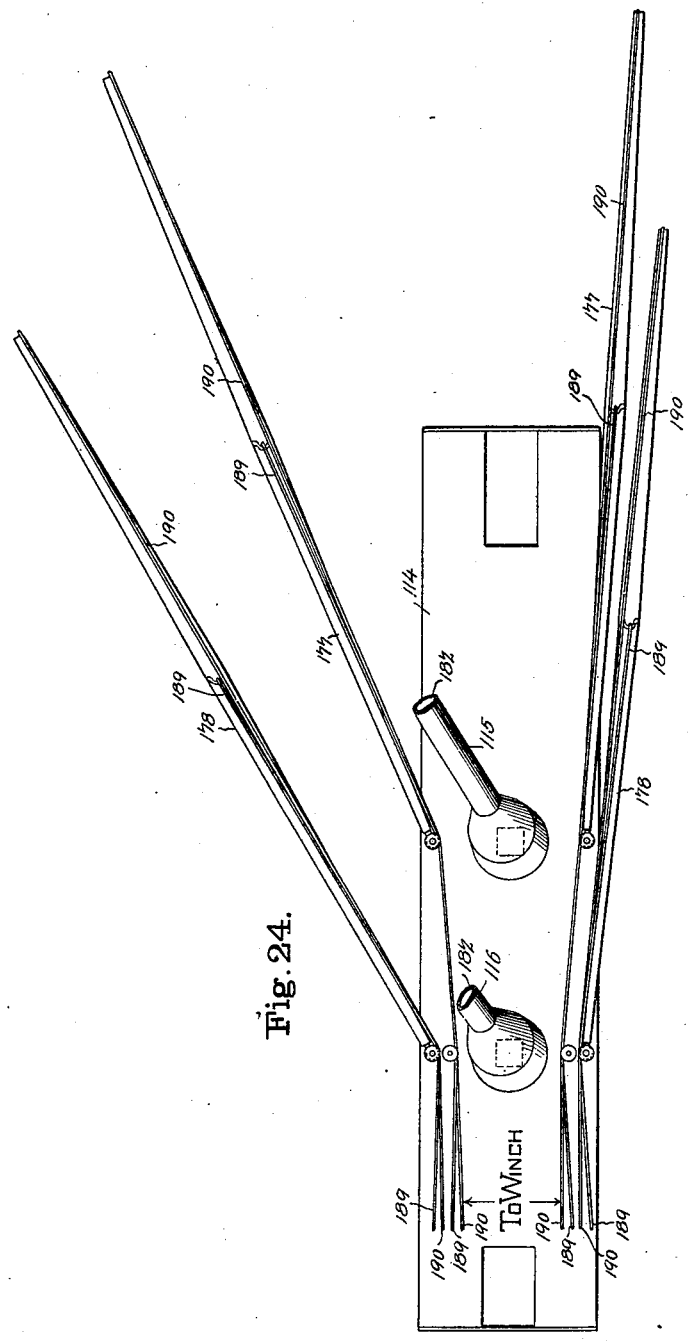
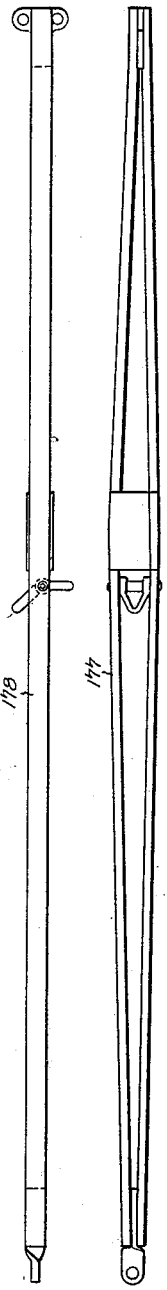
Witnesses
P. B. CLARKE Inventor
By C. A. Snow & Co.
Attorneys

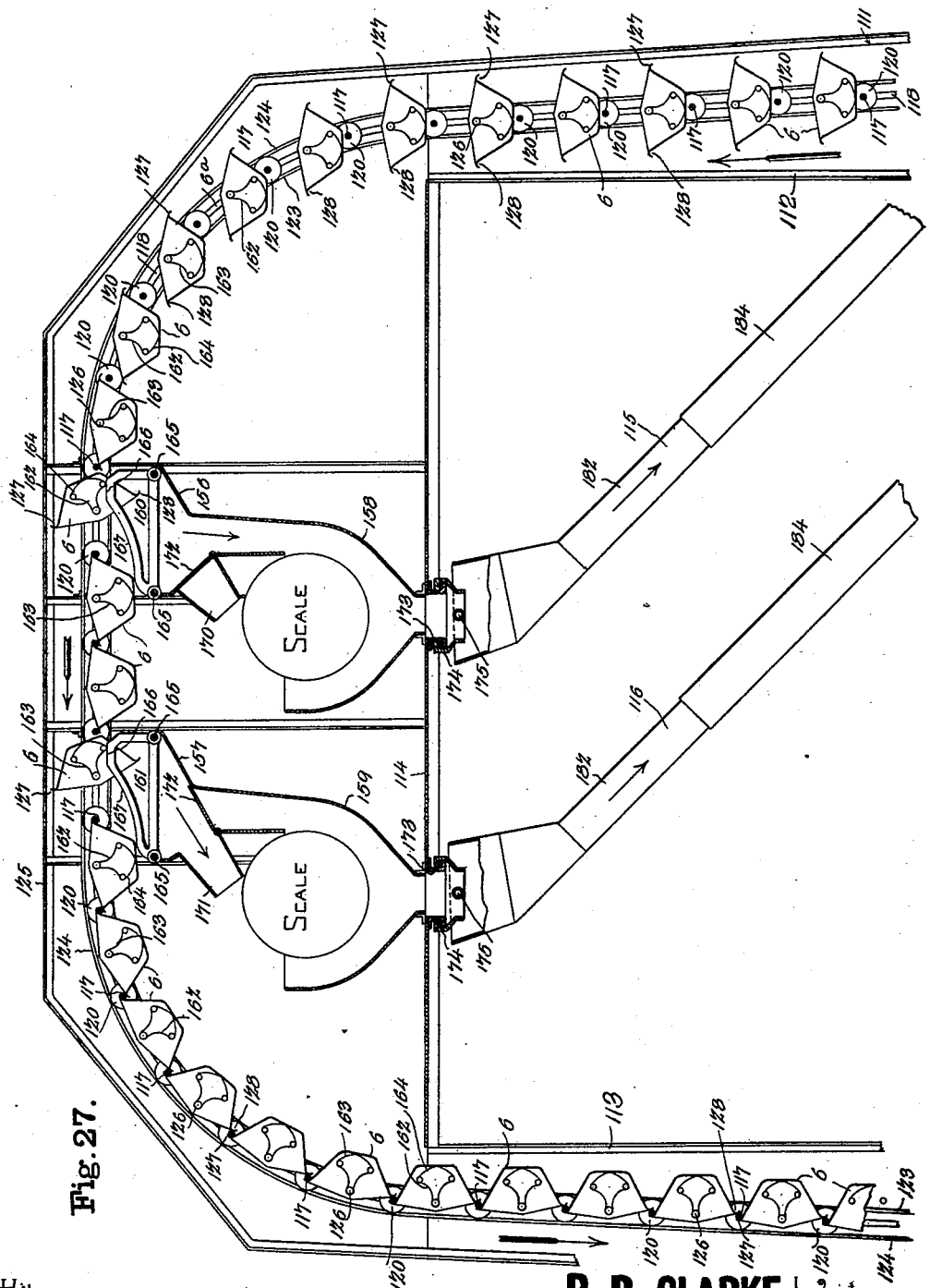

No. 714,150. Patented Nov. 25, 1902.
P. B. CLARKE.
APPARATUS FOR HANDLING MATERIAL IN BULK.
(Application filed Jan. 26, 1901.)
(No Model.) 31 Sheets—Sheet 23.

Witnesses

P. B. CLARKE Inventor

By C. A. Snow & Co.
Attorneys

No. 714,150. Patented Nov. 25, 1902.
P. B. CLARKE.
APPARATUS FOR HANDLING MATERIAL IN BULK.
(Application filed Jan. 26, 1901.)
(No Model.) 31 Sheets—Sheet 24.
Fig. 30.
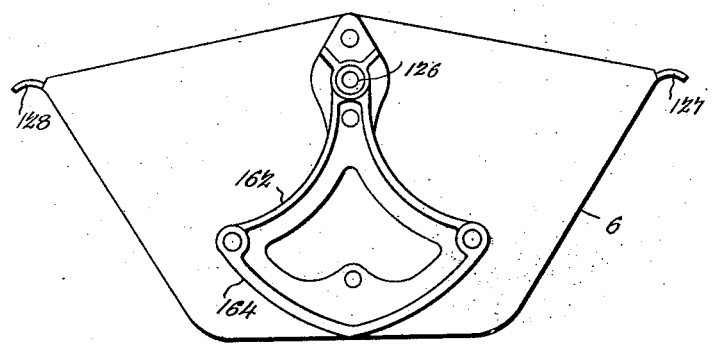
Fig. 31.
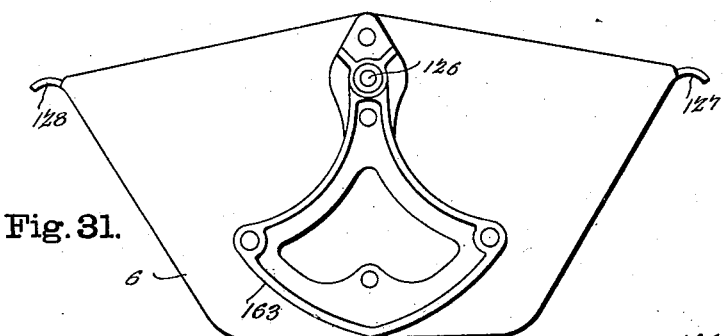
Fig. 32.
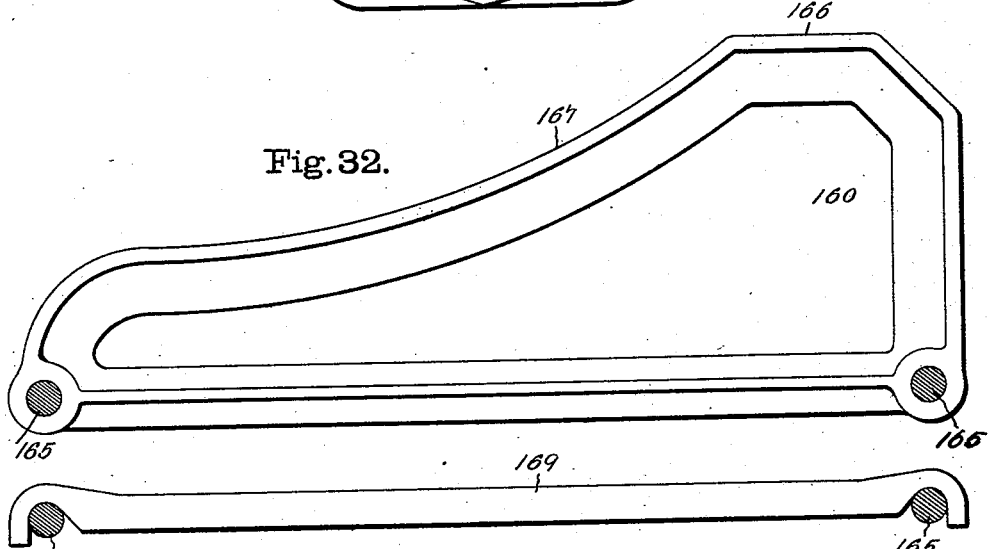
Fig. 33.
Witnesses
P. B. CLARKE, Inventor
By C. A. Snow & Co.
Attorneys No. 714,150. Patented Nov. 25, 1902.
P. B. CLARKE.
APPARATUS FOR HANDLING MATERIAL IN BULK.
(Application filed Jan. 26, 1901.)
(No Model.) 31 Sheets—Sheet 26.

Witnesses
P. B. CLARKE Inventor
By C. A. Snow & Co.
Attorneys

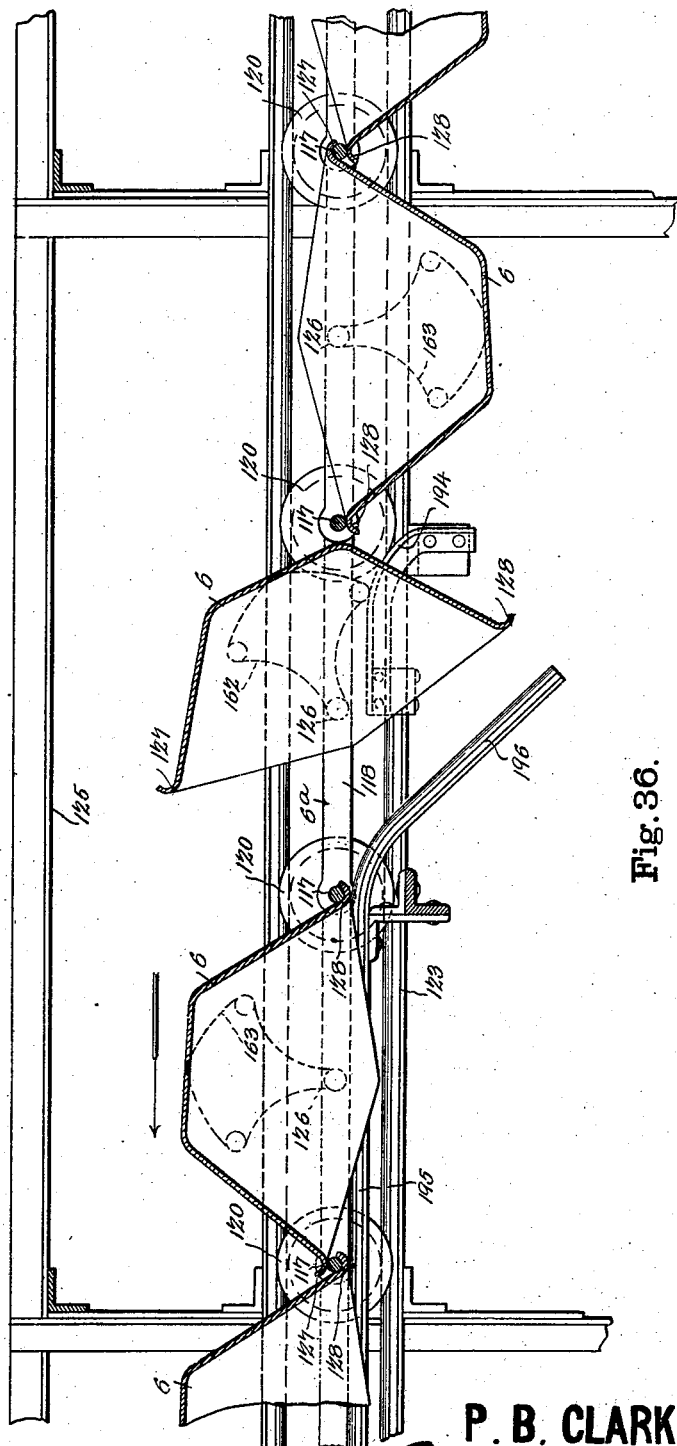

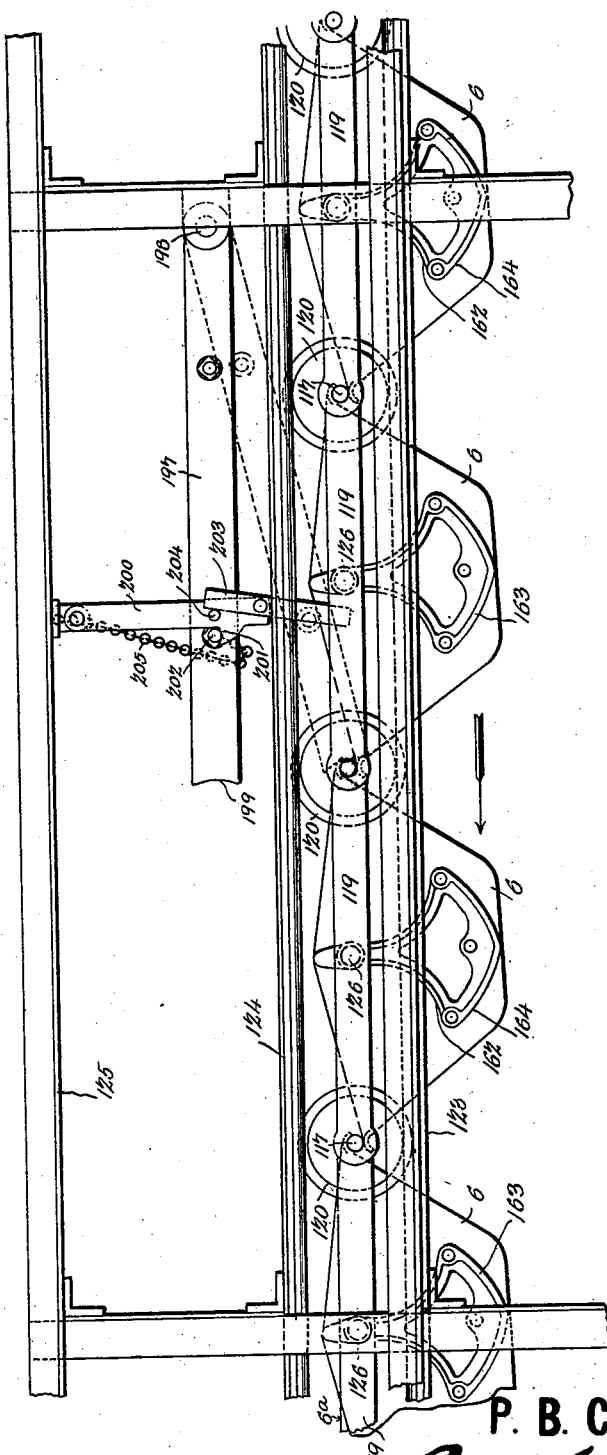

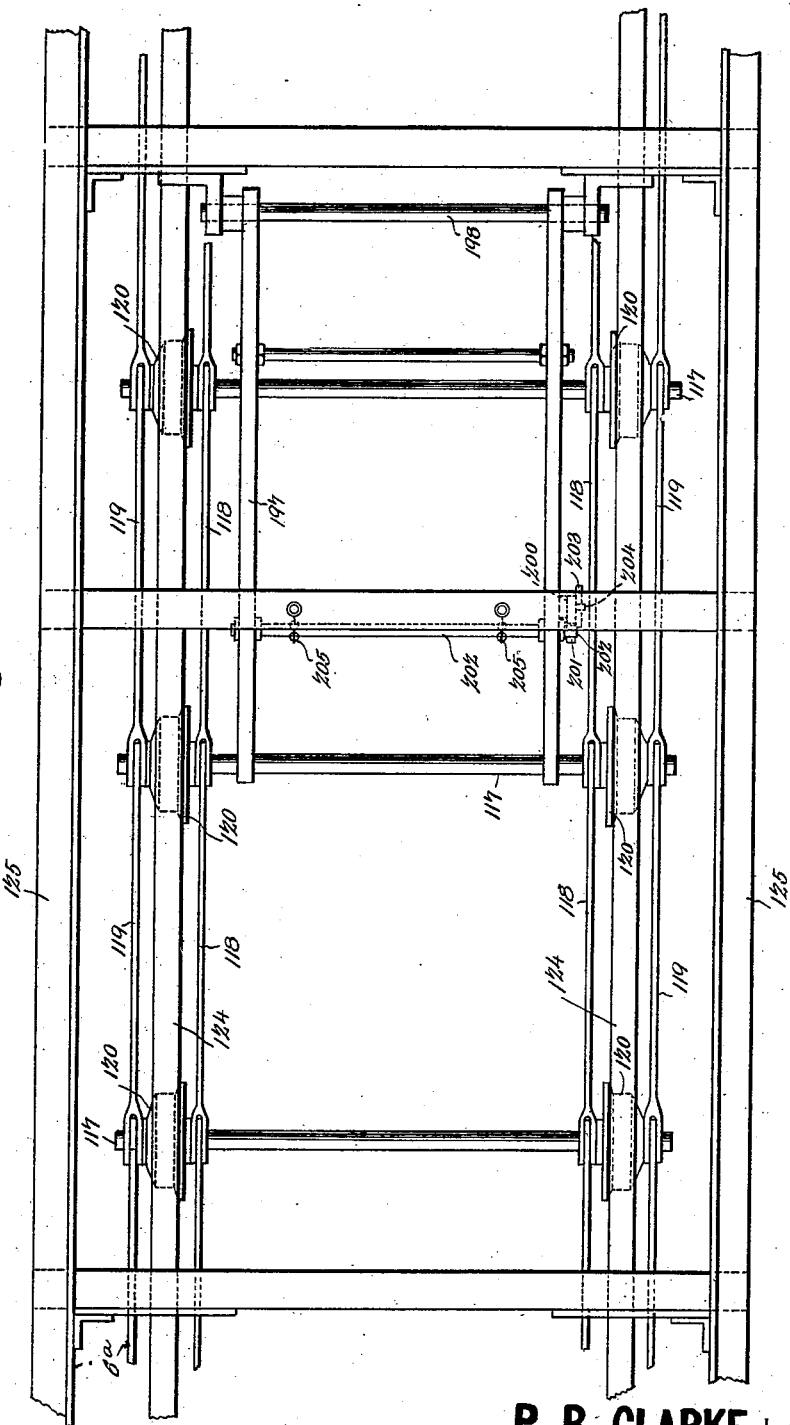

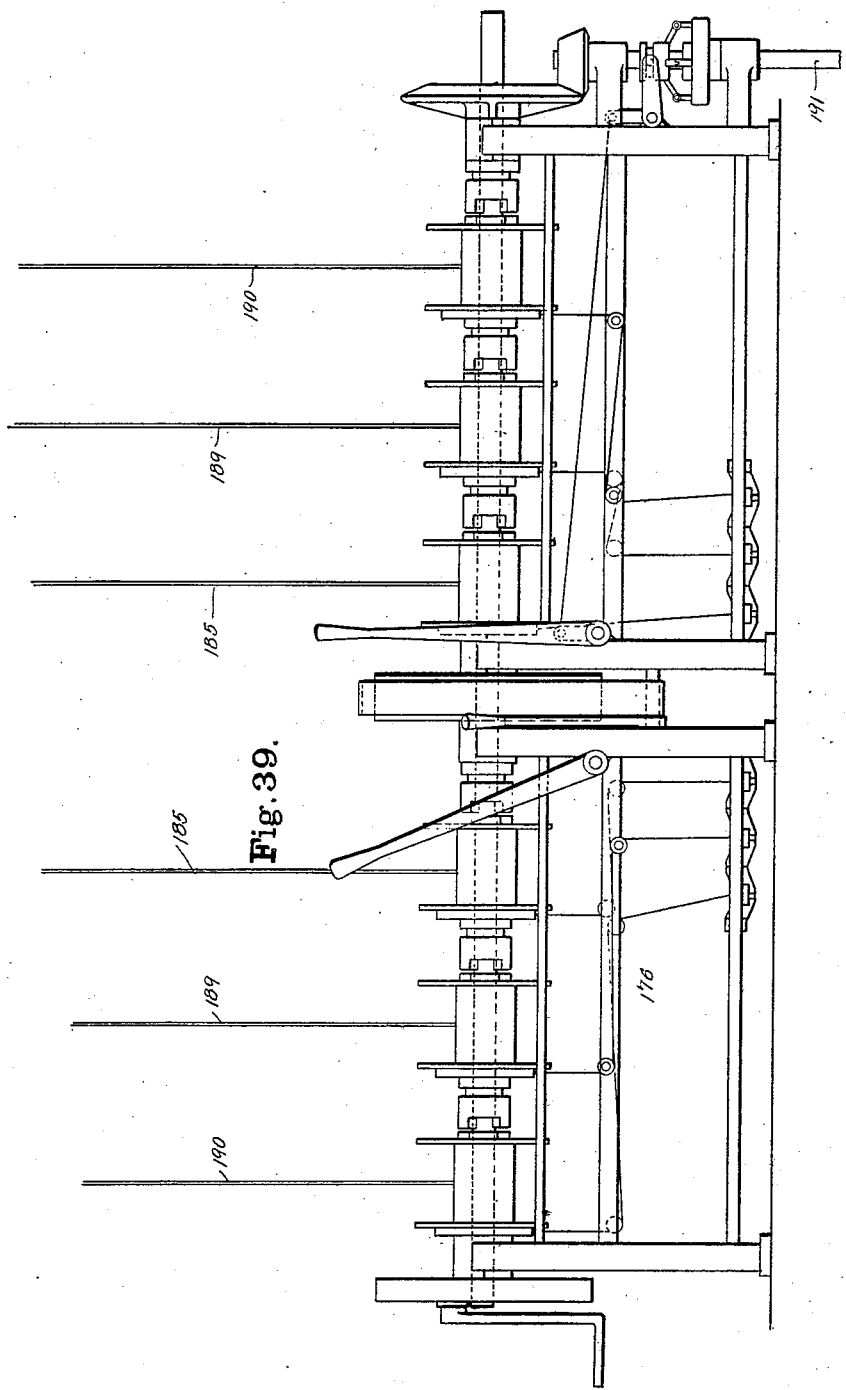

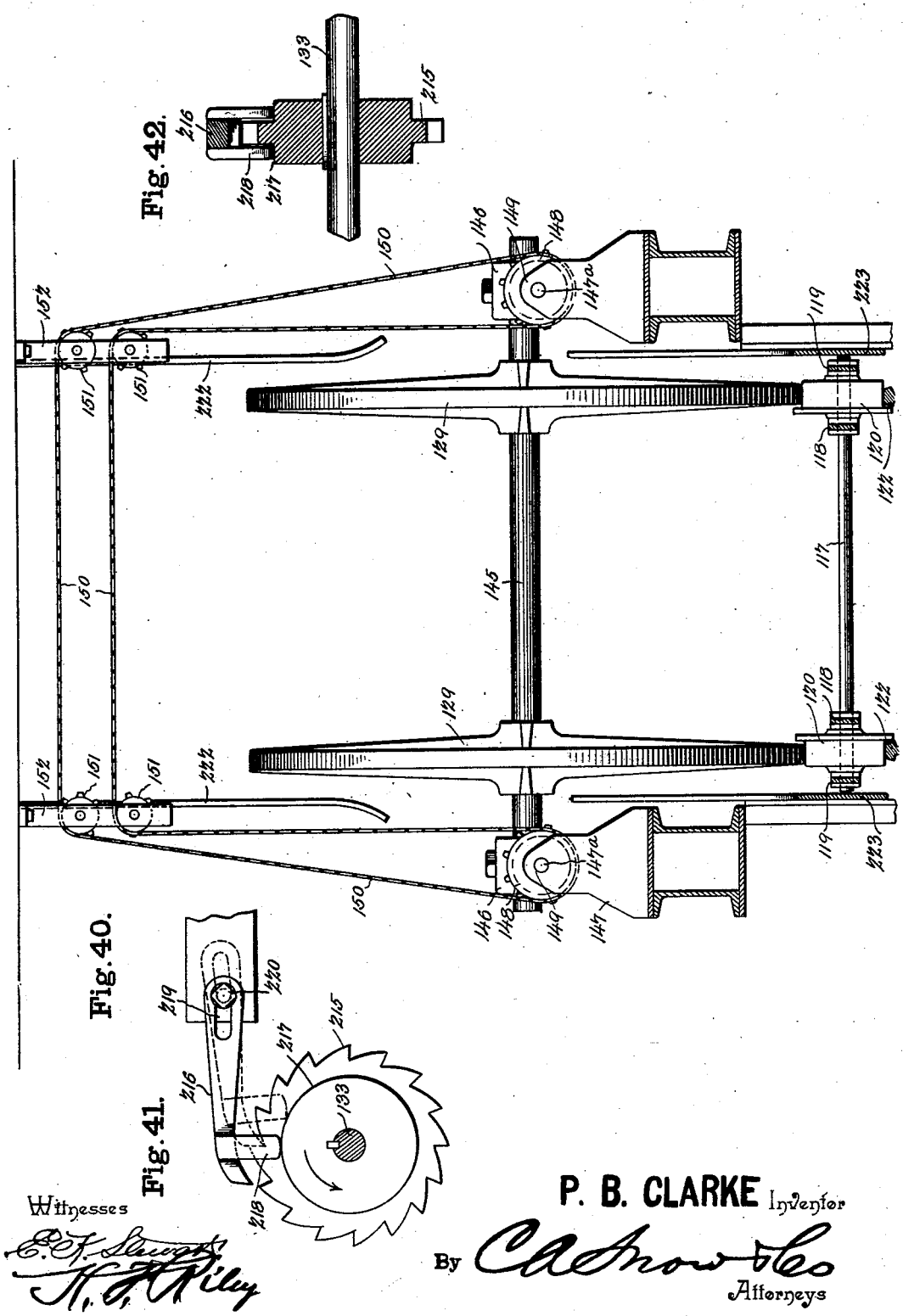

UNITED STATES PATENT OFFICE.

PEETE B. CLARKE, OF NEW YORK, N. Y.

APPARATUS FOR HANDLING MATERIAL IN BULK.

SPECIFICATION forming part of Letters Patent No. 714,150, dated November 25, 1902.

Application filed January 26, 1901. Serial No. 44,778. (No model.)

*To all whom it may concern:*

Be it known that I, PEETE B. CLARKE, a citizen of the United States, residing at New York, in the county of New York and State of New York, have invented a new and useful Apparatus for Handling Material in Bulk, of which the following is a specification.

The invention relates to improvements in apparatus for handling material in bulk.

The object of the present invention is to improve the construction of apparatus for handling material in bulk and to provide an apparatus of this character designed for loading vessels at a wharf or offshore, and particularly for supplying such vessels with coal, and adapted to be applied to a barge or analogous vessel and capable of rapidly transferring the contents of the same to the vessel to be loaded and of simultaneously weighing the material.

Another object of the invention is to provide adjustable and extensible chutes adapted to be turned in any direction and to be arranged at any desired position at either side of the barge and capable of being readily handled to change them from one position to another to enable the material to be delivered in the desired quantities to different portions of a vessel.

Furthermore, the invention has for its object to provide means for automatically dumping the contents of the buckets of the conveyer into the chutes and for automatically reversing the buckets, so that they will reënter the barge in proper position for receiving another charge.

Furthermore, the invention has for its object to provide a safety-stop for automatically locking the conveyer against backward movement to prevent the loaded flight of the conveyer in event of breakage from moving backward under the influence of its load and injuring the apparatus.

Furthermore, the invention has for its object to provide a barge divided into separate compartments or bins and provided at the opposite sides thereof with upwardly-swinging dumping-gates and at the bottoms of the same with sliding doors or cut-offs and to enable the sliding doors or cut-offs, the dumping-gates, and agitators to be succesively operated, whereby the contents of the barge will be gradually delivered to the buckets of the conveyer to reduce the strain on the latter to a minimum.

Another object of the invention is to prevent the buckets from being overloaded, so that there will be no liability of the coal or other material spilling out of the buckets while the latter are traveling from the bins or compartments of the barge to the chutes.

It is also the object of the invention to enable hydraulic rams to be employed for lifting the dumping-gates and to enable such rams to be located at opposite sides of the gates and to have their power automatically equalized, so that the dumping-gates will be raised uniformly and prevented from sagging or twisting under the weight of the coal or other material irrespective of the uneven distribution of the same on the dumping-gates.

The invention consists in the construction and novel combination and arrangement of parts hereinafter fully described, illustrated in the accompanying drawings, and pointed out in the claims hereto appended.

Figure 2:
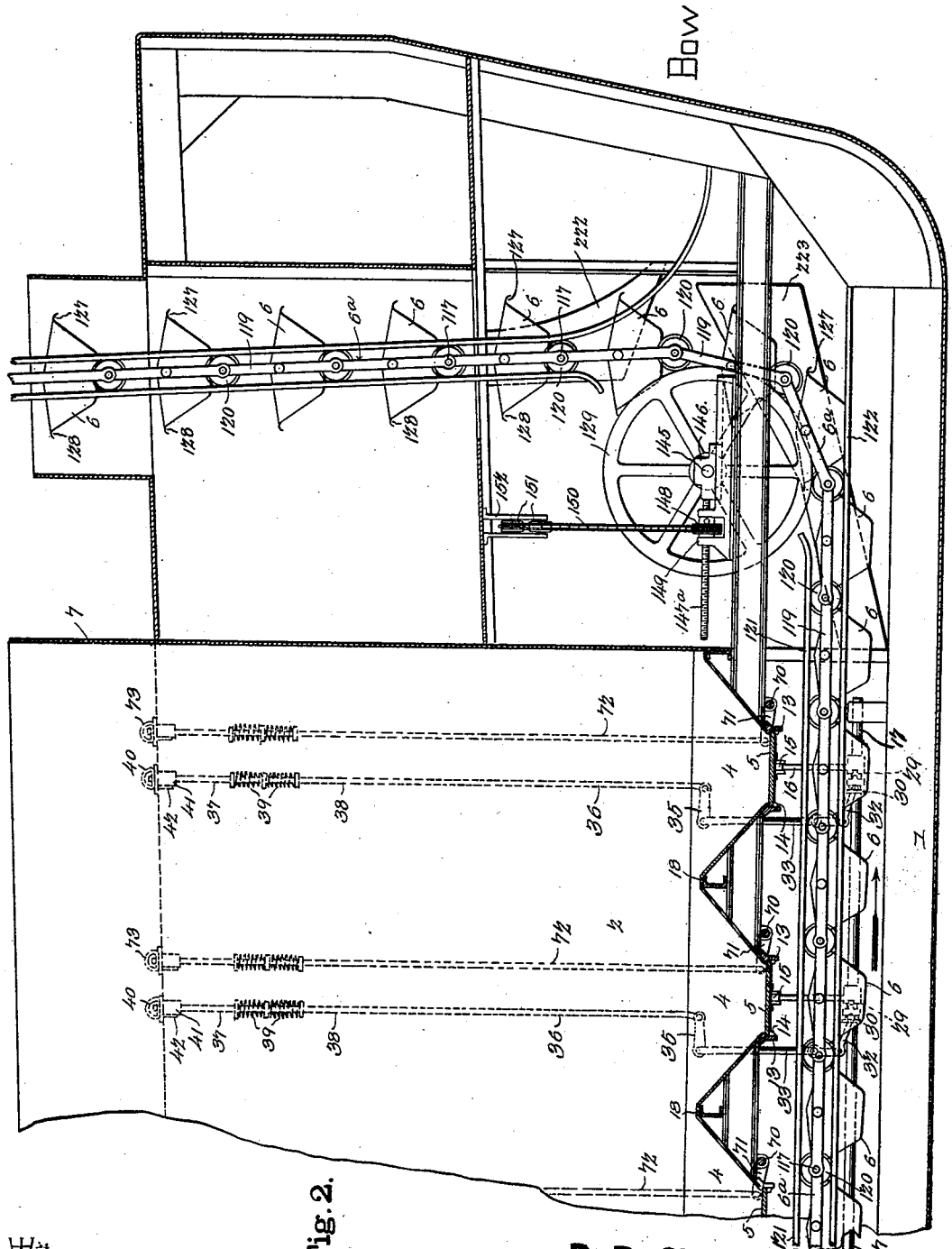
Figure 3:
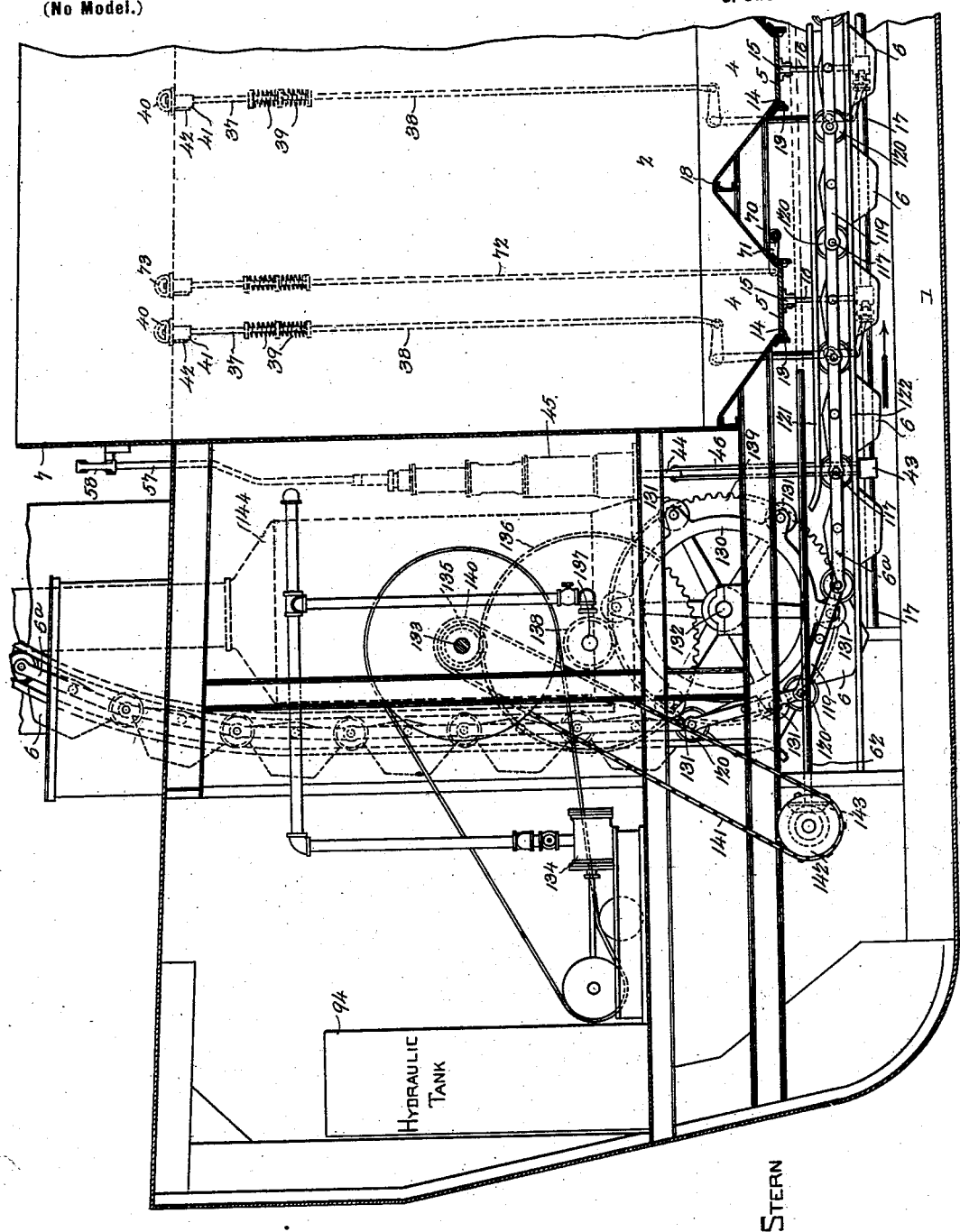
Figure 4:
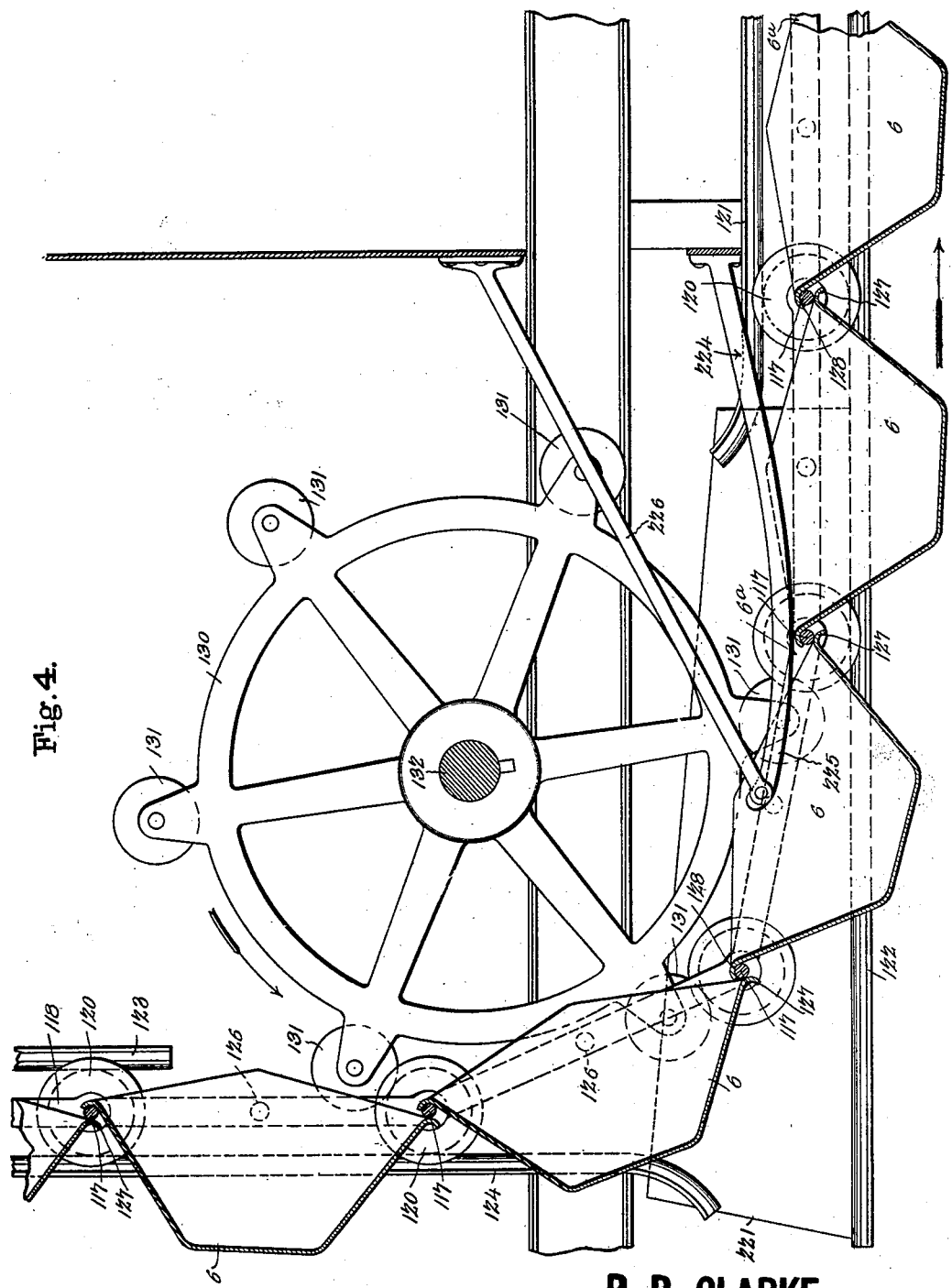
Figure 5:
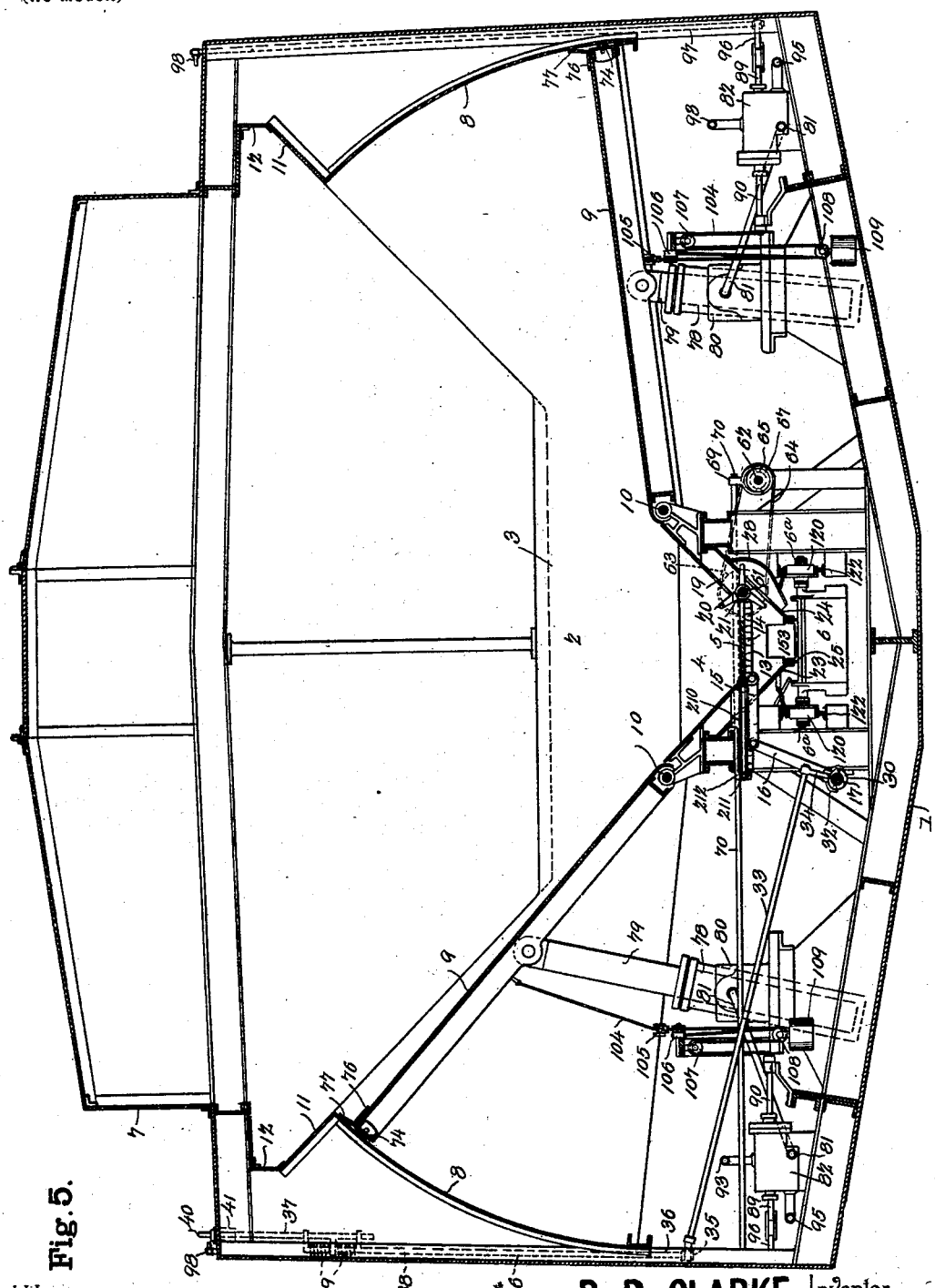
Figure 6:
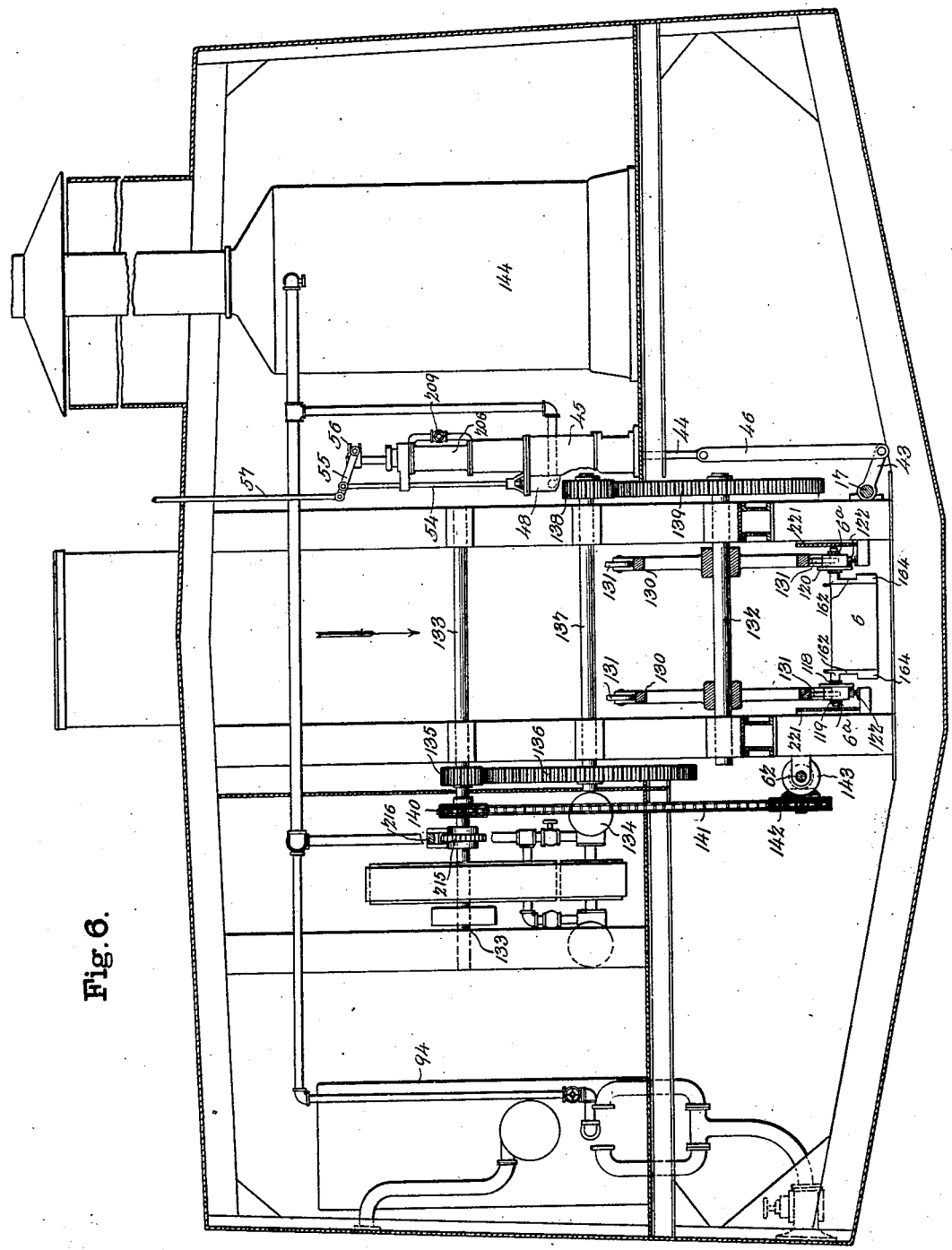
Figure 7:
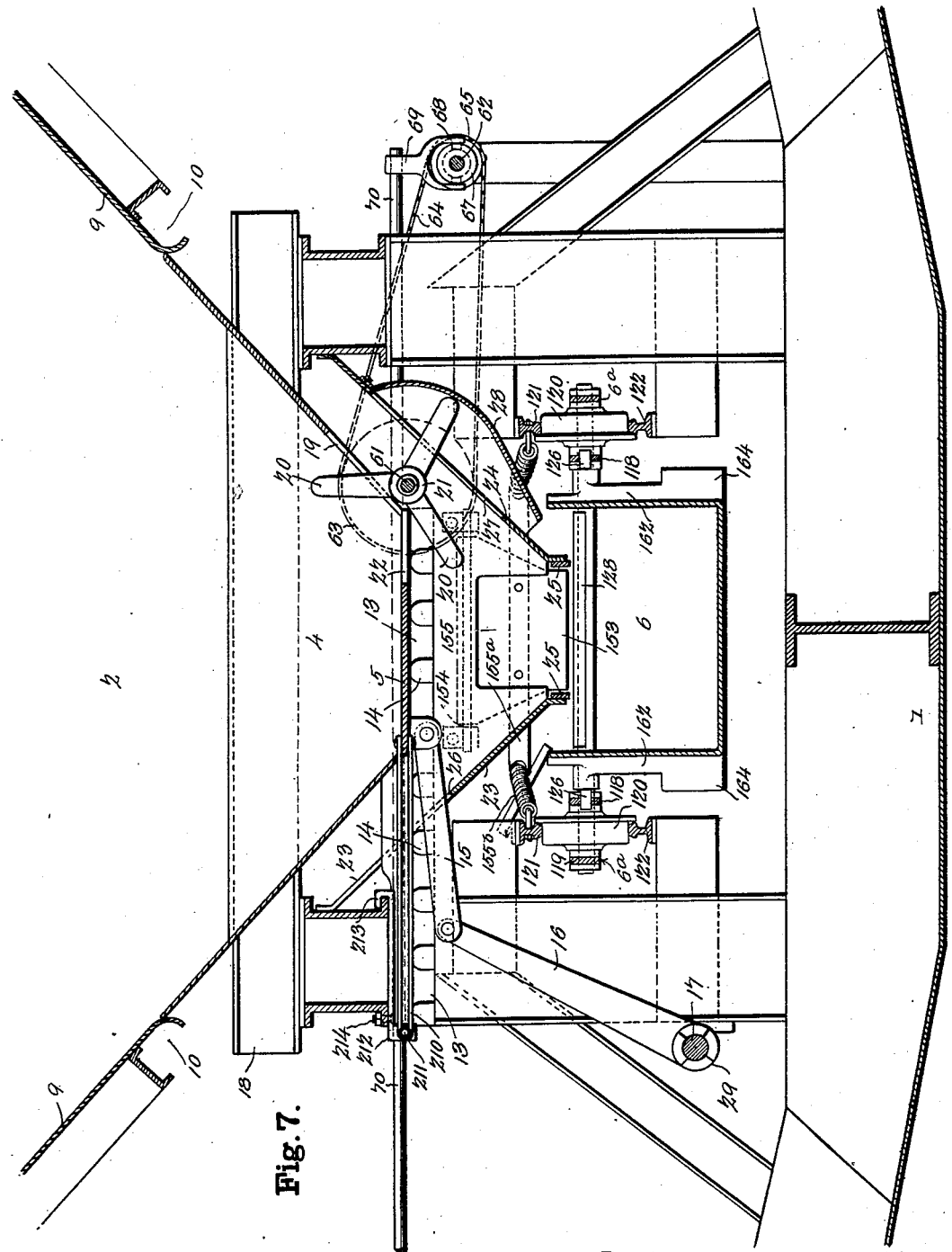
Figure 8:
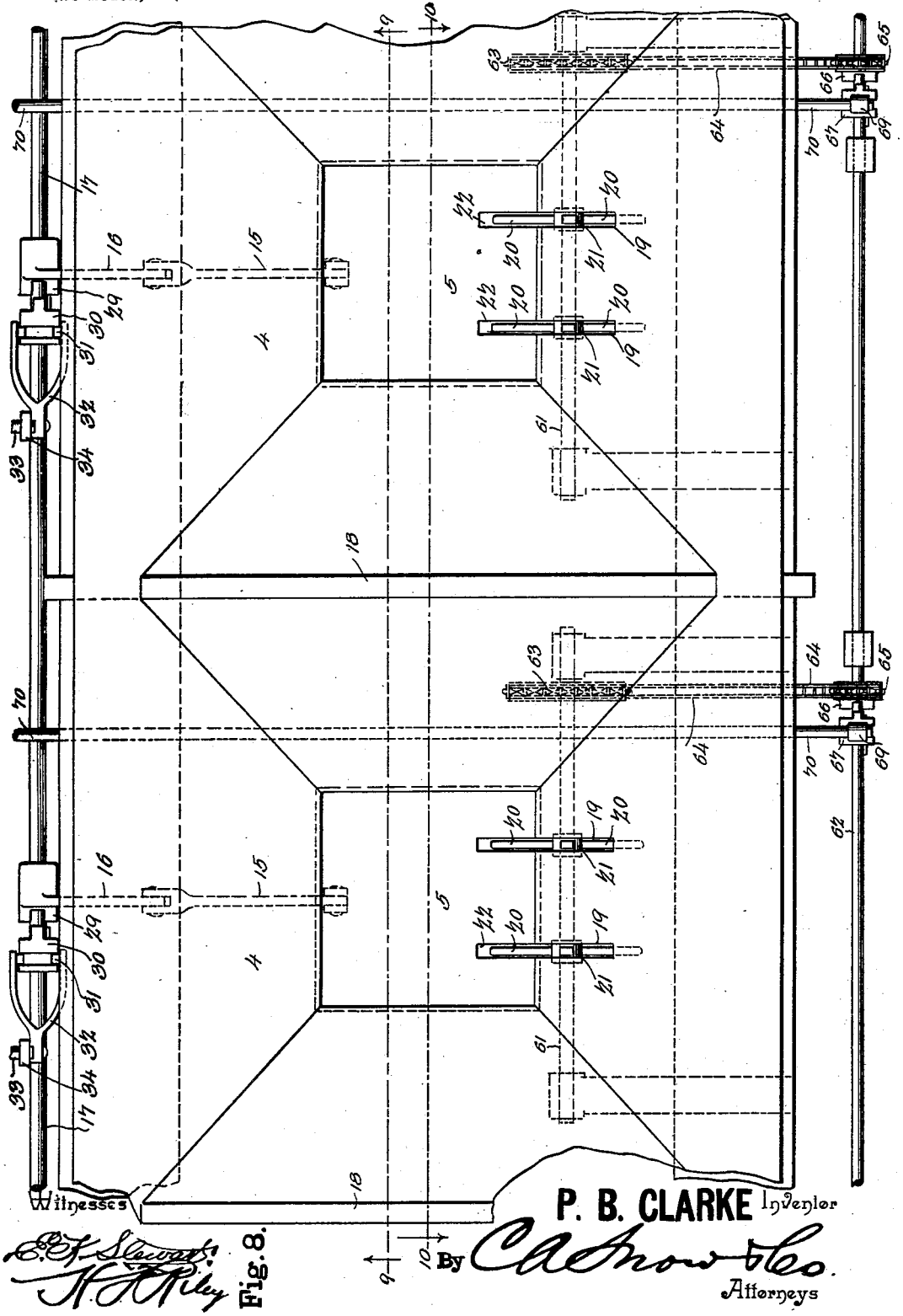
Figure 9:
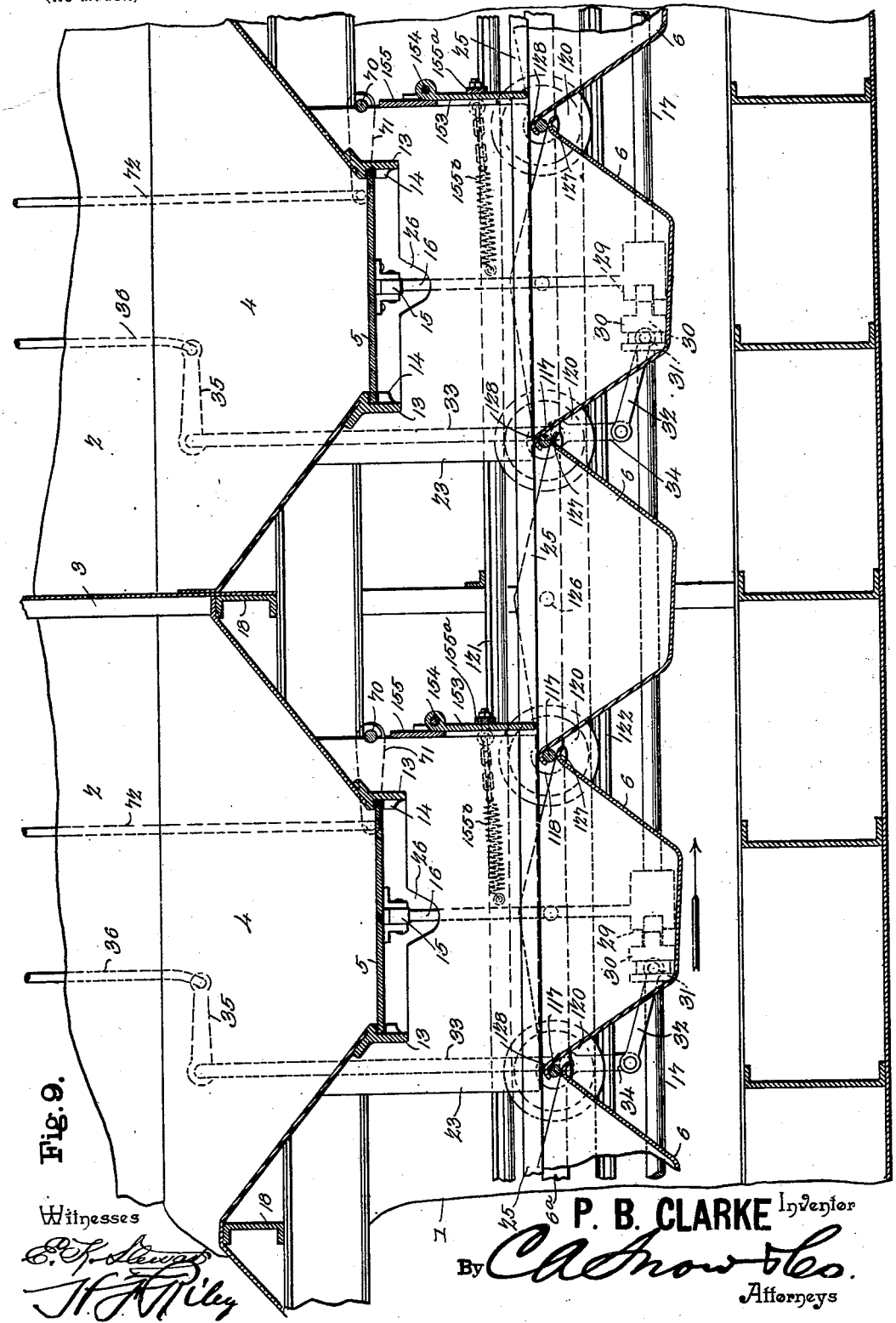
Figure 10:
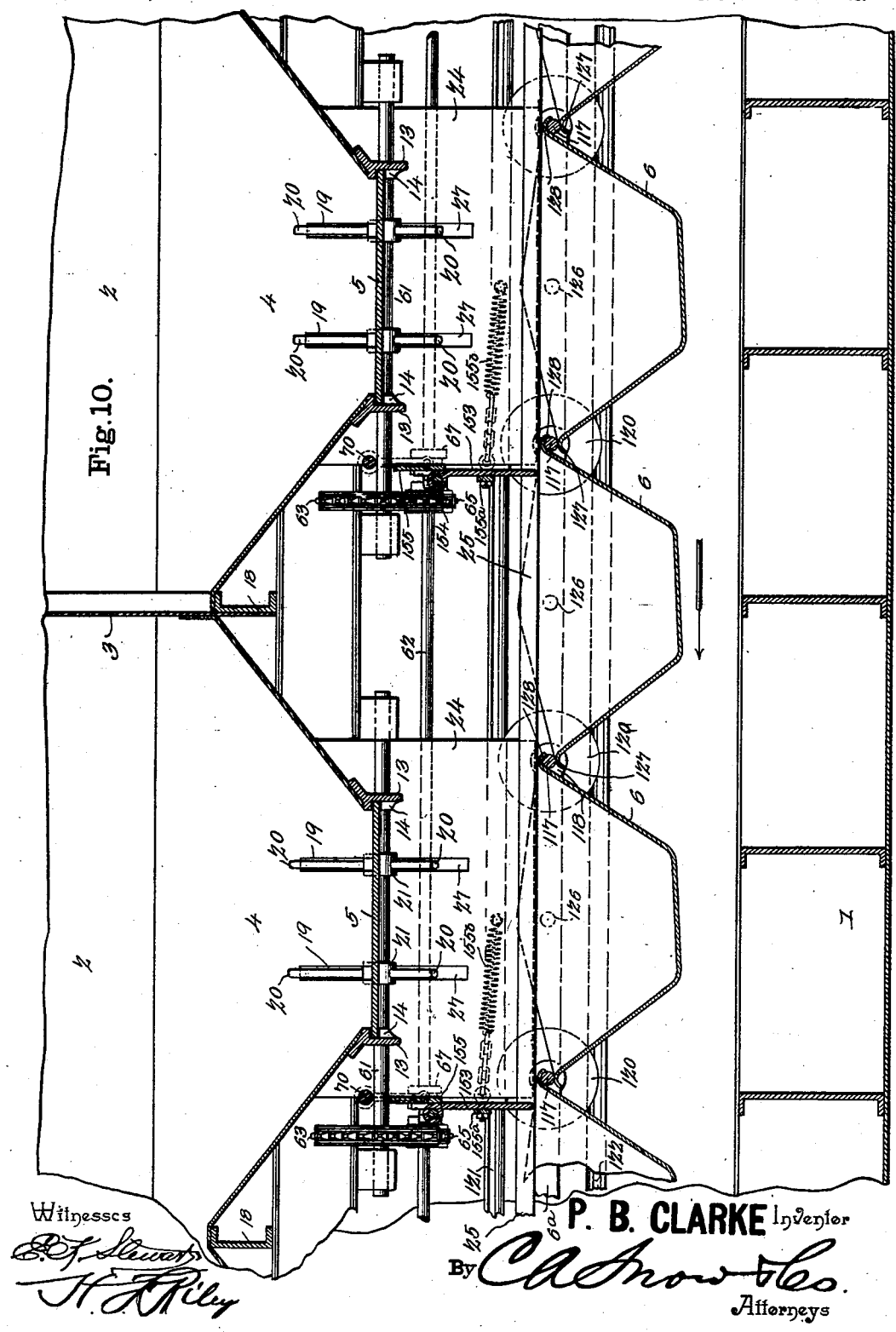
Figure 11:
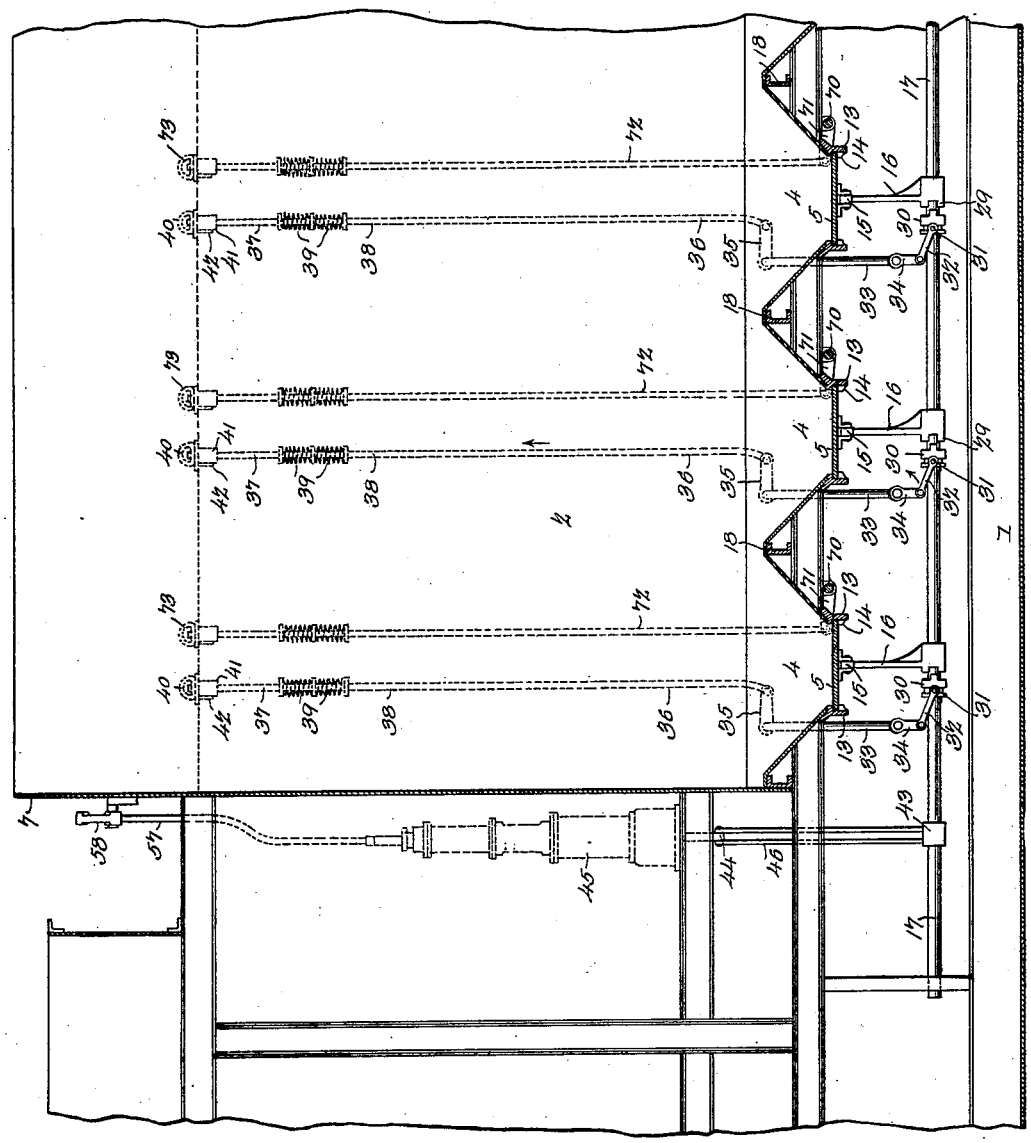
Figure 12:
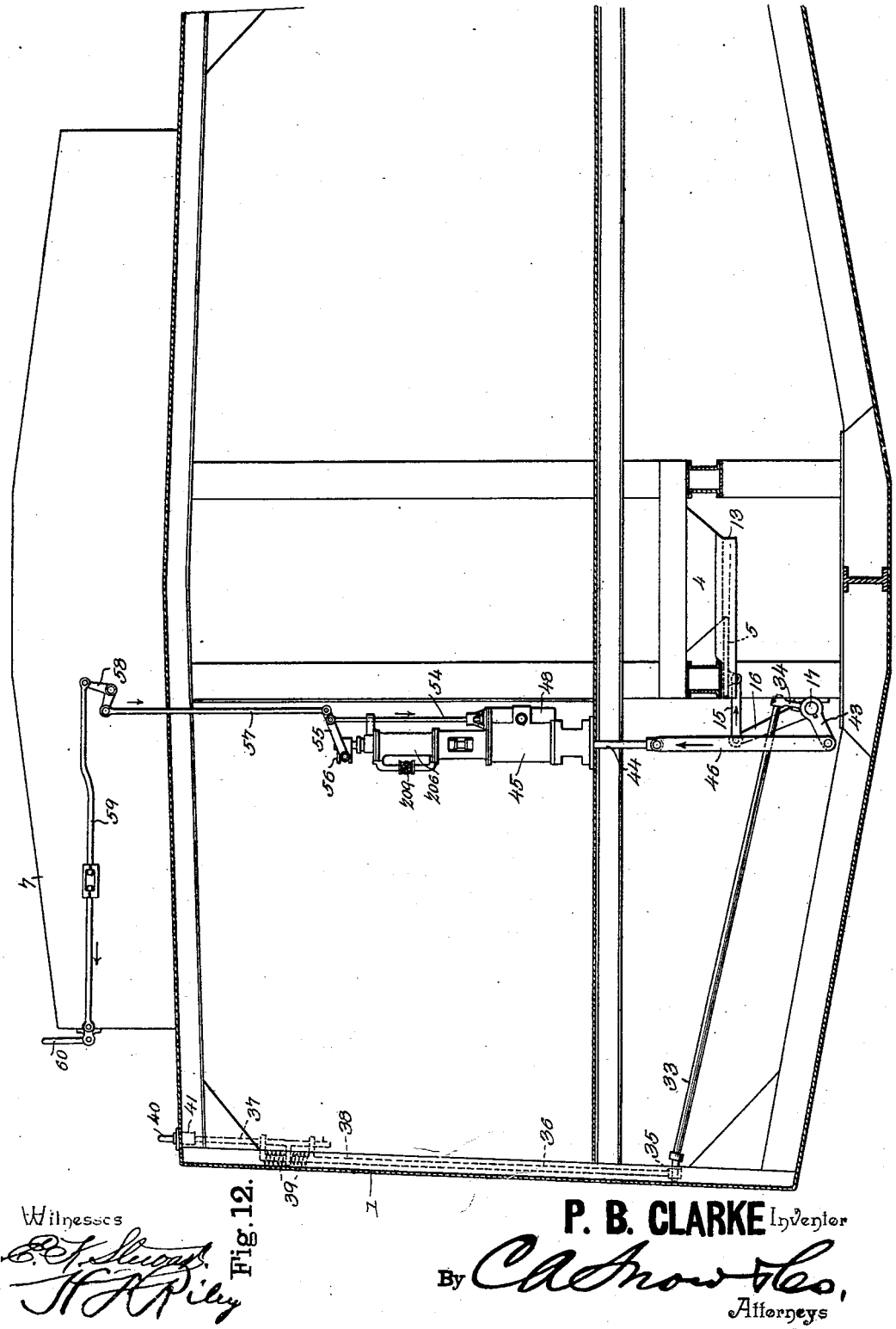
Figure 15:
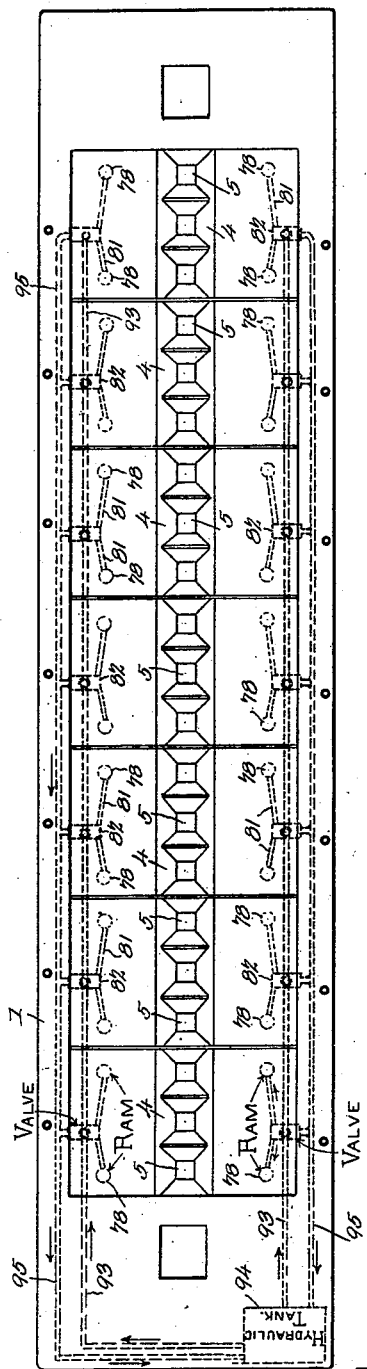
Figure 16:
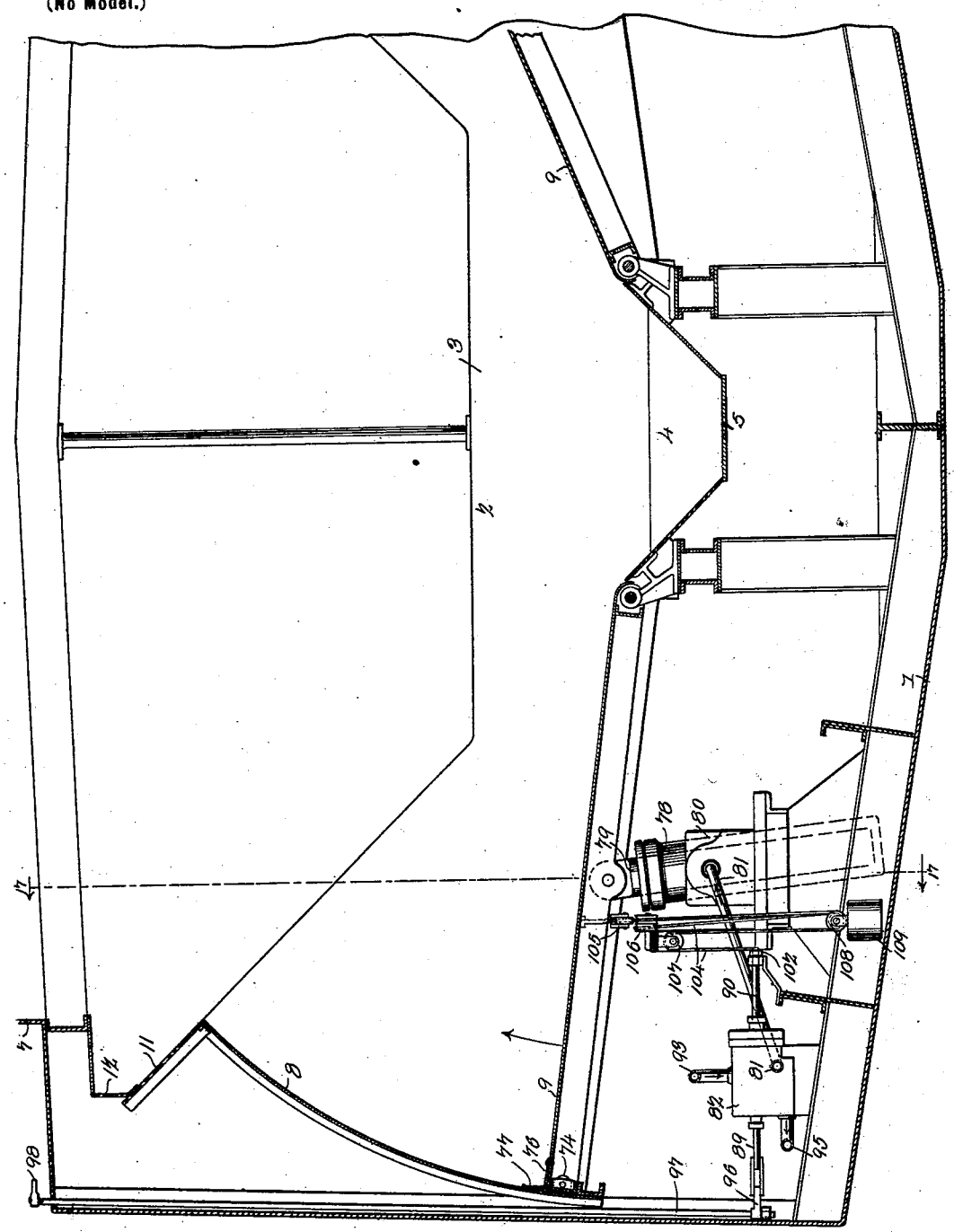
Figure 21:
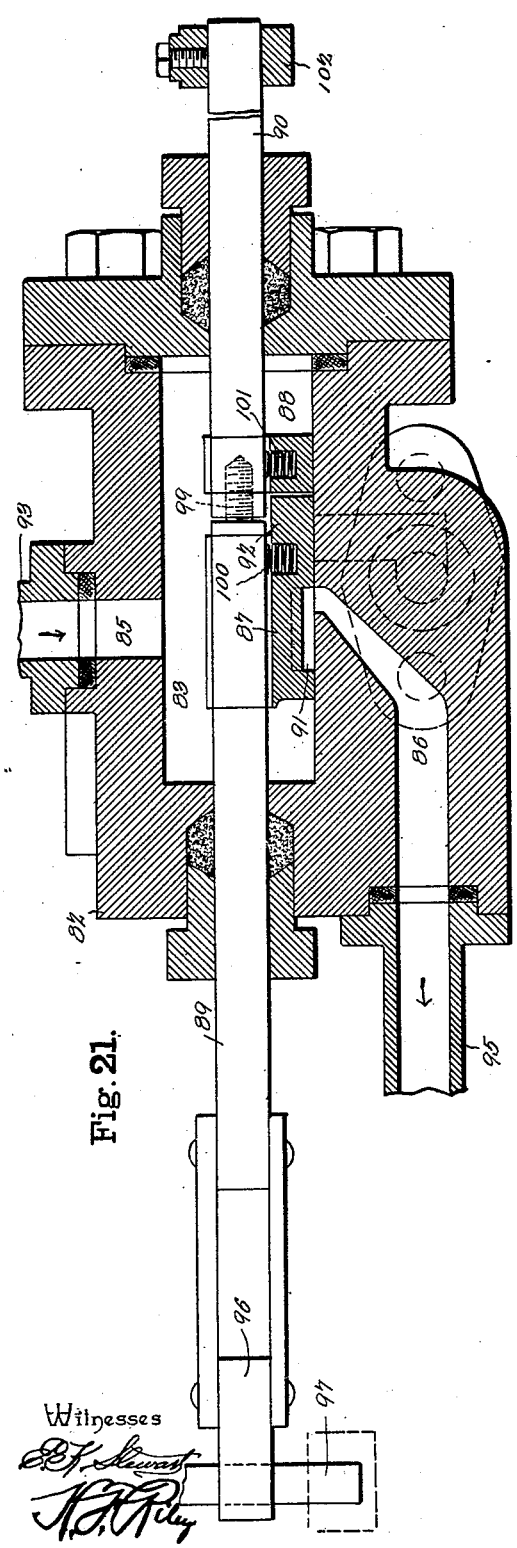
Figure 22:
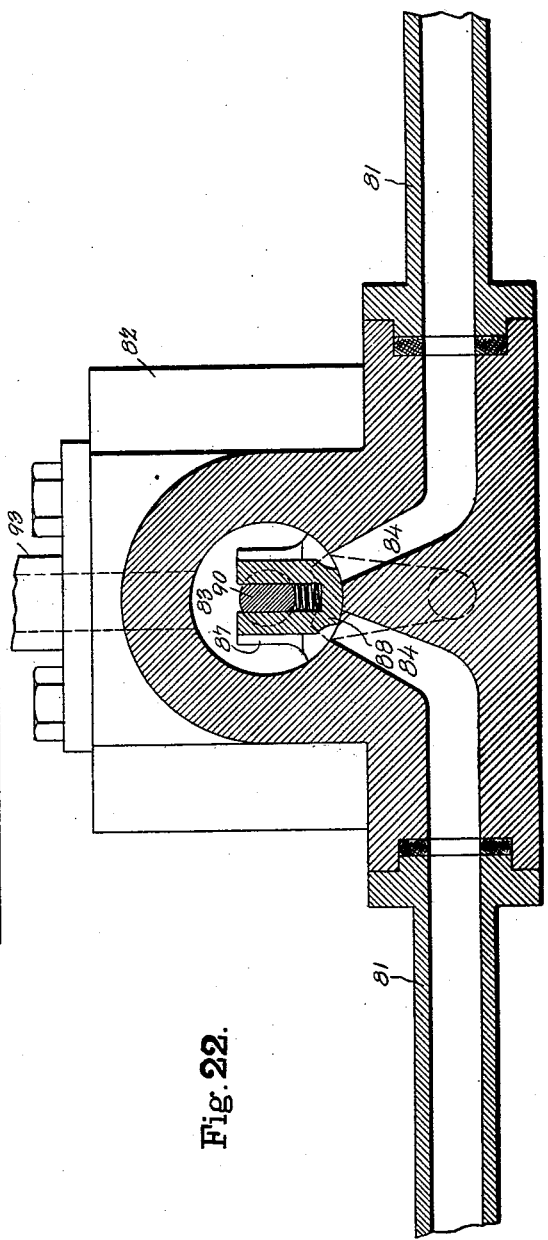
Figure 23:
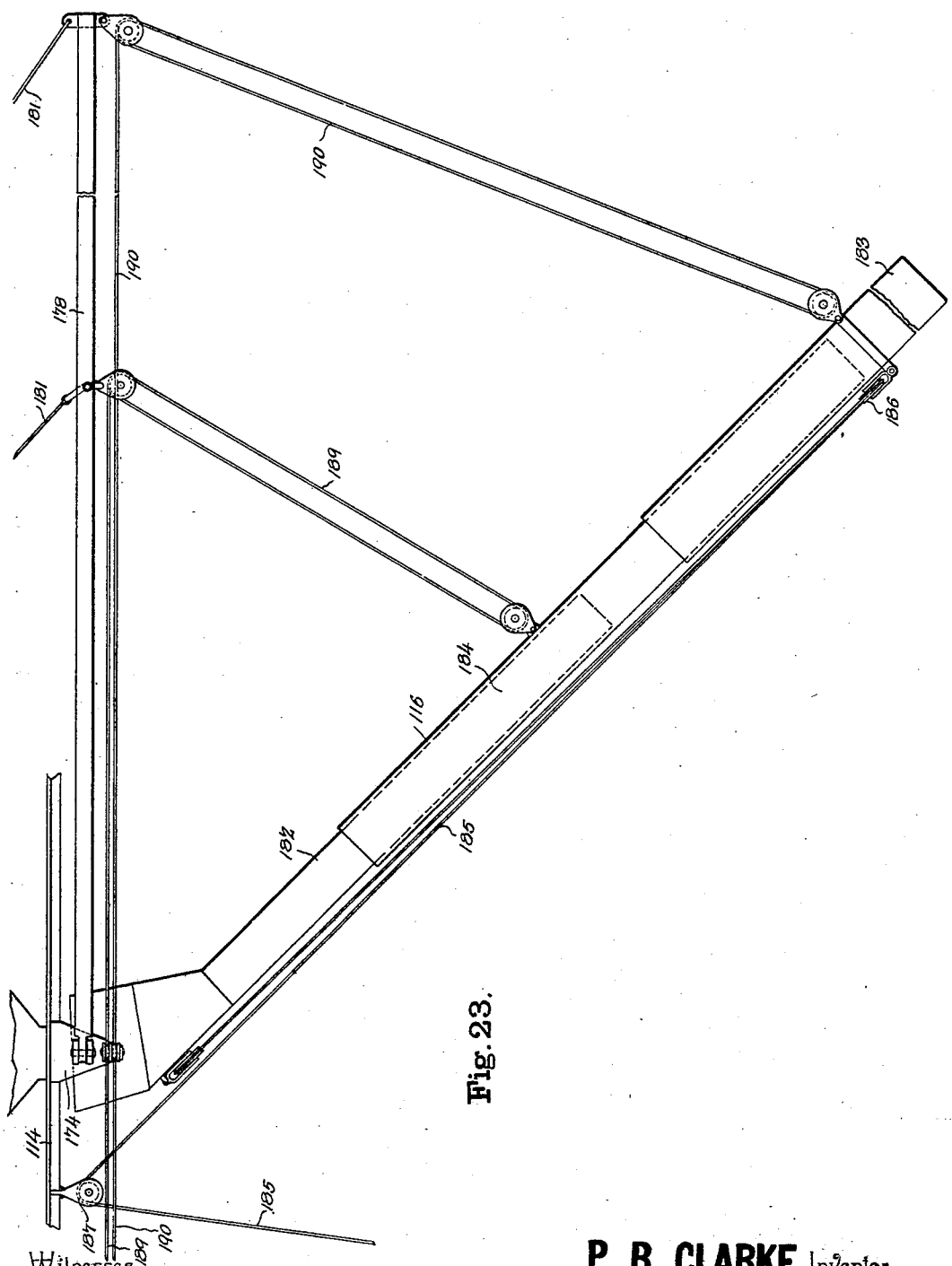
Figure 28:
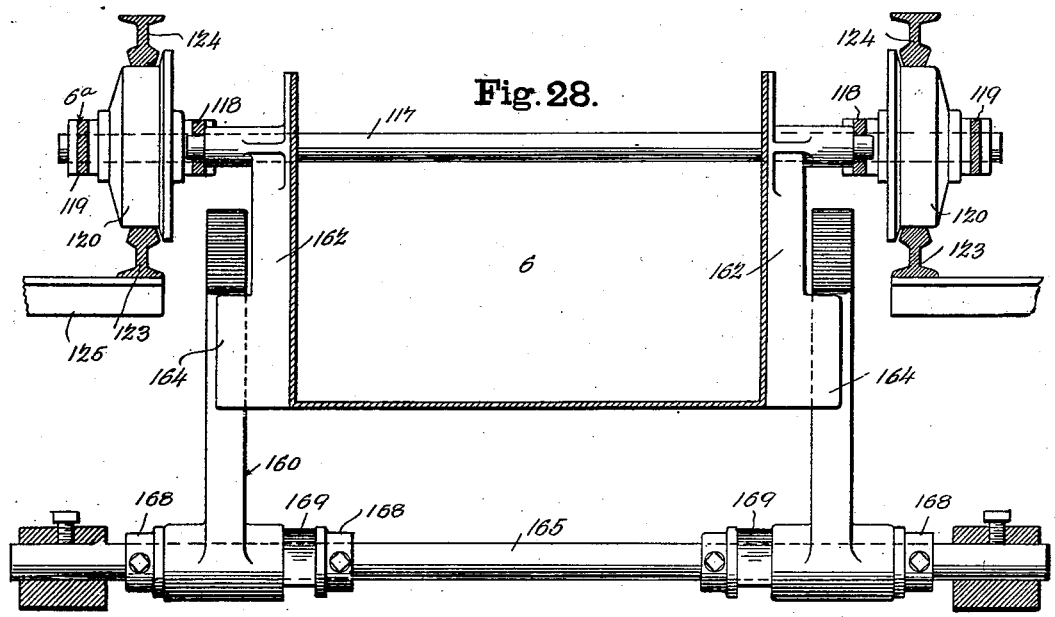
Figure 29:
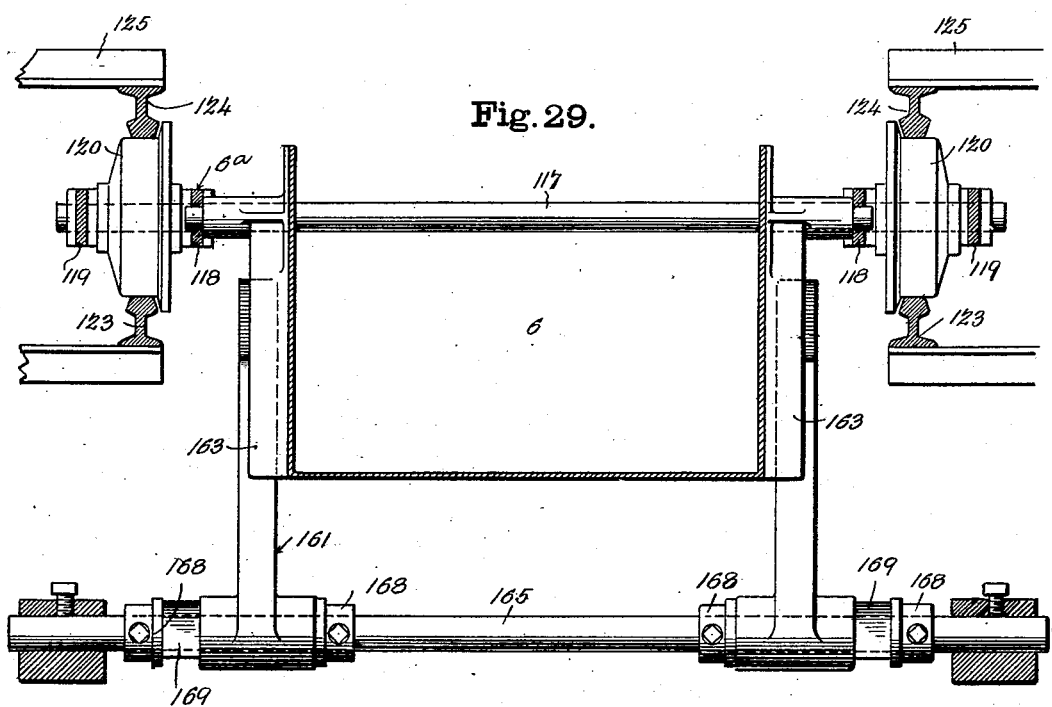
Figure 34:
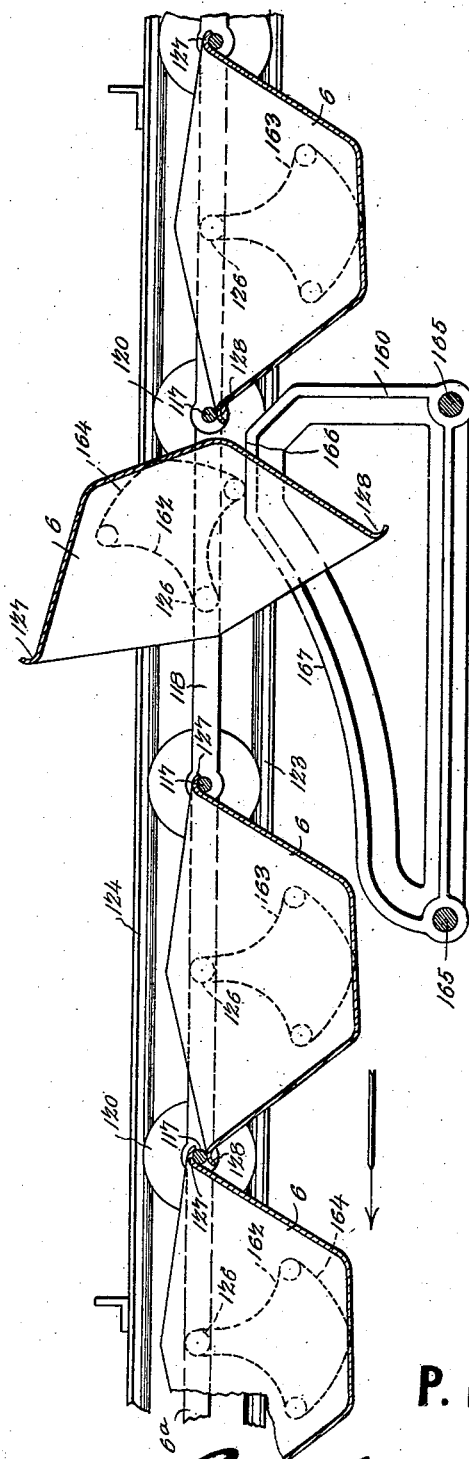
Figure 35:
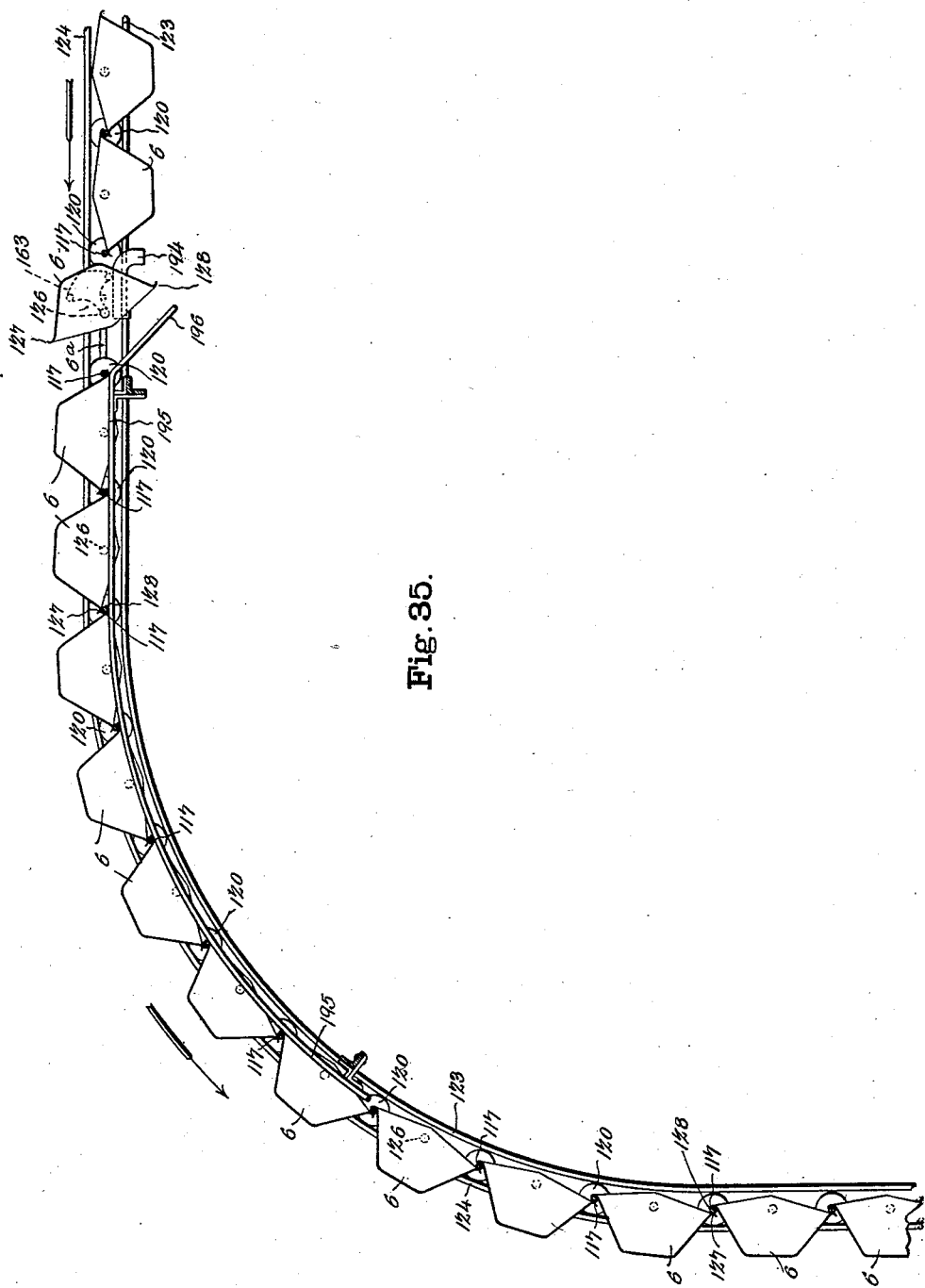

In the drawings, Figure 1 is a diagrammatic longitudinal sectional view of the barge, illustrating the general arrangement of the parts. Fig. 2 is a vertical longitudinal sectional view of the bow of the barge. Fig. 3 is a similar view of the stern of the barge. Fig. 4 is an enlarged sectional view illustrating the arrangement of the drive-wheel for actuating the conveyer. Fig. 5 is a transverse sectional view of the barge looking forward. Fig. 6 is a transverse sectional view of the stern of the barge looking forward. Fig. 7 is an enlarged transverse sectional view of the lower portion of one of the bins or compartments of the barge, illustrating the arrangement of the conveyer, the trimmer, the sliding door or cut-off, and the agitator. Fig. 8 is an enlarged detail plan view illustrating the construction of the lower portion of the bins or compartments. Fig. 9 is an enlarged vertical sectional view on the line 9 9 of Fig. 8. Fig. 10 is a similar view on the line 10 10 of Fig. 8. Fig. 11 is an enlarged sectional view illustrating the construction for operating the sliding doors or cut-offs of the bins or compartments. Fig. 12 is a transverse sectional view illustrating the construction for actuating the rock-shaft for sliding the doors or cut-offs. Figs. 13 and 14 are sectional views illustrating the construction of the steam-cylinder for actuating the rock-shaft which is connected with the sliding doors or cut-offs. Fig. 15 is a diagrammatic view illustrating the arrangement of the hydraulic rams for raising the dumping-gates of the barge. Fig. 16 is a transverse sectional view illustrating the arrangement of the hydraulic rams. Fig. 17 is a vertical sectional view on the line 17 17 of Fig. 16. Fig. 18 is a plan view of one of the dumping-gates. Fig. 19 is a detail sectional view of the same on the line 19 19 of Fig. 18. Figs. 20, 21, and 22 are detail views illustrating the construction of the equalizing or compensating valve for controlling the hydraulic rams. Fig. 23 is an enlarged detail view of one of the chutes. Fig. 24 is an enlarged detail view illustrating the arrangement of the chutes and the booms. Figs. 25 and 26 are detail views of the boom. Fig. 27 is a vertical sectional view of the upper portion of the conveyer and the chutes, illustrating the manner of dumping the buckets. Figs. 28 and 29 are detail views illustrating the arrangement of the dumping-cams. Figs. 30 and 31 are detail views of the buckets. Fig. 32 is an enlarged detail view of one of the dumping-cams. Fig. 33 is a detail view of one of the lock-bars for holding the dumping-cams against lateral movement. Fig. 34 is an enlarged detail sectional view illustrating the manner of dumping the buckets. Fig. 35 is a detail view of the rear portion of the upper flight of the endless conveyer, illustrating the arrangement of the reversing-cam. Fig. 36 is an enlarged sectional view of the same. Fig. 37 is a detail view illustrating the arrangement of the safety-stop. Fig. 38 is a plan view of the same. Fig. 39 is an elevation of the winch, illustrating the arrangement of the series of drums. Fig. 40 is a sectional view illustrating the construction for controlling the tension device. Figs. 41 and 42 are detail views illustrating the construction of the safety pawl and ratchet.

Like numerals of reference designate corresponding parts in all the figures of the drawings.

1 designates a barge provided with a longitudinal series of bins or compartments 2, separated from one another at the bottom by partial transverse bulkheads or partitions 3, and each bin or compartment is provided at its bottom with a series of depending hoppers 4, having sliding doors or cut-offs 5, adapted to be opened to permit the coal to be discharged from the bins or compartments into buckets 6 of an endless conveyer 6ª. The endless conveyer has one of its flights arranged beneath the longitudinal series of bins or compartments, and the cut-offs or doors of the compartments are adapted to be successively opened by the means hereinafter described, so that the cut-offs or doors of only one compartment or bin will be open at one time, whereby the strain on the conveyer incident to filling the buckets thereof with coal or other material will be reduced to a minimum. The bins or compartments, which terminate short of the ends of the barge, are spaced sufficiently from the bottom of the same to provide the necessary room for the bottom horizontal flight of the conveyer, and the said bins or compartments may be supported by any suitable structure. The barge is provided with a suitable hood 7, extending over the bins or compartments, and the latter have curved side walls 8, extending upward from the outer edges of upwardly-swinging dumping-gates 9, which are hinged at their inner edges 10 at opposite sides of the series of depending hoppers 4 of each bin or compartment, and the said gates 9 are adapted to be swung upward by the means hereinafter described to the position illustrated at the left-hand side of Fig. 5 of the accompanying drawings to arrange them in the same plane as the inclined sides of the depending hoppers 4, whereby the entire contents of the bins are directed into the hoppers. The upper portions or edges of the curved side walls 8 are connected with the deck of the barge by short inclined and vertical walls 11 and 12, the inclined walls 11 being located in the same inclined planes as the inclined sides of the hoppers 4 and the upwardly-swinging doors or gates 9 being adapted to extend across the space between the walls 11 and the inclined sides of the hoppers.

The sliding door 5 is mounted in suitable ways, preferably consisting of opposite horizontal bars 13, provided at intervals with bosses or enlargements 14, rounded at their upper edges, as clearly illustrated in Fig. 7 of the accompanying drawings, to reduce the friction to a minimum and to prevent the material from accumulating on them. Each door is provided at one side with a pair of depending ears arranged at opposite sides of the inner end of a link 15 and pivoted to the same, and the said link 15 extends outward to an arm 16, loosely mounted on a longitudinal rock-shaft 17 and adapted to be coupled thereto and uncoupled therefrom by the means hereinafter described, whereby the sliding doors or cut-offs are adapted to be operated independently of one another, so that one or more may be operated when the rock-shaft is partially rotated.

The sides of the depending tapering portions or hoppers 4 incline downward and inward from the inner hinged edges of the upwardly-swinging dumping-gates, and the end walls of the hoppers 4 incline downward from the lower edges of the transverse bulkheads and from suitable supports located between the bulkheads. Each bin or compartment is preferably provided with three depending hoppers; but the number may be varied, as will be readily apparent. The outer end walls of the end hoppers of the series are located at the bulkheads, and the adjacent upper edges of the inner inclined end walls of the series are suitably secured to the intermediate supports 18, which may consist of angle-iron beams or channel-iron beams or any other form of support.

The walls at one side of the hoppers are provided with slots 19 to permit the passage of arms 20 of agitators 21, and the inner ends of the sliding doors or cut-offs are provided with corresponding slots, which register with the slots 19 and which form openings for the agitators. The agitators are adapted to be rotated by the means hereinafter described to cause the coal or other material to flow downward and to prevent a mass of coal from lodging or arching within the bins or compartments. The material is directed into the buckets of the conveyer, as illustrated in Fig. 7, by oppositely-inclined plates 23 and 24, terminating directly above the buckets and forming supports for longitudinal bars 25. The plate 23 at one side of the barge is provided with a slot or opening 26 to afford a passageway for the link 15, and the plate 24 at the opposite side of the barge is provided with slots or openings 27 to permit the passage of the arms of the agitators. The plate 24 has a guard 28 secured to its lower face and adapted to direct into the buckets any material escaping through the slots or openings of the plate 24.

Each of the arms 16 of the rock-shaft 17 is provided with a clutch-face 29, adapted to interlock with a corresponding clutch-face of a sliding clutch-section 30, whereby the arm of the rock-shaft is coupled to the clutch-section 30. The rock-shaft 17, which is located at one side of the barge, extends longitudinally thereof, and the clutch-sections 30, which are keyed or otherwise secured to the rock-shaft, are adapted to slide thereon to interlock with the arms 16 and to release the latter. Each clutch-section 30 is provided with an annular groove, which is engaged by lugs or projections 31 of the sides of a yoke 32, which is pivoted to an inner arm of a transversely-disposed rock-shaft 33. Each rock-shaft 33 is arranged at an inclination and is journaled in suitable bearings, its inner arm 34 being located above the rock-shaft 17, and the arm 35 at the outer end of the transverse rock-shaft is connected with the lower end of an operating-rod 36. The operating-rod, which extends to the deck and which is adapted to permit the couplings or clutches to be controlled from that point, is composed of yieldingly-connected upper and lower sections 37 and 38, having overlapped adjacent ends. The overlapped inner ends of the upper and lower sections of the operating-rod are slidingly connected and are engaged by coiled springs 39, which are adapted to permit a limited independent movement of the sections. The upper section 37 is provided with a swiveled handle or grip 40, having a shank 41, arranged in a suitable opening or slot at the deck and provided with a lug or flange 42, adapted to be arranged transversely of the slot when the operating-rod is raised, whereby the latter is maintained in its elevated position. The swiveled handle or grip is adapted to be turned when the operating-rod is elevated to permit the lug to lie transversely of the slot or opening. When the lifting-rod is drawn upward, the transverse rock-shaft is partially rotated and the inner arm thereof is swung in the direction of the adjacent arm 16 and the clutch-section is coupled with the hub of the arm. The clutch-section 30 is provided with lugs or projections to engage corresponding recesses of the clutch-face of the hub of the arm 16, and if the recesses of the hub of the arm should be out of alinement with the lugs or projections of the clutch-section the coiled springs 39 will permit the upper section of the operating-rod to be raised sufficiently to lock it, and it will cause the clutch-section 30 to spring into engagement with the clutch-face of the arm 16, when the longitudinal rock-shaft is rotated and the said recesses brought in alinement with the lugs or projections.

The arm 16 inclines upward and inward toward the sliding door or cut-off when the latter is closed, and it is inclined in the opposite direction when the door is open, as illustrated in Fig. 12 of the accompanying drawings. The rear end of the longitudinal rock-shaft 17 is provided with an arm 43, extending downward and outward, as clearly shown in Fig. 12, when the door is open and connected with a vertically-movable piston 44 of a vertical steam-cylinder 45 by vertical links 46. When the piston-rod is moved downward, the longitudinal rock-shaft is rotated to swing the arm 16 outward, and those arms 16 which are coupled to the longitudinal rock-shaft will be oscillated and the sliding doors or cut-offs with which they are connected will be opened.

The vertically-movable piston-rod 44 is provided with a piston-head 47, arranged within the cylinder 45, which is provided at one side with a steam-chest 48, disposed vertically and having a vertically-reciprocating tubular slide-valve 49 within it. The ends of the vertically-disposed cylinder 45 are connected with the ends of the steam-chest by upper and lower ports 50 and 51, and the vertically-movable slide-valve is provided with a reduced central portion located between enlarged ends of the slide-valve and providing an annular recess adapted when the slide-valve is at the limit of its movement in either direction to establish a communication between the steam-chest and one end of the cylinder to admit steam to one side or the other of the piston-head. The slide-valve is provided with upper and lower apertures 52 and 53, adapted to alternately register with the said ports to establish a communication between the interior of the cylinder and the interior of the slide-valve to permit the steam to exhaust from the former. The said slide-valve is provided between the upper and lower apertures and the terminals of the central reduced portion with solid imperforate portions, which are adapted, as illustrated in Fig. 13 of the accompanying drawings, to cover the ports and shut off the steam from both ends of the cylinder. The piston-rod at the end of each stroke is adapted to operate the slide-valve to carry it into the position shown in Fig. 13 of the drawings, so that the operator after actuating the operating mechanism, hereinafter described, may leave the steam-cylinder unattended.

The upper end of the slide-valve is connected with a vertically-movable rod 54, mounted in suitable guides and connected by a lever 55 with the piston-rod and with the operating mechanism. The upper end of the piston-rod is provided with a horizontal guide 56, receiving a pivot or other suitable device of the adjacent end of the lever, which has its other end connected by a rod 57 with one arm of a bell-crank lever 58. The rod 57 is disposed vertically, and the other arm of the bell-crank lever 58 is connected by a horizontal rod 59 with an operating-lever 60, mounted on the exterior of the hood at one side thereof and arranged within convenient reach from the deck and adapted to be swung upward and downward to reciprocate the slide-valve. When the slide-valve is moved in either direction by the operating mechanism, its position is changed, and steam is admitted to the opposite side of the piston-head, between the same and the adjacent end of the cylinder, and the piston is caused to reciprocate. The reciprocation of the piston oscillates the lever, which is connected with the slide-valve by the rod 54, and this oscillation of the lever 55 carries the slide-valve to the intermediate position illustrated in Fig. 13 of the drawings.

Each pair of agitators is mounted on a short longitudinal shaft 61, journaled in suitable bearings at one side of the adjacent hopper 4 and extending through the space between the adjacent inclined side of the hopper and the inclined plate 24 and connected by sprocket-gearing with a long longitudinal shaft 62. A large sprocket-wheel 63 is mounted on the short shaft 61 near one end thereof, and a sprocket-chain 64 extends from the sprocket-wheel 63 to a sprocket-pinion 65, loosely mounted on the longitudinal shaft 62, which is located at the side of the hoppers 4 opposite to that on which the longitudinal shaft 17 is located. The sprocket-chain is disposed transversely of the barge at one side of the hoppers, and the sprocket-pinion is provided with a clutch-face 66, adapted to be engaged by a corresponding clutch-face of a sliding clutch-section 67, whereby the sprocket-pinion is coupled to the longitudinal shaft and is caused to rotate therewith to actuate the agitators. The sliding clutch-section 67, which is slidingly connected with the shaft by any suitable means, is provided with an annular groove, which is engaged by projections or lugs of a yoke 68 of a depending arm 69 of a transverse rock-shaft 70, extending from the longitudinal shaft 62 to the opposite side of the bins and provided with an approximately horizontal arm 71, which is adapted to be oscillated similar to the arm 35 of the inclined transversely-disposed rock-shaft 33. The arm 71 of the transverse rock-shaft 70 is connected with an operating-rod 72, composed of upper and lower yieldingly-connected sections and provided at its upper end with a swiveled grip 73, adapted to be locked in an elevated position similar to the grips or handles of the operating-rods 36 for controlling the clutches of the sliding doors or cut-offs. The upper and lower sections of the operating-rod of the agitators are connected at their inner or adjacent ends, similar to the sections of the operating-rod 36, and the coiled springs which form the yielding connection are adapted to cause the sliding clutch-section to engage the clutch-face of the sprocket-pinion as soon as the longitudinal shaft 62 rotates should such clutch-faces be in a position to prevent such engagement when the operating-rod 72 is drawn upward to connect the corresponding agitators with the longitudinal shaft. The operating-rods 72 of the agitators are located at the same side of the deck as the operating-rods 35 of the sliding doors, so that they will be within convenient reach of the operator and will enable him to readily open the desired sliding doors and start the corresponding agitators.

The upwardly-swinging dumping-gates are provided at their sides and outer edges with antifriction-wheels 74, arranged to bear against the walls of the bins or compartments and adapted to enable the dumping-gates to swing upward with a minimum amount of friction. In order to prevent the coal or other material from becoming wedged between the edges of the dumping-gate and the walls of the bin or compartment and escaping or interfering with the upward-swinging movement of the said gates, the latter are provided at their sides and outer edges with plates or strips 76, secured to the upper faces of the dumping-gates and provided with flanges 77, extending outward and upward and frictionally engaging the walls of the bin or compartment. These marginal flanges of the dumping-gates are split at intervals to provide a continuous series of resilient tongues, which constitute the flanges 77 and which enable the necessary resiliency to be readily obtained without materially impairing the strength of the flanges.

The upward movement of the oppositely-disposed dumping-gates is effected by means of hydraulic rams 78, arranged in pairs and located at opposite sides of the dumping-gates, as clearly illustrated in the diagrammatic view in Fig. 15 of the accompanying drawings. These hydraulic rams, which may be of any desired construction and the specific construction of which constitutes no part of the present invention, are provided at opposite sides with trunnions and are adapted to rock or oscillate as their plungers 79 move upward and downward in raising and lowering the dumping-gates. The trunnions of the rams are arranged in suitable bearings 80, and the inner trunnions are hollow and are connected with pipes 81 for supplying the water under pressure to the rams. When the water is admitted to the hydraulic rams, the plungers thereof move upward and carry with them the dumping-gate with which they are connected, and the admission of water to these rams is controlled by the means hereinafter described to equalize the power and to proportion the same to the load to be raised by the respective rams to cause the dumping-gates to be uniformly raised even when the coal is unevenly distributed over them, so that the said gates will not sag at either side and will not be twisted or strained by the action of the hydraulic rams. The adjacent ends of the pipes 81 are connected with the opposite sides of a valve-casing 82, having a longitudinal chamber 83, and provided with ports 84, extending therefrom to the pipes 81, which lead to the hydraulic rams. The valve-casing, which is disposed transversely of the barge, is provided at its top with an inlet-port 85, and it has an outlet or exhaust port 86 at its bottom, and it contains a reciprocating valve 87 and an oscillating valve 88, adapted to reciprocate with the valve 87 to be carried to and from the ports 84, which lead to the ram, and capable of oscillating over such ports to cause an even or uniform flow of water through the same to supply each of the rams with the same pressure and adapted to vary the flow of water through the said ports 84 to cause one of the rams to operate with greater power than the other when the load to be lifted is unevenly distributed over the surface of the dumping-gate. The valves 87 and 88 are connected with sections 89 and 90 of a valve-stem which is adapted to reciprocate to move the valve 87 longitudinally, and this valve 87 is provided with a recess 91 and has a solid portion 92. The recess 91 is adapted to establish a communication between the outlet or exhaust port 86 and the ports 84 to permit the water to exhaust from the hydraulic rams after the latter have been operated to raise the dumping-gates and it is desired to lower the gate. The solid portion 92 of the reciprocating slide-valve 87 is adapted to cover the outlet or exhaust port when the ports 84 are open, and it is also adapted to cover the ports 84 to cut off the water from the rams. The upper inlet-port 85 is connected by a suitable feed-pipe 93 with the tank 94, and the exhaust port or outlet is connected with an exhaust-pipe 95, which is adapted to return the water to the tank. The water is forced through the feed-pipe under pressure by any suitable means, and as such mechanism does not form a part of the present invention illustration thereof is deemed unnecessary.

The section 89 of the valve-stem is connected by links with an arm 96 of a rock-shaft 97, disposed approximately vertically and extending to the deck of the boat and provided at its upper end with a suitable arm or handle 98, by means of which the rock-shaft 97 is partially rotated to reciprocate the valve-stem in either direction.

The valve-stem section 90 is provided with a threaded socket for the reception of a threaded shank 99 of the section 89 of the stem, and the said section 90 is adapted to be oscillated by the means hereinafter described to oscillate the valve 88 over the ports 84 to vary the size of the openings thereof. The inner adjacent ends of the sections of the valve-stems are preferably reduced to fit in recesses of the valves 87 and 88, and coiled springs 100 and 101 are interposed between the sections of the valve-stem and the said valves at the bottoms of the recesses to hold the valves tightly against the walls of the chamber of the valve-casing.

The outer end of the section 90 of the valve-stem is provided with a laterally-extending head 102, forming a pair of oppositely-disposed arms and connected to the inner ends 103 of cables 104, which have their outer ends attached to the adjacent dumping-gate at the side edges thereof. The outer ends of the cables or other flexible connections pass around guide-pulleys 105, which are connected with suitable brackets at the lower edges of the partial transverse bulkheads which separate the bins or compartments, and the said cables extend from the outer guide-pulleys 105 to central guide-pulleys 106. The cables are looped by means of the central pulleys 106 and a pair of pulleys 107, located at opposite sides of and arranged slightly below the central pulleys 106. The loops which depend from the guide-pulleys 106 and 107 receive pulleys 108 of a weight 109. The cables after forming the loops extend downward from the pulleys 107 to the laterally-extending arms formed by the head 102. The inner portions of the cables cross each other and extend to the opposite sides of the valve in order to connect the cable at the right-hand side of Fig. 17 of the accompanying drawings with the right-hand arm of the valve-stem, and the cable at the left-hand side is connected with the other arm. Should the right-hand side prove lighter than the left-hand side of the dumping-gate, the right-hand arm will be lifted and the oscillatory valve will be swung toward the right to partially close the right-hand feed-port and lessen the power of the right-hand ram. This movement will correspondingly increase the size of the entrance of the feed-port at the left-hand side of the compensating valve, and the left-hand hydraulic ram will have its power correspondingly increased. The power will be proportioned between the rams to the loads to be lifted by them, so that they will operate with equal facility on an unevenly-distributed load. The weight keeps the cables taut; but only a slight movement of the oscillatory valve is necessary to effect this result and only a slight upward movement of the lighter side of the dumping-gate will occur before the compensating action is effected.

The barge is provided at its front portion with a tower 111, composed of front and rear sides 112 and 113, spaced apart and connected by a horizontal top portion 114, which is preferably housed in to protect the dumping mechanism and the scales, hereinafter described, from the weather. The front side or leg 112 of the tower is located at the bow of the barge and the rear side or leg is located at a point slightly in advance of the center of the same, ample space being provided between the sides or legs of the tower to enable a pair of extensible telescoping chutes 115 and 116 to swing from one side of the barge to the other. The endless conveyer $6^a$ is composed of a horizontal flight located at the bottom of the barge beneath the bins or compartments, an ascending upright flight located at the front side or leg of the tower, a descending upright flight supported by the rear leg or side of the tower, a top horizontal flight extending across the top of the tower, and an intermediate horizontal flight extending from the descending upright flight rearward over the rear portion of the barge to the rear end of the bottom horizontal flight, which travels beneath the bins or compartments.

The endless conveyer is provided at intervals with transverse shafts 117, which are connected by inner and outer links 118 and 119, arranged in pairs at opposite sides of the conveyer and located at the inner and outer sides of tracks hereinafter described. The shafts 117, which support the buckets 6, are provided at their ends with suitable spindles or journals for the reception of wheels 120, provided at their inner faces with peripheral flanges and arranged to run on suitable rails. The wheels of the bottom horizontal flight of the endless conveyer travel between upper and lower longitudinal rails 121 and 122, arranged in pairs at opposite sides of the conveyer, as clearly illustrated in Fig. 7 of the accompanying drawings. These rails 121 and 122 may be of any desired construction, and the upper rails 121 are inverted to bring their treads at the tops of the wheels of the endless conveyer. The other flights of the endless conveyer have their wheels arranged between and supported by inner and outer rails 123 and 124, extending upward at the front side or leg of the tower and across the top of the same and then downward and rearward to the stern of the boat. These rails 123 and 124 are supported by the tower and by a suitable structure 125, located above and extending longitudinally of the rear portion of the barge, as clearly indicated in Fig. 1 of the accompanying drawings.

The buckets 6, which are pivotally suspended from the conveyer when loaded, are provided at opposite sides with suitable journals or trunnions 126, arranged in suitable bearing-openings of the inner links of the endless conveyer, as clearly indicated in Fig. 7 of the drawings. The buckets are provided at their ends with curved lips 127 and 128, arranged, respectively, at the front and back of the buckets and below and above the transverse shafts of the conveyer when the buckets are arranged at the bottom of the barge and are receiving or have received a charge of coal or other material. The buckets when arranged at the bottom of the barge, with their curved lips in contact with the transverse shafts of the conveyer, are slightly tilted, and they are firmly supported in practically an upright position by the said transverse shafts; but as soon as the buckets begin to ascend at the front of the barge they will be caused to assume an upright position by their weight and will remain in such position until they are dumped to discharge their contents by the means hereinafter described. The front ends of the rails are spaced apart to receive guide-wheels 129 and are preferably diverged, as indicated in Fig. 1 of the accompanying drawings, to enable the wheels of the conveyer to readily enter and leave the spaces between the rails, and the rear ends of the rails may be slightly diverged, as shown in Fig. 1.

The endless conveyer is driven by a pair of wheels 130 of the sprocket type, provided at intervals at their peripheries with antifriction-wheels 131, adapted to engage the wheels at opposite sides of the endless conveyer, as clearly indicated in Fig. 4 of the accompanying drawings, whereby the friction is reduced to a minimum. The sprocket-wheels 130 are fixed by any suitable means to a lower horizontal shaft 132, disposed transversely of the barge at the back thereof and journaled in suitable bearings and connected by a train of gears with a main horizontal shaft 133. The main horizontal shaft, which is arranged parallel with the shaft 132, is connected by the means hereinafter described with an engine 134 and is provided with a pinion 135, which meshes with a large gear-wheel 136 of a counter-shaft 137, located midway between the shafts 132 and 133. The gear-wheel 136 is located at one end of the intermediate or counter shaft 137, which is provided at its other end with a pinion 138, meshing with a gear-wheel 139 of the shaft 132. This construction forms a train of gears for connecting the main shaft 133 with the shaft which drives the endless conveyer.

The main shaft 133 is provided with a sprocket-pinion 140, which is connected by a sprocket-chain 141 with a lower sprocket-pinion 142, having spur-teeth at one side to mesh with a bevel-gear 143 of the longitudinal agitator-driving shaft 62, whereby motion is communicated from the main shaft 133 to the agitators.

The steam for operating the engine and for driving the piston of the vertically-disposed steam-cylinder 45 is received from a boiler 144, having suitable pipe connections with the steam-chest of the engine and the cylinder 45. These pipe connections may be of any desired construction and arrangement, and as their specific construction does not form a part of the present invention further description thereof is deemed unnecessary.

The guide-wheels 129 are mounted on a horizontal shaft 145, having its ends arranged in bearings of sliding journal-boxes 146, mounted in longitudinal ways 147 and connected with the ends of threaded rods 147ª. The threaded rods, which have their front ends attached to the sliding journal-boxes, are engaged by rotary nuts 148 and extend through ears or lugs 149, arranged in pairs and preferably formed integral with the longitudinal guides. The guides, which may constitute a portion of a supporting-frame, may be provided with dovetailed or undercut edges to interlock with correspondingly-constructed edges of the sliding journal-boxes, and the said nuts are adapted to be rotated to move the rods longitudinally to slide the journal-boxes toward or from the ascending flight of the endless conveyer. By adjusting the guide-wheels the endless conveyer may be maintained at the desired tension. In order to enable the threaded rods to be moved simultaneously and accurately the same distance, the nuts 148 are provided with sprocket-teeth and are engaged by depending loops of a sprocket-chain 150, which extends across the space above the conveyer. The transverse portion of the endless sprocket-chain 150 is composed of two flights arranged upon upper and lower sprocket-pinions 151, disposed in pairs and mounted in a suitable frame or hanger 152. The nuts are also provided with suitable openings or sockets adapted to be engaged by a rod or lever for rotating the nuts, and when either of the nuts is rotated by such a rod or lever motion will be communicated to the other through the sprocket-gearing and both nuts will be simultaneously rotated the same distance.

When the buckets 6 move forward at the bottom of the barge to receive their charge, the upper curved lips, which are located above the transverse shafts of the endless conveyer, are interposed between the said shafts and the pair of longitudinal bars 25, which are secured to the lower edges of the oppositely-inclined plates 23 and 24, and by these means the buckets are effectually prevented from tilting or swaying when the coal or other material drops into them. The excess of coal or other material falling into the buckets is scraped from them by means of a trimmer 153, located at the front side of each of the depending hoppers of the bins or compartments and consisting of a plate provided at its upper edge with a pintle 154, arranged in suitable bearings or eyes of a transverse plate or partition 155, disposed vertically and located at the front edges of the oppositely-inclined plates 23 and 24. The plates 23 and 24 coöperate with the trimmer and with the plate 155 to form a lower chute or spout for directing the material into the buckets. The trimmer is provided with laterally-extending arms 155ª, consisting of a bar secured to and projecting from the sides of the trimmer, as clearly shown in Fig. 7 of the accompanying drawings. The outer ends of the arms 155ª are connected by stout coiled springs 155ᵇ with the adjacent upper rails 121, and should a lump of coal be interposed between the bucket and the trimmer the bucket will be moved forward and will swing the trimmer forward until the springs are distended sufficiently to cause the trimmer to cut through the coal, whereby all excess of coal is effectually removed from the buckets. The excess of coal as it is scraped from one bucket is delivered into the next bucket, and the buckets are successively and uniformly filled without spilling any of the coal or other material. The trimmer tapers from top to bottom, and it extends downward between the longitudinal bars 25, which have their lower edges arranged sufficiently above the upper lips 128 of the buckets to clear the same when the said lips are supported by and in contact with the transverse shafts of the endless conveyer. The transverse plate 155, upon which the trimmer is mounted, tapers toward its bottom to provide inclined side edges to conform to the inclined side plates 23 and 24 and is provided with a rectangular opening to enable the trimmer-plate to engage the coal, or rather the excess of coal, carried by the buckets.

The loaded buckets ascend the front side of the tower in an upright position, as clearly illustrated in Fig. 27 of the accompanying drawings, being solely supported by their pivots or trunnions 126, and there is no liability of any of their contents spilling while they are traveling from the bottom of the barge to the top of the tower. In their passage across the top of the tower the buckets are dumped, as indicated in Fig. 27 of the drawings, to discharge their contents into hoppers 156 and 157 of scale-casings 158 and 159 by means of laterally-adjustable dumping-blocks 160 and 161. The dumping-blocks 160 and 161, which are located at opposite sides of the hoppers 156 and 157, are adapted to be engaged by and are located within the paths of cams 162 and 163, secured to the opposite sides of the buckets and arranged on the exterior thereof and having the pivots or trunnions of the buckets formed integral with their upper portions. The cams 162 and 163 are alternately arranged, so that every other bucket will engage the first dumping-blocks 160, while the other buckets will pass these dumping-blocks 160 and engage the other dumping-blocks 161, so that the contents of the buckets will be evenly distributed to the hoppers 156 and 157. The cams 162 and 163 have their sides and bottoms of the same contour, and the cams 162 are provided with a projection or enlargement 164 to enable them to engage the first dumping-blocks 160, which are located out of the paths of the cams 163 of the other buckets. The cams 162 and 163 have tapered upper portions and are provided with sloping or oppositely-inclined lower edges, forming a rounded bottom.

The dumping-blocks 160 and 161 are slidingly mounted on transverse rods or bars 165 and are located directly over the hoppers of the scale-casings and are provided at their front ends with lower vertical edges and with upper inclined edges, and they have horizontal upper or top edges 166 extending from the inclined portions of the front edges to the upper terminals of long-inclined rear edges 167. When a bucket arrives at the front set of dumping-blocks, it is tilted by the same if its cams be provided with the enlargements or extensions 164, which project laterally from the opposite sides of the bucket. These extensions or enlargements 164 first engage the vertical front edges of the dumping-blocks, and as the bucket is carried forward through its pivotal connection with the inner links of the endless conveyer it is gradually tilted, and a continued forward or onward movement of the bucket draws the cams upward on the front edges of the dumping-blocks to the horizontal top edges, which are of sufficient length to hold the buckets in a substantially inverted position, as illustrated in Fig. 27 of the accompanying drawings, to enable their contents to be completely discharged into the hoppers of the scale-casings. After the cams leave the horizontal top edges of the dumping-blocks they are drawn down the inclined or sloping rear edges, which permit the buckets to gradually resume an upright position and prevent them from swinging against the transverse shafts of the conveyer with any force, whereby the buckets are prevented from being injured through contact with the dumping-blocks. The second set of dumping-blocks 161 is arranged in the paths of the cams 163, and they of course are engaged by all of the cams; but as every other bucket has had its contents discharged into the hopper of the first scale-casing only one-half of the coal or other material will be delivered to the hopper of the second scale-casing, although every bucket is dumped by the second set of dumping-blocks. The operation of dumping the material into the hopper of the second scale-casing is exactly the same as that heretofore described in connection with the hopper of the first scale-casing. The number of scale-casings and dumping-blocks may be varied by positioning the dumping-blocks and by providing cams for engaging the respective dumping-blocks. The dumping-blocks preferably consist of open frames, as clearly illustrated in Fig. 34 of the accompanying drawings, and they are provided at their bottoms with openings for the reception of the transverse rods or bars, which are preferably round, and annular enlargements or sleeves are preferably provided at the bottom openings of the dumping-blocks to increase the bearing-surface. The transverse rods or bars are provided at opposite sides with collars 168, arranged in pairs and located at opposite sides of the dumping-blocks and secured to the said rods or bars by means of clamping-screws or other suitable devices. The distance between the members of the pairs of collars is sufficient to receive the dumping-blocks and a detachable locking-bar 169, provided at its ends with hooks and adapted to rest upon and be supported by the transverse rods or bars 165. These locking-bars are adapted to be arranged at either side of the dumping-blocks to position the latter for engaging either of the cams 162 or 163. By arranging the locking-bars at the outer sides of the first set of dumping-blocks the latter will lie in the path of all of the cams, and each bucket will be dumped into the hopper of the first scale-casing. This may be desirable when it is only necessary to operate one of the chutes.

The scale-casings are designed to receive rotary scales, as indicated in Fig. 27 of the accompanying drawings; but as the particular construction of the scales does not form any part of the present invention such construction has not been illustrated. Each of the hoppers is provided with a pair of spouts 170 and 171, extending downward at an angle to each other and adapted to deliver the coal upon the scales in order that the coal or other material may be weighed as it is discharged into the vessel to be loaded. The passage of the material through the hopper is controlled by a hinged plate or cut-off 172, which is adapted, as illustrated in Fig. 27, to be arranged for closing either of the spouts 170 and 171, so that the coal may be weighed or not weighed, as desired. Should it be unnecessary or undesirable to weigh the material, the hinged plates or cut-offs will be arranged to close the spouts 170, and the material will then pass downward at the back of the scales without affecting the latter.

The scales and the scale-casings are mounted within the top of the tower, and the said scale-casings are provided with tapered lower portions forming spouts and communicating with depending annular sleeves or necks 173, arranged beneath the floor of the top of the tower and provided with suitable bearings for rotary sleeves or collars 174, to which the extensible telescopic chutes 115 and 116 are connected by suitable pivots 175. The adjustable chutes 115 and 116, which depend from the top of the tower at points between the front and rear sides or legs of the same, are adapted to rotate on the necks 173 to turn them in any direction and are capable of swinging on the horizontal pivots 175 to arrange the lower ends of the chutes at the desired elevation. The chutes 115 and 116, which are adapted to operate at either the starboard or the port side of the barge, may be swung through the open space between the front and rear sides or legs of the tower, and they are controlled by suitable ropes or cables connected with a winch 176 and connected with booms 177 and 178, arranged in pairs at opposite sides of the top of the tower. The booms, which swing in horizontal planes, are supported in a horizontal position by guy ropes or cables 180 and 181 and are pivoted or hinged at their inner ends. The chutes, which have enlarged upper ends, are composed of upper, lower, and intermediate sections 182, 183, and 184, which are adapted to slide or telescope to vary the length of the chutes, and the telescoping or sliding movement of the sections is controlled by a rope or cable 185, secured at one end to the upper or top section of the chute and extending longitudinally of the latter to a pulley 186 of the lower or bottom section 183 and passing therefrom rearwardly along the chute to a pulley 187, mounted on the tower. The ropes or cables are then extended to the winch and are connected with suitable drums thereof. By winding the ropes or cables on the drums the chutes are shortened, and by unwinding the said cables the chutes are extended, and the weight of the sections of the chutes will cause the latter to extend themselves automatically as the cables or ropes are paid out.

The intermediate and lower sections of the chutes are connected with the booms by means of ropes or cables 189 and 190. The rope or cable 189 is connected at one end to the adjacent boom at a point intermediate of the ends thereof, and it extends downward to the intermediate section 184 and back to the boom, suitable blocks or pulleys being provided for the rope or cable. The other rope or cable 190 is arranged at the outer end of the boom and is connected in a similar manner with the lower or bottom section, and the ropes or cables are then extended over suitable pulleys to drums of the winch 176. The drums are mounted on a continuous shaft and are adapted to be coupled to the same by suitable clutches, whereby one or more may be simultaneously rotated. By winding the ropes or cables on the drums and by unwinding them therefrom the chutes may be readily controlled and may be arranged at any elevation or point between the barge and the booms, and the latter may be swung horizontally by any suitable means to extend the chutes in the desired direction. Each pair of booms is provided with the ropes or cables above explained, and the blocks or pulleys for connecting the ropes or cables 189 and 190 with the sections 183 and 184 of the chutes are designed to be detachable, preferably by means of hooks and eyes, so that the chutes may be coupled to the ropes or cables 189 and 190 of either pair of booms. When one set of ropes or cables 189 and 190 is in use, the other set is disconnected from the drums of the winch.

The horizontal shaft of the winch is connected by bevel-gearing with a short vertical shaft 191, which is similarly connected at its lower end with a horizontal shaft 192, and the latter extends from the short vertical shaft 191 to a long vertical shaft 193, which passes downward to the bottom of the barge. The lower end of the long vertical shaft 193 is connected by bevel-gearing with the longitudinal shaft with which the agitators are geared. Suitable shifting mechanism is provided for throwing the winch into and out of operation and for coupling the drums to the horizontal winch-shaft; but as this specific construction does not constitute a portion of the present invention detailed description and illustration thereof are deemed unnecessary.

After the buckets have been dumped and their contents discharged into the hoppers of the scale-casings they descend at the back of the tower and travel rearward toward the rear end of the barge, at which point they again enter the said barge and pass beneath the bins or compartments to receive another charge. At a point intermediate of the end of the intermediate horizontal flight of the endless conveyer the buckets are inverted and swung upward from a point beneath the links of the conveyer to a position above the same, as clearly illustrated in Fig. 36 of the accompanying drawings, by reversing cams 194 to position the buckets properly, so that they will reënter the barge at the back thereof and assume an upright position as soon as they arrive at the bottom of the barge. The reversing-cams 194, which are located at opposite sides of the conveyer, are approximately L-shaped, being composed of a vertical front portion, a horizontal rear portion, and a curved intermediate portion. They are supported by suitable brackets secured to the inner or lower rails 123, and they are arranged within the paths of the cams of the buckets and are engaged by the same, whereby as the buckets travel forward they will be successively swung upwardly and rearwardly to an inclined position by the reversing-cams 194. The movement of the buckets is completed by means of a central longitudinal guide-bar 195, located midway between the pairs of rails and provided with an inclined front portion 196, arranged to engage the lower portion of each bucket after the same has been brought to an inclined position by the reversing-cams, as clearly shown in Fig. 36 of the drawings. As each bucket is drawn over the inclined portion 196 of the guide-bar it is gradually brought to an inverted position above the links of the endless conveyer, and the longitudinal guide-bar 195 receives the lips of the buckets lying below the transverse shafts of the conveyer and maintains the said buckets in an inverted position until they descend to a point where the center of gravity will maintain them in their reversed position. The longitudinal guide-bar is curved to conform to the configuration of the adjacent portion of the conveyer, and it terminates short of the vertical back portion of the same, as the center of gravity of the buckets lying beyond the pivots or trunnions will effectually prevent the buckets from accidentally swinging to the inner side of the endless conveyer.

In order to prevent the apparatus from being injured by the backward movement of the conveyer, caused by the loaded buckets of the ascending upright flight at the front of the tower in event of the breakage of the conveyer at any point, a safety-stop 197 is employed. This safety-stop, which is preferably arranged at the intermediate horizontal flight of the conveyer, consists of an approximately rectangular frame hinged at one end and normally supported in an elevated position above the adjacent portion of the endless conveyer and adapted to be immediately tripped by the backward movement of the conveyer, whereby the latter will be securely locked against backward movement to prevent the injury which would necessarily result should the weighted buckets of the upright flight at the front of the tower be permitted to fall and drive the endless conveyer backward. The rectangular frame is composed of two side bars connected between their ends by transverse rods and provided at one end of the frame with openings for the reception of a horizontal pintle 198. The other ends of the side bars are provided with recesses or seats 199, adapted to engage one of the transverse shafts of the endless conveyer or the pivots of one of the buckets. The safety-stop is normally supported by a pivoted or hinged hanger or support 200, located at one side of the rectangular frame of the stop and provided with a suitable shoulder 201, forming a seat for one end of the adjacent transverse rod 202. The support or hanger is tripped by means of a lever 203, pivoted between its ends to the lower portion of the support or hanger and having its upper end located adjacent to a stop 204, consisting of a projection or lug extending from the said support. The lower arm of the trip-lever is arranged in the path of both the transverse shafts and the pivots or trunnions at one side of the buckets, and as the endless conveyer moves forwardly in the direction of the arrow in Fig. 37 of the drawings the lower arm of the said trip-lever will be swung in the same direction, and its upper arm will thereby be carried away from the upper stop 204. Should, however, the conveyer break at any point, the weight of the loaded buckets of the front ascending flight will force the conveyer backward, and the adjacent transverse shaft or pivot will engage the trip-lever and move the same backward. As the backward movement of the trip-lever from the position illustrated in Fig. 37, independently of the support or hanger, is prevented by the stop 204, the support or hanger will be carried backward, and the safety-stop will be caused to fall by the withdrawal of the shoulder 201 from beneath the transverse rod 202. The recessed ends of the side bars of the safety-stop will then drop into the path of the transverse shafts and the pivots of the buckets and will engage the adjacent one. The safety-stop is supported when tripped in position to engage the said shafts by a pair of chains 205 or other flexible connections secured at their ends to the rod 202 and to a suitable support. By this construction the endless conveyer in event of breakage at any part of the same will be prevented from moving backward a greater distance than approximately the length of one of the buckets, and the safety-stop will be tripped before the endless conveyer has moved backward the distance of a half of a bucket. The safety-stop by engaging one of the transverse shafts of the endless conveyer is adapted to stop the backward movement of the same before the conveyer has gained any headway, and the strain incident to such stopping or checking of the backward movement of the conveyer is sustained by both the inner and outer links, and there is no liability of the conveyer receiving any injury from its engagement with the automatically-operating safety-stop.

In order to cushion and control the movement of the sliding doors of the barge, the vertically-movable piston 44 extends through an auxiliary cylinder 206 and is provided with a piston-head 207, arranged to reciprocate in the auxiliary cylinder, which is preferably located above the main or steam cylinder 45. The ends of the auxiliary cylinder are provided with upper and lower ports, which are connected by a passage 208, at the center of which is arranged a controlling-valve 209 for constricting the longitudinal passage 208 at this point. The auxiliary cylinder is filled with a suitable cushioning liquid, such as oil, and when the piston 44 is reciprocated its movement is resisted by the oil or other liquid within the auxiliary cylinder, which liquid is forced from the cylinder at one end through the longitudinal passage to the other end of the cylinder. By regulating the controlling-valve 209 the desired cushioning action may be obtained and the necessary resistance to the reciprocation of the vertically-movable piston is produced. A longitudinal tube or pipe connection may be employed for forming the longitudinal passage for connecting the upper and lower ports of the auxiliary cylinder, or any other desired construction may be used.

The movement of the sliding doors or cut-offs of the barge is limited by means of a sliding link 210 and a pin 211 of a bracket 212 in order that the said sliding doors or cut-offs may close properly and also in order that the clutch-faces of the loose arms 16 of the longitudinal shaft 17 may be approximately in position for engagement with the sliding clutch-sections. The link 210, which may be connected with the adjacent edge of the sliding door or cut-off 5 in any suitable manner, is disposed horizontally and preferably consists of a rod or piece of metal doubled or bent at its center to form an approximately elongated U-shaped link, as clearly illustrated in Fig. 7 of the accompanying drawings. The pin 211, which is preferably headed, projects horizontally from the bracket 212 and extends through the opening of the link 210; but a projection for this purpose may be formed in any other suitable manner and may, if desired, be integral with the bracket 212. The bracket 212, which is provided with a depending arm for supporting the projection or pin, consists of a bar or piece of metal arranged as clearly shown in Fig. 7; but it may be constructed in any other suitable manner. The depending arm of the bracket is located at one end of the latter and the other end is preferably provided with a hook 213 for engaging the bottom flange of the adjacent channel-iron beam. The bracket is secured adjacent to its depending arm to a flange of a beam by means of a bolt 214 or other suitable fastening device; but the bracket may of course be changed to suit the parts to which it may be secured. The inward or closing movement of the sliding door or cut-off is limited by the bend or outer end of the link engaging the stop of the bracket 212, and the outward or opening movement of the sliding door or cut-off is limited by the depending arm of the bracket, which is arranged to be engaged by the said sliding door or cut-off. By this construction the weight of the arm 16, which is arranged at an inclination when the sliding door or cut-off is open and closed, will not operate to slide the said door or cut-off beyond the position to which it is carried by the mechanism for rocking the shaft 17, and the sliding door or cut-off may be allowed to remain in an open or a closed position.

The main horizontal shaft 133 is provided with a ratchet-wheel 215, adapted to be engaged by an automatically-operating pawl 216 to prevent retrograde rotation of the shaft 133 incident to any backward movement of the endless conveyer. The ratchet-wheel 215 is provided at opposite sides with annular enlargements 217, arranged to receive depending arms or sides of a yoke 218, located adjacent to the engaging end of the safety-pawl 216 and preferably formed integral therewith. The pawl 216, which is capable of a limited longitudinal movement, is normally supported out of engagement with the ratchet-wheel 215 by reason of the depending portions or sides of the yoke resting upon the annular enlargements at the top thereof. The rear end of the pawl 216 is provided with a longitudinal slot 219, receiving a suitable fastening device 220, which limits the movement of the pawl. The annular enlargements, which support the pawl 216, create sufficient friction to draw the pawls 216 forward in the position shown in full lines in Fig. 41 of the accompanying drawings. The engaging end of the pawl is supported above the ratchet-teeth of the ratchet-wheel when the pawl is in the position illustrated in full lines in Fig. 41 and while the ratchet-wheel is rotating in the direction of the arrow in the said figure; but should the direction of the rotation of the shaft 133 be reversed the friction exerted by the smooth annular portions of the ratchet-wheel will carry the pawl backward to the position illustrated in dotted lines in Fig. 41 of the drawings, whereby the said shaft 133 will be locked against further movement in that direction. The safety-pawl will assist the safety-stop in preventing the endless conveyer from moving backward under the influence of the weight of the ascending upright flight, and the depending support or yoke 218 renders the pawl 216 noiseless and prevents the constant click which would result were the pawl 216 permitted to rest normally upon the teeth of the ratchet-wheel.

In order to prevent any lateral movement of the endless conveyer at the break in the rails incident to the location of the drive and guide wheels at the stern and bow of the barge, front and rear guide-plates are provided. The rear guide-plates 221, which are located at opposite sides of the conveyer at the stern of the boat, are disposed approximately horizontally, as clearly indicated in Figs. 4 and 6 of the accompanying drawings. These plates extend from the rear end of the rail 124 to the adjacent end of the upper rail 121, and they are arranged to be engaged by the ends of the transverse shafts of the endless conveyer to prevent any lateral movement whereby the wheels of the endless conveyer will be maintained in proper position to be engaged by the wheels 131, mounted at the periphery of the drive-wheels 130. These rear guide-plates also operate to hold the wheels 120 of the endless conveyer in proper position for guiding them between the upper and lower longitudinal rails 121 and 122 at the bottom of the barge, so that the flanges of the said wheels 120 will be arranged at the inner sides of the rails.

The bow of the barge is provided with upper and lower guide-plates 222 and 223, arranged in pairs and located at opposite sides of the conveyer. The lower guide-plates 223, which are disposed at a slight inclination, as clearly illustrated in Fig. 2 of the accompanying drawings, extend from the front ends of the rails at the bottom of the barge to within a short distance of the outer rails 124, and the upper plates 222, which are located adjacent to the rails 123 and 124, are disposed approximately vertically, and their lower ends are arranged at a slight inclination to form a flaring entrance or space between them to prevent their lower ends from catching on the conveyer and also to enable the latter to pass readily between them. The lower plates prevent any lateral movement of the endless conveyer on the guide-wheels, and the upper plates serve to guide the wheels of the endless conveyer between the inner and outer rails 123 and 124.

In order to prevent the drive-wheels 130 from lifting the wheels 120 of the endless conveyer when the latter arrive at the bottom of the drive-wheel and the wheels 131 of the latter begin to ascend after actuating the endless conveyer, a centrally-arranged guard 224 is provided. This guard consists of a curved bar 225, arranged centrally over the bottom horizontal flight of the endless conveyer at the rear end of the said flight and supported by an inclined brace 226. The curved guard is arranged to be engaged by the endless conveyer, and should there be any tendency of the drive-wheel to lift the conveyer-wheels the guard will cause the latter to drop out of engagement with the drive-wheels, and there will be no liability of the endless conveyer becoming interlocked with the drive-wheel and stopping the apparatus.

The operation of the invention is as follows: After the barge has been loaded, which operation may be accomplished by any suitable means, it is towed to the vessel to be supplied with coal or other material; but it will be readily apparent that the barge may be provided with means for propelling it, if desired. After the barge has been properly positioned and anchored with relation to the vessel to be loaded the superimposed chutes are adjusted by the means before described and are arranged for delivering the coal or other material into the hold of the vessel. The chutes are capable of being varied in length and swung horizontally and vertically at either side of the barge to arrange them in such position, and they may be changed from one portion of the vessel to another, as may be found necessary or desirable. When the chutes have been properly positioned, the cut-offs of the scale-casings are arranged to cause the material to operate the scales or to pass the latter without operating them. The conveyer is then set in motion, and one of the sliding doors is opened by coupling the corresponding oscillating arm 16 to the shaft 17 by pulling upward on the operating-rod 36, which is connected with the said clutch and which may be locked in such elevated position by means of its swiveled handle or grip. The valve of the vertically-disposed steam-cylinder is reciprocated to actuate the plunger of the said cylinder and rock the shaft 17. This opens the sliding door or cut-off, and the coal begins to discharge into the buckets of the endless conveyer. The agitator corresponding with the open sliding door or cut-off may be set in motion at this time by actuating its operating mechanism, which is located adjacent to the operating-rod 36. The said sliding door and cut-off and the agitator may be operated in a very short time, as the operating mechanism of the couplings and the steam-cylinder are arranged at the deck of the barge within easy reach. The buckets as they are filled are operated on by the trimmer, which removes all the superfluous material and which is actuated by coiled springs, and these coiled springs have their tension increased by the swinging of the trimmer, and sufficient force or power may be obtained in this manner to enable the trimmer to cut off the coal should a large lump interpose itself between the buckets and the said trimmer. By this construction the buckets will be uniformly filled and there will be no liability of the material accidentally spilling from the buckets while the latter are traveling from the barge to the chutes. The doors or cut-offs of each bin or compartment of the barge may be successively opened, and as the material within a bin or compartment becomes reduced the oppositely-disposed dumping-gates, which constitute portions of the bottom of the bin, are swung upward by the hydraulic rams, which are pivotally mounted and which have their plunger pivotally connected with the dumping-gates. The reciprocating valve of the hydraulic rams is connected with operating mechanism located at the same side of the barge as the operating mechanism for controlling the couplings of the agitator and sliding-door mechanisms. As the dumping-gates are swung upward the material on them is caused to slide downward to the depending hopper portions 4 of the bin. Should the material be unevenly distributed over the dumping-gates, the compensating valves, which are connected with the rams, will vary the power and enable the same to be proportioned properly to the load to be lifted by the respective rams. After one compartment has been emptied the dumping-gates are returned to their normal position, the sliding doors are closed, and the agitators are stopped. The other bins are successively operated in this manner until the entire load of the barge is transferred to the vessel being loaded or until the desired quantity has been supplied. The buckets laden with coal or other material ascend the tower at the front side or leg thereof, and those buckets which carry the projections or enlargements of the cams engage the first set of dumping-blocks and are inverted to discharge their contents into the scale-casing of the front chute. The front set of dumping-blocks are spaced farther apart than the rear ones, and those buckets which are not provided with the projections or enlargements of the cams pass between the front set of dumping-blocks and are not affected by the same; but when they arrive at the rear set of dumping-blocks they are tilted and caused to discharge their contents into the scale-casing of the rear chute. Each of the buckets is operated by the second set of dumping-blocks; but as every other bucket has been emptied before they arrive at the second set of dumping-blocks it will be apparent that this will not affect the uniform distribution of the material to the front and rear chutes. The empty buckets descend at the rear side or leg of the tower, and they travel rearward to the stern of the barge, passing over the rear portion of the latter. As they arrive at the back of the conveyer they are automatically carried from a position beneath the intermediate rearwardly-extending flight of the conveyer to a point above the same by the reversing-cams, as illustrated in Fig. 35 of the drawings, and they are held in this position by the longitudinal guide-bar until the center of gravity of the buckets by reason of their movement downward and rearward is carried beyond the pivots, so that the buckets will be held at the outer side of the rear portion of the conveyer by gravity. The buckets when at the outer side of the rear portion of the conveyer are in proper position for entering the chute, and they will thereby lie below the bottom horizontal flight of the endless conveyer and be in proper position to receive another charge of material. As the loaded buckets ascend at the front of the tower the conveyer in event of a breakage at any point will be forced backward by the weight of the material in the buckets of the front ascending flight, and in order to prevent the conveyer from moving backward any distance under the influence of this weighted upright flight the safety-stop, which is clearly illustrated in Fig. 37, is provided. The tripping mechanism of the safety-stop is operated by the backward movement of the conveyer, and the safety-stop will immediately check this backward movement before this weighted front flight has had the slightest opportunity to effect any injury.

The apparatus requires only a very few hands to operate it, as the only parts requiring attention are the engine and the devices for controlling the sliding doors, the agitators, and the dumping-gates after the chutes have been properly positioned.

What I claim is—

1. In an apparatus for handling material in bulk, the combination of a barge, a superimposed chute capable of movement to arrange it in the desired position, an endless conveyer extending from the barge to the chute and having an upright flight for conveying the material from the barge to the chute, and an automatically-operating safety-stop arranged above one of the flights of the conveyer and being normally out of engagement with the same and capable of operation solely by the backward movement of the conveyer, whereby it will be dropped to its engaging position, substantially as described.

2. In an apparatus for handling material in bulk, the combination of a barge, a tower, a superimposed extensible chute suspended from the tower and having a hinge and swivel connection therewith, whereby it is capable of both vertical and horizontal oscillation and is adapted to swing both transversely and longitudinally of the barge to enable it to be arranged at either side thereof and to extend forward and aft, and a conveyer extending from the barge to the chute, substantially as described.

3. The combination of a barge, a tower, a pair of horizontally-swinging supporting-booms arranged at opposite sides of the tower, a superimposed chute capable of movement to arrange it in the desired position, means for connecting the chute with either of the booms, and a conveyer extending from the barge to the chute, substantially as described.

4. In an apparatus for handling material in bulk, the combination of a barge provided with a support or tower, a superimposed chute depending from the support or tower and arranged to swing vertically and horizontally, a boom hinged to the tower or support and located above the chute and arranged to swing horizontally, adjustable connections supporting the chute from the boom, and a conveyer extending from the barge to the chute, substantially as described.

5. In an apparatus for handling material in bulk, the combination of a barge having a tower, a superimposed chute suspended from the support or tower and arranged to swing transversely and longitudinally of the barge, whereby it is adapted to be arranged in any direction at either side of the said barge, the booms located at opposite sides of the tower or support and arranged to swing horizontally to enable it to move with the chute when the latter swings longitudinally of the barge, connections depending from the booms and detachably engaging the chute, whereby the latter may be supported from either boom to arrange it at either side of the barge, and a conveyer extending from the barge to the support or tower and passing over the chute, substantially as described.

6. In an apparatus for handling material in bulk, the combination of a barge having a support or tower, a pair of extensible chutes suspended from the support or tower and arranged to swing through the same transversely of the barge to either side of the latter and capable also of swinging longitudinally of the barge, a pair of booms hinged to the support or tower and arranged to swing horizontally to move with the chutes when the latter swing longitudinally of the barge, the adjustable connections between the booms and the chutes, and a conveyer extending from the barge to the chutes, substantially as described.

7. In an apparatus for handling material in bulk, the combination of a barge having a support or tower, the superimposed chutes suspended from the support or tower and arranged to swing through the same transversely of the barge and capable also of swinging longitudinally of the barge, the booms arranged in pairs at opposite sides of the barge and hinged to the support or tower and arranged to swing horizontally to enable them to move with the chutes when the latter swing longitudinally of the barge, means for adjustably and detachably connecting the chutes with the booms, whereby the chutes are adapted to be supported at either side of the barge, and a conveyer extending from the barge to the chutes, substantially as described.

8. In an apparatus for handling material in bulk, the combination of a barge, a tower, a pair of horizontally-swinging booms mounted on the tower and located at opposite sides of the barge, a vertically and horizontally swinging chute mounted on the tower and adapted to be swung forward and rearward and laterally to either side of the barge to arrange it beneath either boom, and means for connecting the chute to either of the booms, substantially as described.

9. The combination of a barge, a support or tower mounted on the barge and provided with an opening, a superimposed chute depending from the top of the support or tower at the said opening and arranged to swing through the same transversely of the barge to carry it to either side of the latter, and capable also of swinging longitudinally of the barge, means for supporting the chute in its adjusted position, and a conveyer extending from the barge to the support or tower and passing over the chute, substantially as described.

10. In an apparatus for handling material in bulk, the combination of a barge provided with bins or compartments and having cut-offs at the bottoms thereof, a superimposed chute, a conveyer extending from the barge to the chute and passing beneath the said bins or compartments, a shaft extending longitudinally of the barge, a series of arms loosely mounted on the shaft and connected with the cut-offs, couplings arranged at intervals for connecting the arms to the shaft, and means for operating the couplings independently of one another, whereby one or more of the cut-offs may be operated by the shaft, substantially as described.

11. In an apparatus for handling material in bulk, the combination of a barge having bins or compartments provided with cut-offs, a superimposed chute, a conveyer extending from the barge to the chute and having a flight located beneath the bins or compartments, a longitudinal shaft, independent connections between the cut-offs and the shaft, and means for operating such connections independently of one another, whereby one or more of the cut-offs may be operated, substantially as described.

12. In an apparatus for handling material in bulk, the combination of a barge provided with a series of cut-offs, a movable chute located above the barge, a conveyer extending from the barge to the chute and arranged adjacent to the cut-offs, a shaft, a series of arms loosely mounted on the shaft and connected with the cut-offs, couplings for locking the arms rigid with the shaft, means for operating the couplings independently of one another, and a steam-cylinder having a piston connected with and adapted to rock the shaft, substantially as described.

13. In an apparatus for handling material in bulk, the combination of a barge having a bin or compartment and provided with a series of movable cut-offs, a movable chute located above the barge, an endless conveyer extending from the barge to the chute and arranged to receive material from the cut-offs, a shaft, a series of arms loosely mounted on the shaft and connected with the cut-offs, couplings for locking the arms to the shaft, a steam-cylinder connected with and adapted to rock the shaft, and operating mechanism extending from the couplings and from the steam-cylinder to the deck of the barge, substantially as and for the purpose described.

14. In an apparatus for handling material in bulk, the combination of a barge provided with a longitudinal series of bins or compartments and having movable cut-offs, a movable chute located above the barge, a conveyer extending from the barge to the chute and arranged to receive material from the cut-offs, a longitudinal shaft arranged at one side of the conveyer, a series of arms loosely mounted on the longitudinal shaft and connected with the cut-offs, couplings for locking the arms to the longitudinal shaft, a series of agitators, the short longitudinal shafts carrying the agitators, the long longitudinal tongue-shaft connected by gearing with the short shafts, couplings for connecting the said gearing with the counter-shaft, and operating mechanism located at one side of the barge and extending to all of the said couplings and adapted to enable them to be independently operated, substantially as described.

15. In an apparatus for handling material in bulk, the combination of a barge having a bin or compartment and provided with a series of movable cut-offs, a movable chute located above the barge, an endless carrier extending from the barge to the chute, a longitudinal rock-shaft provided with a rigid arm and having a series of loosely-mounted arms connected with the cut-offs, couplings for locking the arms to the rock-shaft, a steam-cylinder having a piston connected with the rigid arm of the rock-shaft, and operating mechanism for controlling the couplings and the steam-cylinder whereby one or more of the cut-offs may be opened and closed, substantially as described.

16. In an apparatus for handling material in bulk, the combination of a barge having a bin or compartment and provided with dumping-gates, a superimposed chute, a conveyer extending from the barge to the chute, a series of hydraulic rams connected with the dumping-gates and capable of movement to conform to the movement of the said dumping-gates, and means for operating the rams to raise and lower the dumping-gates independently of one another, substantially as described.

17. In an apparatus for handling material in bulk, the combination of a barge having a bin or compartment and provided with a series of dumping-gates, a superimposed chute, a conveyer extending from the barge to the chute, a series of pivotally-mounted hydraulic rams located beneath and connected with the dumping-gates and capable of movement to adjust themselves to the movement of the said dumping-gates, and means for operating the rams for raising and lowering the dumping-gates independently of one another, substantially as described.

18. In an apparatus for handling material in bulk, the combination of a barge having a bin and provided with a series of dumping-gates arranged to swing upward and downward, a superimposed chute, a conveyer extending from the barge to the chute, a series of movably-mounted hydraulic rams located beneath and pivotally connected with the dumping-gates, and means for operating the rams to open and close the dumping-gates independently of each other, substantially as described.

19. In an apparatus for handling material in bulk, the combination of a barge having a bin and provided with a dumping-gate, a movable chute located above the barge, a conveyer extending from the barge to the chute, a pair of hydraulic rams located beneath and connected with the dumping-gate at opposite sides thereof, and a compensating valve connected with the hydraulic rams and adapted to vary the power of the same to enable the dumping-gate to be uniformly raised, substantially as and for the purpose described.

20. In an apparatus for handling material in bulk, the combination of a barge provided with bins or compartments and having oppositely-disposed upwardly-swinging dumping-gates, the hydraulic rams arranged in pairs and located beneath and connected with the dumping-gates, and compensating valves connected with the hydraulic rams and with the dumping-gates and operated by the latter to vary the power to suit the load to be lifted, substantially as and for the purpose described.

21. In an apparatus for handling material in bulk, the combination of a barge having a bin or compartment and provided with a dumping-gate, a movable chute located above the barge, a conveyer extending from the barge to the chute, a pair of hydraulic rams connected with the dumping-gate at opposite sides thereof, a compensating valve connected with the hydraulic rams and adapted to vary the power of the same, and flexible connections between the valve and the opposite sides of the dumping-gate for controlling the action of the valve to proportion the power to the weight to be lifted by the rams, substantially as described.

22. In an apparatus for handling material in bulk, the combination of a barge having a bin or compartment and provided with a dumping-gate, a movable chute located above the barge, a conveyer extending from the barge to the chute, a pair of hydraulic rams connected with the dumping-gate at opposite sides thereof, a compensating valve for controlling the feed or supply of liquid to the rams to vary the power thereof, flexible connections extending from the compensating valve to the opposite sides of the dumping-gate, and a weight for holding the flexible connections taut, substantially as described.

23. In an apparatus for handling material in bulk, the combination of a barge having a bin or compartment and provided with a dumping-gate, hydraulic rams connected with the dumping-gate and arranged at opposite sides thereof, a movable chute located above the barge, a conveyer extending from the barge to the chute, a compensating valve connected with the rams for controlling the feed to the same to vary the power of the rams, flexible connections extending from the valve to the opposite sides of the dumping-gate and provided with similar loops, guide-pulleys receiving the flexible connections, and a weight supported by the said loops and having pulleys for the reception of the same, substantially as described.

24. In an apparatus for handling material in bulk, the combination of a barge having a bin or compartment and provided with a dumping-gate, a chute, a conveyer extending from the barge to the chute, a pair of hydraulic rams located beneath and connected with the dumping-gate at opposite sides thereof, an oscillatory compensating valve for controlling the feed to the hydraulic rams, the central guide-pulley 106, the guide-pulleys 105 located adjacent to the sides of the dumping-gate, the pulleys 107 located at opposite sides of the central pulley 106, the flexible connections secured at their outer ends to the dumping-gate near the side edges thereof and extending from the pulleys 105 to the central pulley 106 and provided with loops depending from the pulleys 106 and 107, said flexible connections being attached at their inner ends to the compensating valve, and a weight supported by the said loops, substantially as described.

25. In an apparatus for handling material in bulk, the combination of a barge having a bin or compartment provided with a dumping-gate arranged to swing upward and downward, hydraulic rams movably mounted beneath the dumping-gate and connected with the same and capable of yielding to the upward-and-downward swinging movement of the said dumping-gate, and means operated by the dumping-gate for varying the power of the rams, substantially as described.

26. In an apparatus for handling material in bulk, the combination of a barge having a bin or compartment provided with a hinged dumping-gate arranged to swing upward and downward, hydraulic rams movably mounted beneath the dumping-gate and having plungers connected with and adapted to raise the said dumping-gate, said rams being adapted to adjust themselves to the swinging movement of the dumping-gate, and means for operating the rams, substantially as described.

27. In an apparatus for handling material in bulk, the combination of a barge having a bin provided with a hinged dumping-gate, a pair of movably-mounted hydraulic rams located beneath and connected with the dumping-gate and capable of yielding to the swinging movement thereof, and means for connecting the rams with the dumping-gate for automatically varying the power of the rams to adapt the same to the disposition of the material on the gate, substantially as described.

28. In an apparatus for handling material in bulk, the combination of a barge having a bin provided with a hinged dumping-gate, a pair of movably-mounted hydraulic rams located at opposite sides of the dumping-gate and capable of yielding to the swinging movement of the latter, and a compensating valve connected with and adapted to vary the power of the rams, substantially as described.

29. In an apparatus for handling material in bulk, the combination of a barge having a bin or compartment and provided with a dumping-gate, a pair of oppositely-disposed hydraulic rams connected with the dumping-gate and adapted to actuate the same, a compensating valve connected with the hydraulic rams and adapted to vary the power of the same, and means connected with the gate for controlling the valve, substantially as and for the purpose described.

30. In an apparatus for handling material in bulk, the combination of a barge provided with bins or compartments and having oppositely-disposed upwardly-swinging dumping-gates, a chute, an endless conveyer extending from the barge to the chute and having one of its flights located beneath the dumping-gates, the hydraulic rams arranged in pairs and located beneath and connected with the dumping-gates, and compensating valves connecting the members of each pair of hydraulic rams and also connected with the dumping-gates and adapted to vary the power of the rams to correspond with the disposition of the material on the gates, substantially as described.

31. In an apparatus for handling material in bulk, the combination of a barge having a bin or compartment provided with a dumping-gate, a pair of hydraulic rams connected with the dumping-gate at opposite sides thereof, a compensating valve connected with the hydraulic rams and adapted to vary the power of the same, and flexible connections between the valve and the opposite sides of the gate for controlling the valve for varying the power to arrange the same to correspond with the disposition of the load, substantially as described.

32. In an apparatus for handling material in bulk, the combination of a barge having a bin or compartment and provided with a dumping-gate, a pair of hydraulic rams connected with the dumping-gate, a compensating valve for controlling the feed or supply of liquid to the rams to vary the power thereof, flexible connections between the compensating valve and the gate, and a weight for holding the flexible connections taut, substantially as described.

33. In an apparatus for handling material in bulk, the combination of a barge having a bin or compartment and provided with a dumping-gate, hydraulic rams connected with the dumping-gate and arranged at opposite sides thereof, a compensating valve connected with and adapted to vary the power of the rams, flexible connections extending from the valve to the opposite sides of the dumping-gate and provided with similar depending loops, guides receiving the flexible connections, and a weight supported by the said loops, substantially as described.

34. In an apparatus for handling material in bulk, the combination of a barge having a bin or compartment and provided with a dumping-gate, a pair of hydraulic rams located beneath and connected with the dumping-gate at opposite sides thereof, an oscillatory compensating valve for varying the power of the rams, the central guide-pulley 106, the guide-pulleys 105 located adjacent to the side edges of the dumping-gate, the pulleys 107 arranged at opposite sides of the central pulley 106, the flexible connections secured at their outer ends to the dumping-gate, near the side edges thereof and extending from the pulleys 105 to the pulley 106 and provided with opposite depending loops extending downward from the pulleys 106 and 107, said flexible connections being connected at their inner ends with the compensating valve, and a weight supported by the loops, substantially as described.

35. In an apparatus for handling material in bulk, the combination of a barge having a bin or compartment and provided with a swinging dumping-gate, a pair of pivotally-mounted hydraulic rams having their pistons pivoted to the dumping-gate at opposite sides thereof and the oscillatory compensating valve connected with the opposite sides of the dumping-gate and adapted to vary the power of the rams, substantially as and for the purpose described.

36. In an apparatus for handling material in bulk, the combination of a barge having a bin or compartment and provided with a swinging dumping-gate, a pair of pivotally-mounted hydraulic rams having their pistons pivoted to the dumping-gate at opposite sides thereof, the oscillatory compensating valve adapted to vary the power of the rams and provided with an exterior head, and connections between the head and the dumping-gate, whereby the power is varied to correspond with the disposition of the load, substantially as described.

37. In an apparatus for handling material in bulk, the combination of a barge, a tower, a superimposed chute suspended from the tower and capable of movement to arrange it in the desired position, horizontally-swinging supporting-booms arranged at opposite sides of the tower, adjustable connections depending from the booms and provided with means for detachably suspending the chute from the booms, whereby the chute may be arranged beneath and connected with either boom, and a conveyer extending from the barge to the chute, substantially as described.

38. In an apparatus for handling material in bulk, the combination of a barge, a tower, a chute depending from the tower and capable of movement to arrange it in the desired position, horizontally-swinging booms arranged at opposite sides of the tower, flexible connections depending from the booms and adapted to be connected with the chute to support the same at either side of the barge, and a winch having drums adapted to receive the flexible connections at either side of the tower, substantially as described.

39. In an apparatus for handling material in bulk, the combination of a barge, a tower arranged at the front of the barge and having an opening, an endless conveyer provided with buckets and consisting of a bottom horizontal flight located within the barge, the ascending and descending upright flights mounted on the tower, and the rearwardly-extending intermediate flight connecting the descending upright flight with the rear end of the bottom horizontal flight, a chute depending from the tower and arranged to swing through the same and through the conveyer to carry it from one side of the barge to the other, dumping mechanism for inverting the buckets to discharge their contents into the chute, and reversing mechanism located at the rearwardly-extending intermediate flight of the conveyer and adapted to swing the buckets from beneath the intermediate rearwardly-extending flight to a point above the same, whereby the buckets are caused to enter the barge in proper position to receive another charge, substantially as described.

40. In an apparatus for handling material in bulk, the combination of a barge, a tower mounted on the barge, an endless conveyer provided with buckets and having ascending and descending flights located in advance and in rear of the tower, a chute located beneath the top of the conveyer and arranged to swing through the same and supported by the tower, dumping mechanism arranged at the top of the tower, a safety-stop located between the tower and the stern of the barge and normally held out of engagement with the conveyer, and means for reversing the buckets before the same reënter the barge, substantially as described.

41. In an apparatus for handling material in bulk, the combination of a barge, a tower arranged at the front of the barge and having an opening, an endless conveyer provided with buckets and consisting of a bottom flight located within the barge, the ascending and descending upright flights supported by the tower, and the rearwardly-extending intermediate flight connecting the descending flight with the rear end of the bottom flight, a chute supported by the tower and arranged to swing through the same and through the conveyer, dumping mechanism for inverting the buckets to discharge their contents into the chute, a reversing-cam arranged at the back of the endless conveyer and adapted to swing the buckets from their position beneath the intermediate flight to a point above the same, whereby the buckets are caused to enter the barge in proper position to receive another charge, substantially as described.

42. In an apparatus for handling material in bulk, the combination of a barge provided with a longitudinal series of bins or compartments, a tower arranged at the front of the barge and having an opening, an endless conveyer provided with buckets and consisting of a bottom flight located within the barge and extending beneath the bins or compartments, the upright ascending and descending flights supported by the tower, and the rearwardly-extending intermediate flight, a chute supported by the tower and arranged to swing through the tower and through the conveyer, dumping mechanism for discharging the contents of the buckets into the chute, drive-wheels located at the stern of the barge and engaging the endless conveyer, guide-wheels arranged at the bow of the barge, a longitudinal guide-bar located beneath the bins or compartments and arranged to engage the buckets, whereby the latter are rigidly maintained in a horizontal position to prevent them from being accidentally oscillated when the material is discharged into them, and means for rotating the drive-wheels, substantially as described.

43. In an apparatus for handling material in bulk, the combination of a barge having bins or compartments and provided at the bottoms thereof with independent cut-offs, a tower having an opening, an endless conveyer provided with pivoted buckets and consisting of a bottom flight arranged beneath the bins or compartments, the ascending and descending upright flights supported by the tower, and the rearwardly-extending intermediate flight, a chute arranged to swing through the tower and through the endless conveyer, dumping mechanism for discharging the contents of the buckets into the chute, a reversing-cam located at the back of the endless conveyer and adapted to swing the buckets from their position beneath the intermediate flight to a point above the same for causing the buckets to enter the barge in proper position to receive another charge, and means for operating the cut-offs independently of one another and for locking them in their open position, substantially as and for the purpose described.

44. In an apparatus for handling material in bulk, the combination of a barge having bins or compartments provided with lower cut-offs and having oppositely-disposed dumping-gates, a tower, an endless conveyer provided with pivoted buckets and consisting of a bottom flight located within the barge and arranged beneath the bins or compartments, the upright ascending and descending flights supported by the tower, and the intermediate rearwardly-extending flight, a chute supported by the tower, dumping mechanism located at the top of the tower for discharging the contents of the buckets into the chute, a reversing-cam arranged at the back of the intermediate rearwardly-extending flight of the conveyer and adapted to swing the buckets from a position beneath the conveyer to a point above the same, operating mechanism for opening and closing the cut-offs independently of one another, and hydraulic rams for actuating the dumping-gates, substantially as described.

45. In an apparatus for handling material in bulk, the combination of a barge having bins or compartments provided with cut-offs and having dumping-gates, a tower having an opening, an endless conveyer provided with pivoted buckets and consisting of a bottom flight arranged beneath the bins or compartments, and upright ascending and descending flights located at the front and back of the tower and supported by the same, a chute depending from the top of the tower and arranged to swing through the same and through the endless conveyer, dumping mechanism located at the top of the tower, a reversing-cam arranged at the back of the barge for changing the position of the buckets before the same enter the barge, operating mechanism for opening and closing the cut-offs independently of one another, hydraulic rams arranged in pairs and connected with the dumping-gates, and compensating valves connecting the rams of each pair, substantially as and for the purpose described.

46. In an apparatus for handling material in bulk, the combination of a barge having bins or compartments provided with cut-offs and having dumping-gates, a tower having an opening, an endless conveyer provided with pivoted buckets and consisting of a bottom flight located beneath the bins or compartments and upright ascending and descending flights supported by the tower and arranged at the front and back of the same, a chute depending from the top of the tower and arranged to swing through the same and through the endless conveyer, dumping mechanism arranged at the top of the tower, a reversing-cam located at the back of the barge for changing the position of the buckets before they reënter the said barge, operating mechanism for opening and closing the cut-offs independently of one another, hydraulic rams connected with and adapted to actuate the dumping-gates, and trimmers arranged at intervals above the bottom flight of the endless conveyer to remove the surplus material from the buckets, substantially as described.

47. In an apparatus for handling material in bulk, the combination of a barge having bins or compartments provided with cut-offs and having dumping-gates, a tower having an opening, an endless conveyer provided with pivoted buckets and consisting of a bottom flight located beneath the bins or compartments, and upright ascending and descending flights supported by the tower and arranged at the front and back of the same, chutes depending from the top of the tower and arranged to swing through the same and through the endless conveyer, dumping mechanism located at the top of the tower, a winch, flexible connections extending from the winch to the chutes and located at opposite sides of the tower, operating mechanism for opening and closing the cut-offs, hydraulic rams connected with the dumping-gates, and means for operating the rams for opening and closing the dumping-gates independently of one another, substantially as described.

48. In an apparatus for handling material in bulk, the combination of a barge having bins or compartments provided with cut-offs and having dumping-gates, a tower mounted on the barge and having an opening, an endless conveyer provided with pivoted buckets and consisting of a bottom flight located beneath the bins or compartments, and upright ascending and descending flights supported by the tower and arranged at the front and back of the same, operating mechanism for opening and closing the cut-offs, hydraulic rams connected with the dumping-gates, the movable chutes depending from the top of the tower and arranged to swing through the same and through the endless conveyer, a winch, flexible connections extending from the winch to the chutes and located at opposite sides of the tower, dumping mechanism located at the top of the tower, and a reversing-cam arranged to change the position of the buckets before the latter enter the barge, substantially as described.

49. In an apparatus for handling material in bulk, the combination of a barge provided with bins or compartments having cut-offs and provided with dumping-gates, a tower mounted on the barge and having an opening, an endless conveyer having pivoted buckets and consisting of a bottom flight located beneath the bins or compartments, and upright ascending and descending flights supported by the tower and located at the front and back of the same, chutes depending from the top of the tower and arranged to swing through the same and through the endless conveyer, a winch having a series of drums, flexible connections located at opposite sides of the tower and extending from the chutes to the drums, operating mechanism for opening and closing the cut-offs independently of one another, dumping mechanism arranged at the top of the tower, a reversing-cam for changing the position of the buckets, a safety-stop located above one of the flights of the conveyer and normally held out of contact with the same, and a trimmer for removing the surplus material, substantially as described.

50. In an apparatus for handling material in bulk, the combination of a barge having bins or compartments provided with cut-offs, a superimposed chute, a conveyer extending from the barge to the chute, a shaft extending longitudinally of the bins or compartments, a series of arms connected with the cut-offs, means for coupling the arms to the shaft, whereby one or more of the cut-offs may be opened and closed when the shaft is actuated, stops arranged in pairs for limiting the inward and outward movement of the cut-offs, and means for rocking the shaft, substantially as described.

51. In an apparatus for handling material in bulk, the combination with a conveyer, of bins or compartments having cut-offs, a shaft, a series of arms connected with the cut-offs, devices for coupling the arms to the shaft, brackets, the links slidably connected with the brackets and having their inward movement limited by the same to limit the inward movement of the cut-offs, and means for rocking the shaft, substantially as described.

52. In an apparatus for handling material in bulk, the combination of bins or compartments, an endless conveyer having a bottom flight located beneath the bins or compartments, cut-offs arranged at the bottom of the bins or compartments, a series of arms loosely mounted and arranged at an inclination and connected with the cut-offs, a shaft, couplings for connecting the arms with the shaft, links extending from the cut-offs and provided with openings, and the brackets provided with projections extending into the openings of the links, whereby the latter are slidably connected with the brackets to limit the inward and outward movement of the cut-offs, substantially as described.

53. In an apparatus for handling material in bulk, the combination of a barge, a superimposed chute, an endless conveyer extending from the barge to the chute and passing over the same and permitting the chute to swing through it from one side of the barge to the other, said conveyer being provided with a bottom flight located within the barge, a drive-wheel engaging the conveyer at one end of the bottom flight, and a guard-arm located above the bottom flight, adjacent to the drive-wheel and arranged to be engaged by the conveyer to free the latter, substantially as described.

54. In an apparatus for handling material in bulk, the combination of a barge, an endless conveyer having pivoted buckets and provided with wheels, drive-wheels arranged to receive and engage the wheels of the conveyer, and a guard located above one of the flights of the conveyer and arranged between the drive-wheels in position to be engaged by the conveyer as the buckets leave the drive-wheel, whereby the said conveyer will be freed from its engagement with the drive-wheel, substantially as described.

55. In an apparatus for handling material in bulk, the combination of a barge, a superimposed chute, an endless conveyer provided with pivoted buckets and having wheels, drive-wheels arranged to engage the wheels of the conveyer, and a guard extending longitudinally of the adjacent flight of the conveyer and located between the drive-wheels and arranged to be engaged by the said conveyer to free the same from the said drive-wheels, substantially as described.

56. In an apparatus for handling material in bulk, the combination of a barge, a superimposed chute, an endless conveyer provided with wheels, drive-wheels engaging the wheels of the conveyer, rails receiving the wheels of the conveyer and spaced from the drive-wheels, and guide-plates located at opposite sides of the conveyer and connecting the rails and adapted to hold the endless conveyer against lateral movement, substantially as described.

57. In an apparatus for handling material in bulk, the combination of a barge, an endless conveyer provided with wheels, guide-wheels receiving the wheels of the conveyer, a superimposed chute, rails extending from opposite sides of the guide-wheels and arranged to receive the wheels of the conveyer, and the guide-plates located at opposite sides of the conveyer adjacent to the guide-wheels and adapted to hold the conveyer against lateral movement, substantially as described.

58. In an apparatus for handling material in bulk, the combination of a barge, a superimposed chute, a conveyer having an ascending flight and provided with wheels, guide-wheels located at the lower end of the ascending flight of the conveyer, rails arranged in pairs and extending from the top and bottom of the guide-wheels, and the upper and lower guide-plates arranged adjacent to the guide-wheels and adapted to hold the conveyer against lateral movement on the guide-wheels, and capable of guiding the conveyer-wheels to the rails, substantially as described.

59. In an apparatus for handling material in bulk, the combination of a bin or compartment, a superimposed chute, an endless conveyer having an ascending flight for conveying material upward from the bin or compartment to the chute, said conveyer being also provided with a horizontal flight, and a safety-stop located above and normally held out of contact with the upper horizontal flight of the endless conveyer, and arranged to be thrown into engagement by the backward movement of the conveyer and capable of locking the same against such backward movement after it engages the same, substantially as described.

60. In an apparatus for handling material in bulk, the combination of a bin or compartment having a series of movable cut-offs, an endless conveyer, a chute, a shaft extending longitudinally of the series of cut-offs, loosely-mounted arms arranged on the shaft and connected with the cut-offs, couplings for locking the arms to the shaft, a steam-cylinder connected with and adapted to rock the shaft, and operating mechanism for controlling the said couplings, substantially as described.

61. In an apparatus for handling material in bulk, the combination with a bin or compartment, a superimposed chute, and a conveyer extending from the bin or compartment to the chute, of a dumping-gate arranged to swing upward and downward, hydraulic rams for actuating the dumping-gate, and a compensating valve connected with the rams, substantially as described.

62. In an apparatus for handling material in bulk, the combination of a longitudinal series of bins or compartments provided with hinged dumping-gates, a chute, a conveyer extending from the bins or compartments to the chute, hydraulic rams arranged in pairs and connected with the dumping-gates and capable of yielding to the swinging movement of the same, compensating valves connecting the rams of each pair, and means for automatically operating the compensating valves to vary the power of the rams to correspond to the disposition of the material on the dumping-gates, substantially as described.

63. In an apparatus for handling material in bulk, the combination of a series of bins or compartments provided with dumping-gates, hydraulic rams arranged in pairs, compensating valves connecting the rams, and connections between the compensating valves and the dumping-gates, substantially as and for the purpose described.

64. In an apparatus for handling material in bulk, the combination of a bin or compartment having a sliding cut-off or door, a conveyer, a shaft, an arm loosely mounted on the shaft and connected with the cut-off or door, means for connecting the arm with the shaft and for operating the latter, a link connected with the door or cut-off, and means for engaging the link to limit the inward and outward movement of the sliding door or cut-off, substantially as described.

65. In an apparatus for handling material in bulk, the combination of an endless conveyer, a drive-wheel engaging the endless conveyer, and the guard comprising an approximately horizontal bar located above the endless conveyer, and a brace extending upward from the bar, substantially as described.

66. In an apparatus for handling material in bulk, the combination of a bin or compartment, an endless conveyer provided with wheels, rails receiving the wheels of the conveyer, drive-wheels interposed between the rails, and guide-plates for holding the endless conveyer against lateral movement, substantially as described.

67. In an apparatus for handling material in bulk, the combination of a conveyer provided with wheels, a longitudinal series of bins or compartments, drive and guide wheels located at the ends of the series of bins or compartments, rails spaced from the drive and guide wheels and receiving the wheels of the conveyer, a guard located between the drive-wheels and arranged above the conveyer and adapted to free the same from the said drive-wheels as the buckets leave the latter, and guide-plates located at the spaces between the rails adjacent to the drive and guide wheels and holding the conveyer against lateral movement, whereby the wheels of the conveyer are guided to the rails, substantially as described.

68. In an apparatus for handling material in bulk, the combination of a barge having a tower, the front and rear chutes depending from the tower, an endless conveyer provided with pivoted buckets and having one of its flights located above the chutes, the scale-casings mounted above the chutes and provided each with a pair of rigid spouts and having a movable cut-off for closing either of the spouts, and the front and rear dumping-blocks mounted on the scale-casings and arranged to discharge the contents of the buckets alternately in the front and rear scale-casings, substantially as described.

69. In an apparatus for handling material in bulk, the combination of a barge, a tower composed of front and rear legs and a connecting top portion, an endless conveyer having pivoted buckets and consisting of a bottom horizontal flight located within the barge at the bottom thereof, the front ascending flight adapted to carry material upward from the barge, the rear descending flight connected with the said flights and located at the back of the tower, a movable chute depending from the top of the tower and arranged to swing through the same, a scale-casing mounted within the top of the tower and located above the chute, a dumping-block arranged at the top of the scale-casing and adapted to be engaged by the pivoted buckets, and a reversing-cam to change the position of the buckets as the latter enter the barge, substantially as described.

70. In an apparatus for handling material in bulk, the combination of a barge, a tower composed of front and rear legs and a connecting top portion, an endless conveyer having pivoted buckets and consisting of a bottom horizontal flight located within the barge at the bottom thereof, the front ascending flight adapted to carry material upward from the barge, the rear descending flight connected with the said flights and located at the back of the tower, a movable chute depending from the top of the tower and arranged to swing through the same, a scale-casing mounted within the top of the tower and located above the chute, a dumping-block arranged at the top of the scale-casing and adapted to be engaged by the pivoted buckets, and a trimmer arranged within the barge and arranged above the bottom flight of the conveyer, substantially as described.

71. In an apparatus for handling material in bulk, the combination of a barge, a tower composed of front and rear legs and a connecting top portion, an endless conveyer having pivoted buckets and consisting of a bottom horizontal flight located within the barge at the bottom thereof, the front ascending flight adapted to carry material upward from the barge, the rear descending flight connected with the said flights and located at the back of the tower, a movable chute depending from the top of the tower and arranged to swing through the same, a scale-casing mounted within the top of the tower and located above the chute, a dumping-block arranged at the top of the scale-casing and adapted to be engaged by the pivoted buckets, a reversing-cam arranged at the back of the barge to change the position of the buckets as the latter enter the said barge, and a trimmer arranged within the barge at the bottom thereof and located above the bottom flight of the conveyer, substantially as described.

72. In an apparatus for handling material in bulk, the combination of a barge, a tower composed of front and rear legs and a connecting top portion, an endless conveyer having pivoted buckets and consisting of a bottom horizontal flight located within the barge at the bottom thereof, the front ascending flight adapted to carry material upward from the barge, the rear descending flight connected with the said flights and located at the back of the tower, a movable chute depending from the top of the tower and arranged to swing through the same, a scale-casing mounted within the top of the tower and located above the chute, a dumping-block arranged at the top of the scale-casing and adapted to be engaged by the pivoted buckets, a drive-wheel located within the barge at the bottom thereof, and a guard located within the barge adjacent to the drive-wheel and arranged above the bottom flight of the conveyer, substantially as described.

73. In an apparatus for handling material in bulk, the combination of a barge, a tower composed of front and rear sides or legs and having a top connecting portion, a chute depending from the top of the tower, the endless conveyer provided with buckets and consisting of a bottom horizontal flight located within the barge, the ascending and descending upright flights, and the rearwardly-extending intermediate flight connecting the descending upright flight, the drive and guide wheels arranged within the barge at the ends of the horizontal bottom flight, and the guard located above the bottom flight and arranged adjacent to the drive-wheel, substantially as described.

74. In an apparatus for handling material in bulk, the combination of a barge, a tower composed of front and rear sides or legs and having a top connecting portion, a chute depending from the top of the tower, the endless conveyer provided with buckets and consisting of a bottom horizontal flight located within the barge, the ascending and descending upright flights, and the rearwardly-extending intermediate flight, the drive and guide wheels located within the barge at the stern and bow of the same, and the guide-plates located at opposite sides of the conveyer at the ends of the horizontal flight and arranged adjacent to the said wheels and adapted to hold the conveyer against lateral movement, substantially as described.

75. In an apparatus for handling material in bulk, the combination of a barge, a tower, an endless conveyer provided with buckets and having a horizontal flight arranged within the barge at the bottom thereof, said conveyer extending to the top of the tower, the guide and drive wheels arranged at the bow and stern of the barge at the ends of the horizontal flight of the conveyers, the guide-plates located at opposite sides of the horizontal flight of the conveyer and adapted to prevent the same from moving laterally, and the guard arranged within the barge at the stern thereof and located above the horizontal flight of the conveyer adjacent to the drive-wheel, substantially as described.

76. In an apparatus for handling material in bulk, the combination of a barge, a tower, an endless conveyer provided with buckets and extending from the barge to the tower and having a horizontal flight arranged within the barge at the bottom thereof, said conveyer being provided at opposite sides with wheels, the drive and guide wheels arranged in pairs and located within the barge at the ends of the horizontal flight of the conveyer, rails spaced from the drive and guide wheels and receiving the wheels of the conveyer, and the guard-plates located at the spaces between the rails adjacent to the drive and guide wheels and holding the conveyer against lateral movement, substantially as described.

77. In an apparatus for handling material in bulk, the combination of a tower, a chute depending from the tower, an endless conveyer extending from the barge to the tower and having a horizontal flight located within the barge at the bottom thereof, said conveyer being also provided at opposite sides with wheels, drive and guide wheels located within the barge at the ends of the horizontal bottom flight of the conveyer, the rails spaced from the guide and drive wheels, the guide-plates located at the spaces between the rails and holding the conveyer against lateral movement at the guide and drive wheels, and a guard located above the bottom flight of the conveyer and arranged between the drive-wheels, substantially as described.

78. In an apparatus for handling material in bulk, the combination of a barge, a tower, movable chutes depending from the tower and composed of extensible sections, the booms hinged to the tower and located above the chutes, an endless conveyer extending from the barge to the chutes, the flexible connections 189 and 190, depending from the drums and connected with the sections of the chutes, the flexible connections 185 extending longitudinally of the chutes and connected with the lower sections thereof, and a series of drums connected with the said flexible connections 185, 189 and 190, substantially as described.

79. In an apparatus for handling material in bulk, the combination with a bin having a dumping-gate, and a conveyer arranged beneath the dumping-gate, of a pair of rams connected with the dumping-gate, a compensating valve connecting the rams, and means for connecting the compensating valve with the dumping-gate, whereby the said valve will be automatically controlled to vary the power of the rams, substantially as described.

80. In an apparatus for handling material in bulk, the combination with a movable dumping-gate, of rams connected with the dumping-gate, a compensating valve connected with the rams, connections between the compensating valve and the dumping-gate for operating the former automatically, and means for operating the equalizing-valve by hand, substantially as described.

81. In an apparatus for handling material in bulk, the combination of a barge having a series of bins or compartments provided with centrally-arranged cut-offs and having dumping-gates located at opposite sides of the cut-offs, rams located at opposite sides of the cut-offs and arranged in pairs and having their plungers connected with the dumping-gates, compensating valves located between the rams of each pair and connecting the same, connections between the compensating valves and the dumping-gates for operating the former automatically, and operating mechanism for enabling the valves to be operated by hand independently of one another, substantially as described.

82. In an apparatus for handling material in bulk, the combination of a barge, a tower, an endless conveyer extending from the barge to the tower and having upright flights at the front and back of the same and provided in rear of the tower with an intermediate horizontal flight, and a safety-stop located above the intermediate horizontal flight and normally held out of contact with the same, substantially as described.

83. In an apparatus for handling material in bulk, the combination of a barge, a tower, an endless conveyer extending from the barge to the tower, and a safety-stop normally held out of contact with the conveyer and arranged to lock the same against backward movement, substantially as described.

84. In an apparatus for handling material in bulk, the combination of a barge, a tower mounted on the barge and having an opening, a conveyer having flights at the front and back of the tower and extending to the top thereof, booms arranged at opposite sides of the tower, a chute supported by the tower and arranged to swing through the opening thereof to arrange it at either side of the barge, and means for connecting it with either boom, substantially as described.

85. In an apparatus for handling material in bulk, the combination of a barge, a tower mounted on the barge and having an opening, a conveyer extending to the top of the barge and having flights arranged at the front and back of the same, a chute depending from the top of the tower and arranged to swing through the same and through the conveyer, flexible connections arranged at opposite sides of the tower and provided with means for engaging the chute, and a winch arranged adjacent to the opening of the tower and provided with drums adapted to receive the said flexible connections, substantially as described.

86. In an apparatus for handling material in bulk, the combination of a barge, a tower, a conveyer extending from the barge to the tower, a superimposed chute supported by the tower and arranged to swing to either side of the barge, flexible connections arranged at opposite sides of the tower and adapted to be connected with the chute to support the same at either side of the barge, and a winch having drums adapted to receive the flexible connections at either side of the tower, substantially as described.

87. In an apparatus for handling material in bulk, the combination of a barge, a tower having an opening, a conveyer extending from the barge to the tower, a chute depending from the top of the tower and arranged to swing through the opening, a winch mounted within the opening of the tower, and means for connecting the winch with the chute when the latter is at either side of the barge, substantially as described.

88. In an apparatus for handling material in bulk, the combination of a barge, a tower having an opening, a conveyer arranged to carry material from the barge to the tower, a superimposed chute arranged to swing through the opening of the tower, a winch mounted within the opening of the tower, and the flexible connections arranged at opposite sides of the tower and adapted to be connected with the chute and the winch for supporting the former at either side of the tower, substantially as described.

89. The combination of a barge, a tower having an opening, a conveyer, booms located at opposite sides of the tower, a superimposed chute supported by the tower and arranged to swing through the same and composed of sections, a winch mounted within the opening of the tower, and the two sets of flexible connections located at opposite sides of the tower and connected with the booms, either set being adapted to be connected to the chute and to the winch, substantially as described.

90. In an apparatus for handling material in bulk, the combination of a barge, a tower having an opening, a conveyer, the horizontally-swinging booms arranged at opposite sides of the tower, the superimposed chutes supported by the tower and arranged to swing through the opening thereof and composed of sections, a winch mounted within the opening of the tower and provided with a series of drums, and the two sets of flexible connections located at opposite sides of the tower and connected with the booms and provided with means for detachably engaging the chutes and the drums whereby either set may be used, substantially as described.

91. In an apparatus for handling material in bulk, the combination of a tower having an opening, a chute depending from the top of the tower and arranged to swing through the opening, flexible connections located at opposite sides of the tower, either set being adapted to be attached to the chute, and a winch located in the opening of the tower and adapted to receive either set of flexible connections, substantially as described.

92. In an apparatus for handling material in bulk, the combination of a tower having an opening, a chute depending from the top of the tower and arranged to swing through the opening, booms mounted on the tower at opposite sides thereof, flexible connections mounted on the booms and adapted to engage the chute, either set of flexible connections being adapted to be connected with the chute to support the same in position for use, and a winch mounted in the opening of the tower and adapted to receive either set of flexible connections, substantially as described.

93. In an apparatus for handling material in bulk, the combination of a tower having an opening, a superimposed chute depending from the top of the tower and mounted within the opening thereof and having a pivotal and rotary movement whereby it is adapted to swing both longitudinally and transversely to arrange it at any desired position at either side of the tower, and booms hinged to the tower above the openings thereof and arranged to swing horizontally and provided with means for supporting the chute, substantially as described.

94. In an apparatus for handling material in bulk, the combination of a barge provided with a series of bins or compartments, a tower, a superimposed chute suspended from the tower, a conveyer extending from the barge to the tower and having a horizontal flight located beneath the bins or compartments, and a series of trimmers arranged between the horizontal flight and the bins or compartments, substantially as described.

95. In an apparatus for handling material in bulk, the combination of a barge provided with a series of bins or compartments, a conveyer having a flight extending beneath the bins or compartments, and a series of trimmers interposed between the bins or compartments and the conveyer, substantially as described.

96. In an apparatus for handling material in bulk, the combination of a barge having a series of bins or compartments, a tower arranged at the front of the barge, an endless conveyer composed of a horizontal flight arranged beneath the bins or compartments, upright flights arranged at the front and back of the tower, and an intermediate horizontal flight located above the barge in rear of the tower, a series of trimmers interposed between the bins or compartments and the lower horizontal flight, a superimposed chute, and a safety-stop located above the intermediate horizontal flight and normally held out of contact with the same, substantially as described.

97. In an apparatus for handling material in bulk, the combination of a barge having a series of bins or compartments, a tower arranged at the front of the barge, an endless conveyer having pivoted buckets and composed of a horizontal flight arranged at the bottom of the barge beneath the bins or compartments, the upright flights arranged at the front and back of the tower, and the intermediate horizontal flight extending rearward from the tower, a series of trimmers interposed between the bins or compartments and the bottom horizontal flight of the conveyer, and a reversing-cam arranged at the back of the intermediate horizontal flight for changing the position of the buckets as they enter the barge, substantially as described.

98. In an apparatus for handling material in bulk, the combination of a barge having bins or compartments, a tower, a superimposed chute suspended from the tower, a conveyer having pivoted buckets and extending from the barge to the tower, dumping mechanism located at the top of the tower over the chute, and a reversing-cam arranged at the back of the barge to change the position of the buckets as they enter the latter, substantially as described.

99. In an apparatus for handling material in bulk, the combination of a barge, a tower having an opening, an endless conveyer having pivoted buckets and extending from the barge to the tower and having upright flights arranged at the front and back of the tower, and provided with an approximately horizontal flight located at the top of the tower, the buckets of the horizontal flight being normally in an upright position, a superimposed chute suspended from the top of the tower at a point beneath the conveyer and arranged to swing through the opening of the tower, and dumping mechanism arranged at the top of the tower over the chute, substantially as described.

100. In an apparatus for handling material in bulk, the combination of a barge, a tower having an opening, an endless conveyer provided with pivoted buckets and composed of a bottom horizontal flight located within the barge, upright flights arranged at the front and back of the tower, and an intermediate flight extending from the tower to the stern of the barge, a chute suspended from the top of the tower and arranged to swing through the opening, dumping mechanism arranged at the top of the tower over the chute, and means located at the back of the intermediate flight for reversing the buckets as they enter the barge, substantially as described.

101. In an apparatus for handling material in bulk, the combination of a barge having a series of bins or compartments, a tower having an opening, an endless conveyer provided with pivoted buckets and composed of a bottom horizontal flight located within the barge beneath the bins or compartments, upright flights arranged at the front and back of the tower, and an intermediate horizontal flight extending rearward from the tower, a chute suspended from the tower and arranged to swing through the opening, dumping mechanism arranged at the top of the tower over the chute, a reversing-cam arranged at the rear portion of the intermediate flight for changing the position of the buckets as they enter the barge, and a series of trimmers interposed between the horizontal flight and the bins or compartments, substantially as described.

102. In an apparatus for handling material in bulk, the combination of a barge having a series of bins or compartments provided with dumping-gates, a tower, a superimposed chute, a conveyer extending from the barge to the tower, hydraulic rams connected with the dumping-gates, and means automatically operated by the dumping-gates for varying the power of the rams, substantially as described.

103. In an apparatus for handling material in bulk, the combination of a barge having a series of bins or compartments, a tower having an opening, a chute arranged at the opening, an endless conveyer having pivoted buckets and extending from the barge to the tower and passing over the chute, dumping mechanism arranged at the top of the tower over the chute, a series of trimmers arranged at the bottom of the bins or compartments, and means for successively discharging the contents of the bins or compartments into the conveyer, substantially as described.

104. In an apparatus for handling material in bulk, the combination of a barge having a longitudinal series of bins or compartments, a tower having an opening, a superimposed chute located at the opening, an endless conveyer having pivoted buckets and extending beneath the bins or compartments and over the chute, dumping mechanism arranged at the top of the tower over the chute, reversing mechanism arranged in rear of the dumping mechanism, a series of trimmers interposed between the bins or compartments and the conveyer, and a safety-stop arranged normally out of contact with the conveyer, substantially as described.

105. In an apparatus for handling material in bulk, the combination of a barge having a longitudinal series of bins or compartments provided with cut-offs, a tower, a chute suspended from the tower, a conveyer extending from the barge to the tower, dumping-gates arranged at opposite sides of the bins or compartments, hydraulic rams arranged in sets at opposite sides of the barge and connected with the dumping-gates, compensating valves connected with the rams of each set for varying the power of the same, means for operating the rams from the deck of the barge, and connections between the dumping-gates and the compensating valves, whereby the latter will be automatically controlled, substantially as described.

106. In an apparatus for handling material in bulk, the combination of a barge having a series of bins or compartments provided with cut-offs, a tower having an opening, an endless conveyer having pivoted buckets extending beneath the bins or compartments and from the barge to the tower, a chute suspended from the top of the tower at the opening thereof, dumping mechanism arranged at the top of the tower, a winch located in the opening of the tower and connected with the chute, means for operating the cut-offs from the deck of the barge, whereby the bins or compartments are successively opened, and trimmers located adjacent to the cut-offs, substantially as described.

107. In an apparatus for handling material in bulk, the combination of a barge, a tower, a superimposed chute supported by the tower, an endless conveyer extending from the barge to the chute, a series of trimmers arranged in the barge, dumping mechanism located at the top of the tower for emptying the contents of the conveyer into the chute, reversing mechanism located in rear of the tower, and a safety-stop, substantially as described.

108. In an apparatus for handling material in bulk, the combination of a barge, a tower, a superimposed chute supported by the tower, an endless conveyer extending from the barge to the tower and provided with pivoted buckets, dumping mechanism arranged at the top of the tower, reversing mechanism located in rear of the dumping mechanism, for raising the buckets in proper position for entering the barge, and means for holding the buckets in such position, substantially as described.

109. In an apparatus for handling material in bulk, the combination of a barge having a series of bins or compartments provided with independently-operable cut-offs, a tower, a superimposed chute supported by the tower, a conveyer having pivoted buckets and extending from the barge to the tower, dumping mechanism located at the top of the tower, reversing mechanism for changing the position of the buckets to arrange them properly for entering the barge, and trimmers located within the barge, substantially as described.

110. In an apparatus for handling material in bulk, the combination of a barge having a series of bins or compartments, a tower, a superimposed chute, an endless conveyer having pivoted buckets and extending from the barge to the chute, dumping mechanism arranged at the top of the tower, reversing mechanism arranged in rear of the dumping mechanism, and means for successively discharging the contents of the bins or compartments in the conveyer, substantially as described.

111. In an apparatus for handling material in bulk, the combination of a barge provided with a series of bins or compartments and having cut-offs, a conveyer having a flight extending beneath the bins or compartments, a series of trimmers interposed between the bins or compartments and the conveyers, and operating mechanism extending from the deck of the barge to the cut-offs for operating the latter independently of one another, substantially as described.

112. In an apparatus for handling material in bulk, the combination of a barge, a tower, a superimposed chute, a conveyer having pivoted buckets and extending from the barge to the tower, dumping mechanism located at the top of the tower over the chute, a reversing-cam arranged at the back of the barge to change the position of the buckets as they enter the latter, and means for holding the buckets in such position until they enter the barge, substantially as described.

113. In an apparatus for handling material in bulk, the combination of a barge, a tower, a superimposed chute suspended from the tower, booms arranged at opposite sides of the tower, adjustable connections also located at opposite sides of the tower and depending from the booms and provided with means for detachably engaging the chute, and a winch adapted to be connected with either set of adjustable connections, substantially as described.

114. In an apparatus for handling material in bulk, the combination of a barge, a tower, a superimposed chute suspended from the tower, booms arranged at opposite sides thereof, adjustable connections located at opposite sides of the tower, and depending from the booms and provided with means for engaging the chute, a winch arranged to receive either set of adjustable connections, a conveyer provided with pivoted buckets and extending from the barge to the chute, dumping mechanism arranged at the top of the tower over the chute, and a reversing-cam for changing the position of the buckets as they enter the barge, substantially as described.

In testimony that I claim the foregoing as my own I have hereto affixed my signature in the presence of two witnesses.

PEETE B. CLARKE.

Witnesses:
JOHN FRENCH,
CHARLES ENGEL.